US009986014B2

(12) United States Patent
Saint-Hilaire et al.

(10) Patent No.: US 9,986,014 B2
(45) Date of Patent: May 29, 2018

(54) SYSTEMS AND TECHNIQUES FOR WEB COMMUNICATION

(71) Applicant: Intel Corporation, Santa Clara, CA (US)

(72) Inventors: Ylian Saint-Hilaire, Hillsboro, OR (US); Bryan Y. Roe, Camas, WA (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 14/671,266

(22) Filed: Mar. 27, 2015

(65) Prior Publication Data

US 2016/0285948 A1 Sep. 29, 2016

(51) Int. Cl.
G06F 15/16 (2006.01)
H04L 29/08 (2006.01)
H04L 29/06 (2006.01)
H04L 29/12 (2006.01)

(52) U.S. Cl.
CPC .......... *H04L 67/02* (2013.01); *H04L 61/2575* (2013.01); *H04L 61/2589* (2013.01); *H04L 65/1069* (2013.01); *H04L 65/608* (2013.01); *H04L 61/2514* (2013.01)

(58) Field of Classification Search
CPC ............. H04L 61/2514; H04L 61/2575; H04L 61/2589; H04L 65/1069; H04L 65/608; H04L 67/02
USPC .................................................. 709/203–248
See application file for complete search history.

(56) References Cited

U.S. PATENT DOCUMENTS

| 6,049,821 A * | 4/2000 | Theriault .......... G06F 17/30905 707/E17.121 |
| 6,993,555 B2 * | 1/2006 | Kay .................. G06F 17/30867 707/999.003 |
| 7,996,000 B1 | 9/2011 | Dubinko et al. |
| 8,732,304 B2 * | 5/2014 | Ragutski ............... H04L 63/123 709/224 |
| 8,752,035 B2 * | 6/2014 | Fanning .................... G06F 8/49 717/141 |

(Continued)

FOREIGN PATENT DOCUMENTS

WO WO2015-017672 A1 2/2015

OTHER PUBLICATIONS

Bergkvist et al., WebRTC 1.0: Real-time W3C Communication Between Browsers, Copyright 2004-2011, pp. 7-8 and 43.*

(Continued)

*Primary Examiner* — Moustafa M Meky
*Assistant Examiner* — Thorne E Waugh
(74) *Attorney, Agent, or Firm* — Schwabe, Williamson & Wyatt, P.C.

(57) ABSTRACT

Systems and techniques for web communication are disclosed herein. In some embodiments, a computing device may include logic to receive a first data set representative of a web page, wherein the first data set includes a portion that is associated with a platform feature not supported by a platform of a web server that is to serve the web page; generate a second data set by removing the portion from the first data set; generate a third data set by performing at least one minification operation on the second data set; and provide the third data set to the web server. Other embodiments may be disclosed and/or claimed.

25 Claims, 22 Drawing Sheets

(56) References Cited

U.S. PATENT DOCUMENTS

| | | | | |
|---|---|---|---|---|
| 8,914,837 B2* | 12/2014 | Ahmed | .............. | H04N 5/23206 |
| | | | | 725/115 |
| 8,990,289 B2* | 3/2015 | Mott | ................ | G06F 17/30905 |
| | | | | 709/203 |
| 2003/0225763 A1* | 12/2003 | Guilak | .............. | G06F 17/30707 |
| 2008/0072139 A1 | 3/2008 | Salinas et al. | | |
| 2009/0271690 A1* | 10/2009 | Iglesias | ................... | G06F 9/443 |
| | | | | 715/200 |
| 2010/0223322 A1 | 9/2010 | Mott et al. | | |
| 2011/0209046 A1* | 8/2011 | Huang | .............. | G06F 17/30905 |
| | | | | 715/234 |
| 2013/0227078 A1* | 8/2013 | Wei | ........................ | H04L 67/02 |
| | | | | 709/219 |
| 2014/0040786 A1* | 2/2014 | Swanson | ........... | G06F 17/30899 |
| | | | | 715/760 |
| 2014/0095579 A1* | 4/2014 | Shah | ....................... | H04L 67/06 |
| | | | | 709/203 |
| 2015/0234856 A1* | 8/2015 | Havekes | ........... | G06F 17/30864 |
| | | | | 707/781 |
| 2015/0254998 A1* | 9/2015 | Daetwyler | ............ | G06F 3/0482 |
| 2016/0112473 A1* | 4/2016 | Labranche | ............ | H04M 3/533 |

OTHER PUBLICATIONS

Varol Okan, "Mirror Mirror", https://varolokan.wordpress.com/2015/01/01/mirror-mirror/, Jan. 1, 2015, 3 pages.
International Search Report and Written Opinion dated Jul. 28, 2016 for International Application No. PCT/US2016/019323, 11 pages.
Search Report dated Jan. 17, 2017 for Taiwan Patent Application No. 105103787, 1 page.

\* cited by examiner

```
<Body>
  <!-- ###BEGIN###{SMALLPICTURE} -->
  <IMG src="face_stock_small.jpg" width="640" height="480">
  <!-- ###END###{SMALLPICTURE} -->

<!-- ###BEGIN###{LARGEPICTURE} -->
  <IMG src="face_stock_large.jpg" width="1300" height="1217">
  <!-- ###END###{LARGEPICTURE} -->
</Body>
```

FIG. 3

| PLATFORM | SUPPORTED FEATURES |
|---|---|
| LocalSiteLinuxARM | GPIO, TERMINAL, FILES, LINUXARM |
| LocalSiteLinuxX86 | GPIO, DESKTOP, TERMINAL, FILES, LINUXX86 |
| IntelGalileo | ... |
| IntelEdison | ... |
| IntelME | ... |
| Phone | SMALLPICTURE |
| Tablet | LARGEPICTURE |
| Wearable | ... |
| ... | ... |

FIG. 4

```
#if defined(PHONE)
size_t MyVariable_len = 53128;
unsigned char MyVariable[53128] =
{
0x1F,0x8B,0x08,0x00,0x00,0x00,0x00,0x00,0x04,0x00,0xA4,0x9A,0x57,0x8F,0x84,0x5C,0x97,0x9D,0
xFF,0xCA,0x68,0x6E,0x6B,0x1,0x44,0x4E,0x33,0x91,0xA0,0xC8,0x39,0xA7,
. . .
0xF9,0x3E,0x7D,0xBD,0xAB,0x74,0x2E,0xBF,0x4F,0x2C,0x4D,0x9C,0xBE,0xCA,0xAC,0x2A,0xCA,0x
F9,0xFB,0x44,0xF3,0xC4,0xE9,0xE7,0xEB,0x1F,0x1E,0x3F,0xD3,0xFD,0xE7,0x3F,
0xF9,0x35,0x1D,0xC6,0x3E,0x12,0x01,0x00
};
#endif
#if defined(TABLET)
size_t MyVariable_len = 148545;
unsigned char MyVariable[148545] =
{
0x1F,0x8B,0x08,0x00,0x00,0x00,0x00,0x00,0x04,0x00,0xD4,0xBC,0xD9,0xB6,0xA3,0xC8,0xB2,0x2D,
0xF8,0x2B,0x77,0xD4,0x2B,0x35,0x86,0x68,0x44,0x57,0x75,0xAB,0xC6,0x00,
. . .
0x5E,0xFF,0xFC,0xA7,0x2E,0x9A,0xAA,0xDE,0xC0,0x6F,0x28,0x42,0xFD,0xF3,0xBF,0xFF,0xF9,0x1
F,0x38,0x1D,0xF3,0xFB,0x7F,0x0F,0x95,0x8E,0x69,0xD9,0xA0,0x29,0x03,
0x00
};
#endif
```

FIG. 7

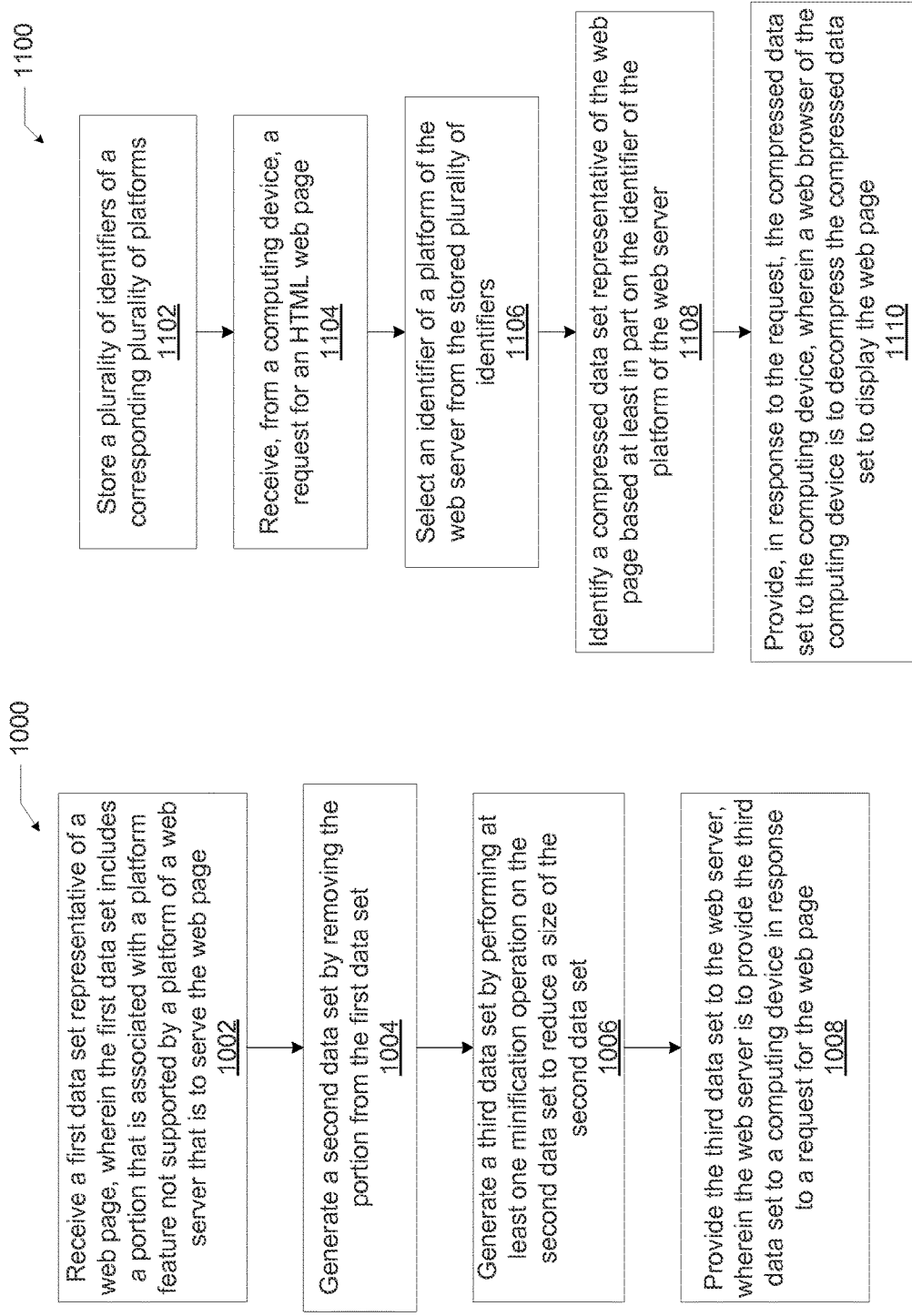

| SOURCE | RELAY SERVER | LATENCY |
|---|---|---|
| 172.16.254.1 | 98.246.7.50 | 20 ms |
| 2001:db8:0:1234:0:567:8:1 | 192.168.1.14 | 4 ms |
| 192.168.1.14 | 98.246.7.50 | 37 ms |
| ... | ... | ... |

FIG. 17

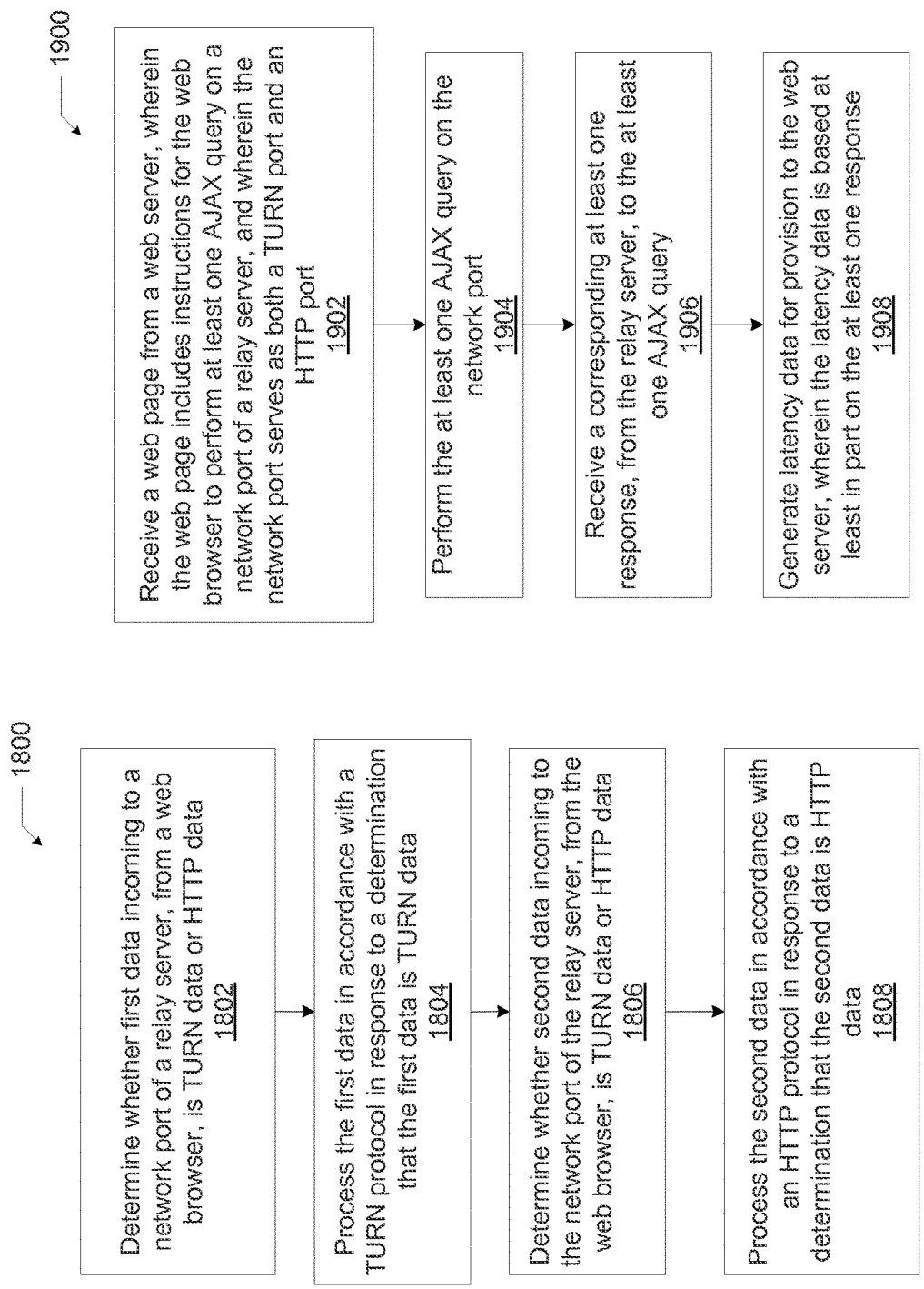

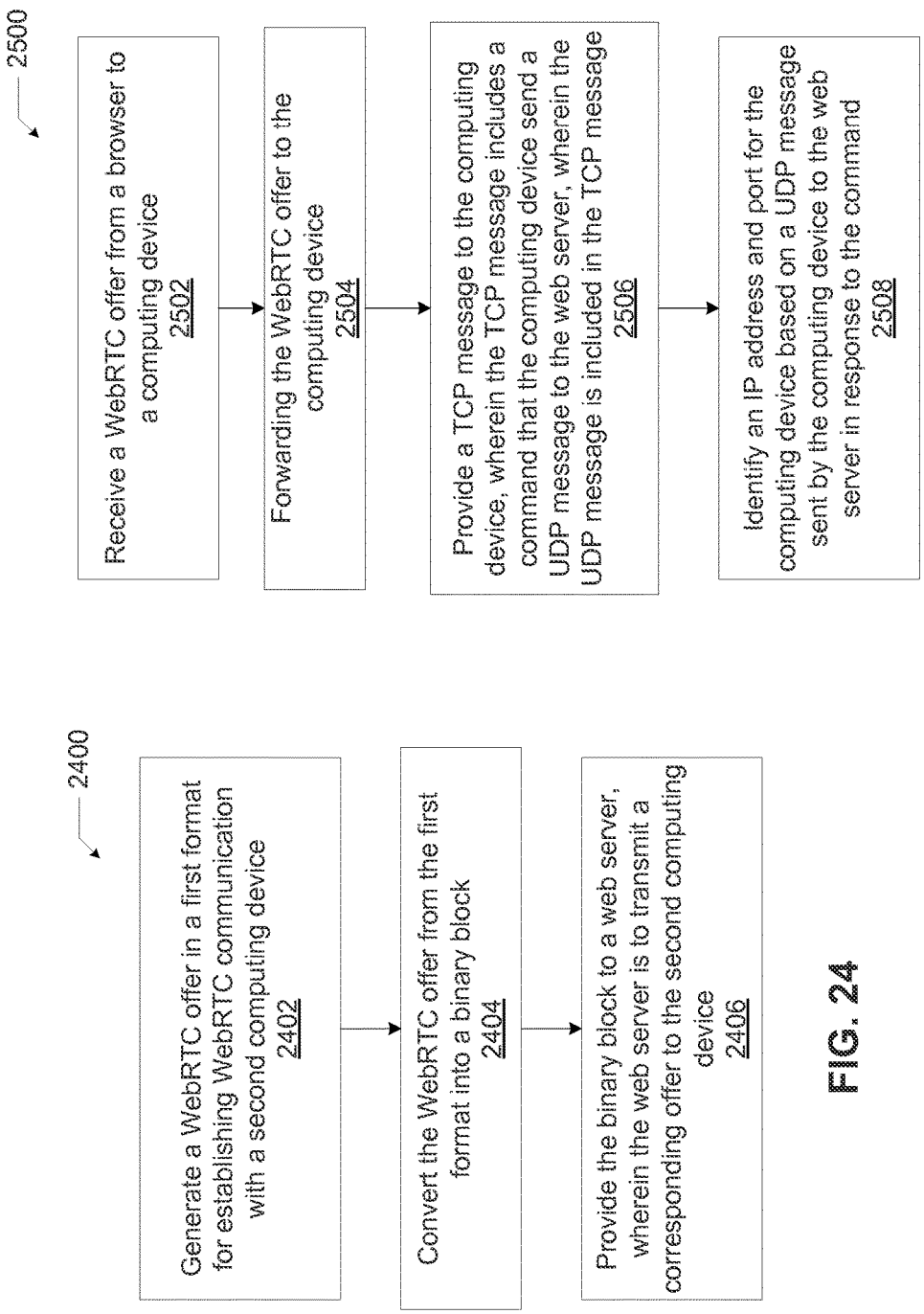

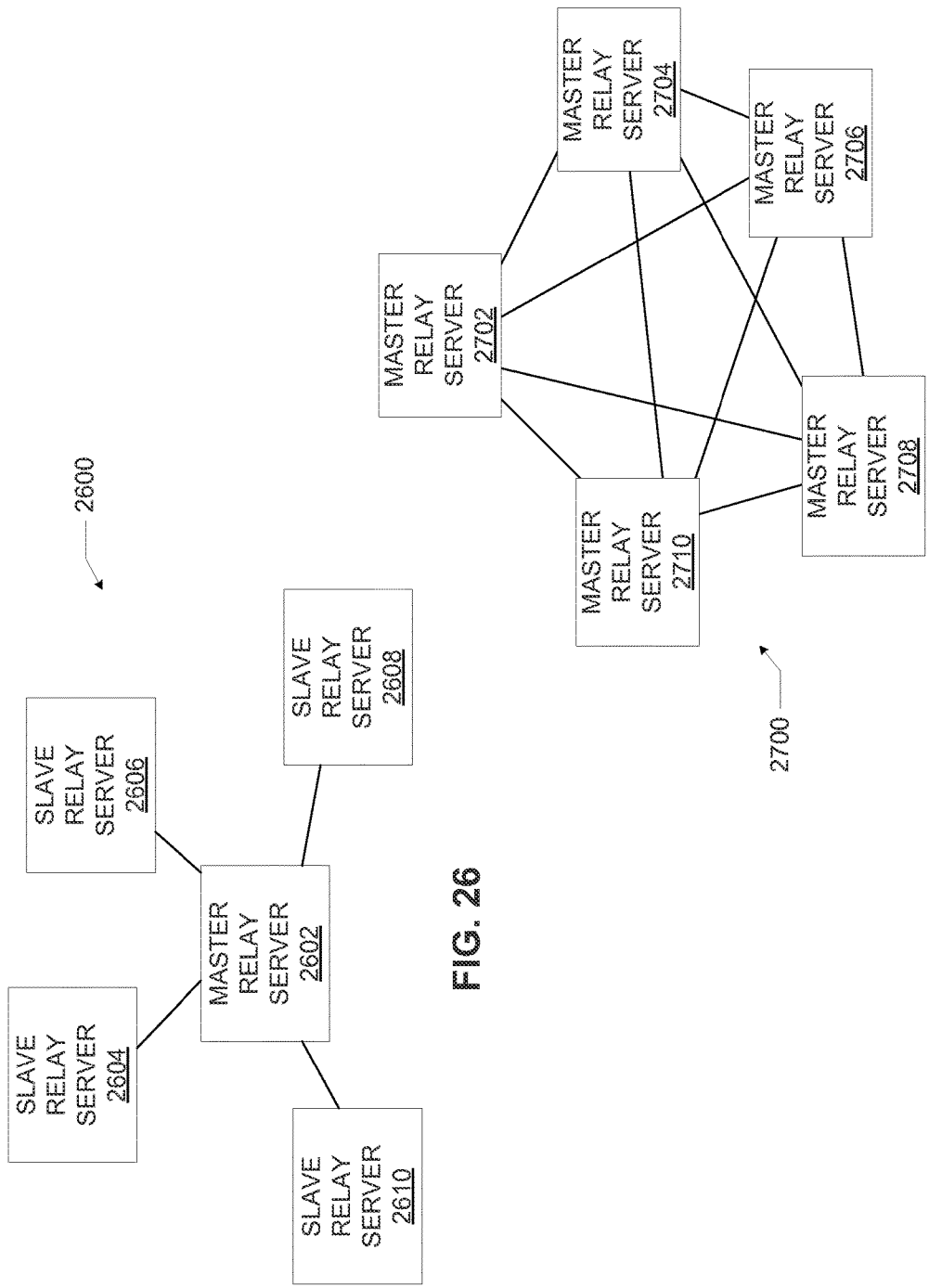

| RELAY SERVER — 2802 | CURRENT MASTER — 2804 | CURRENT LOAD — 2806 | PREVIOUS LOAD 1 — 2808 | PREVIOUS LOAD 2 — 2810 |
|---|---|---|---|---|
| 192.168.1.44 | N/A | 95 | 82 | 97 |
| 10.87.209.232 | 196.168.1.44 | 22 | 46 | 89 |
| 192.169.100.4 | N/A | 55 | 51 | 55 |
| ... | ... | ... | ... | ... |

FIG. 28

| RELAY SERVER — 2902 | LOCATION — 2904 |
|---|---|
| 98.246.7.50 | Beaverton, OR, US |
| 162.246.8.50 | Vancouver, British Columbia, CA |
| 162.13.3.11 | London, England, UK |
| ... | ... |

FIG. 29

SYSTEMS AND TECHNIQUES FOR WEB COMMUNICATION

TECHNICAL FIELD

The present disclosure relates generally to the field of electronic communication, and more particularly, to web communication.

BACKGROUND

Many conventional protocols and techniques exist to manage communication between devices in a computing network. However, these techniques are often inefficient and cumbersome when applied in new settings, such as low power web servers or peer-to-peer communication.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the FIGS. of the accompanying drawings.

FIG. 3 is an illustrative data set, representative of a web page, that includes platform feature tags, in accordance with various embodiments.

FIG. 4 illustrates an example data structure that may be used to store platform and platform feature support data, in accordance with various embodiments.

FIG. 7 illustrates a header file that includes multiple data sets representative of the web page of FIG. 3 for respective platforms, in accordance with various embodiments.

FIG. 10 is a flow diagram of an illustrative process for web communication that may be performed by a developer computing device of the computing system of FIG. 1, in accordance with various embodiments.

FIG. 11 is a flow diagram of an illustrative process for web communication that may be performed by a web server of the computing system of FIG. 1, in accordance with various embodiments.

FIG. 17 illustrates an example data structure that may be used to store source device, target device, and latency data for web communications, in accordance with various embodiments.

FIG. 18 is a flow diagram of an illustrative process for web communication that may be performed by a relay server of the computing system of FIG. 1, in accordance with various embodiments.

FIG. 19 is a flow diagram of an illustrative process for web communication that may be performed by a computing device of the computing system of FIG. 1, in accordance with various embodiments.

FIG. 24 is a flow diagram of an illustrative process for web communication that may be performed by a computing device of the computing system of FIG. 1, in accordance with various embodiments.

FIG. 25 is a flow diagram of an illustrative process for web communication that may be performed by a web server of the computing system of FIG. 1, in accordance with various embodiments.

FIG. 26 illustrates a star configuration of multiple relay servers that may be included in the computing system of FIG. 1, in accordance with various embodiments.

FIG. 27 illustrates a mesh configuration of multiple relay servers that may be included in the computing system of FIG. 1, in accordance with various embodiments.

FIG. 28 illustrates an example data structure that may be used to store load data for web communications, in accordance with various embodiments.

FIG. 29 illustrates an example data structure that may be used to store relay server location data for web communications, in accordance with various embodiments.

DETAILED DESCRIPTION

Figure 1:
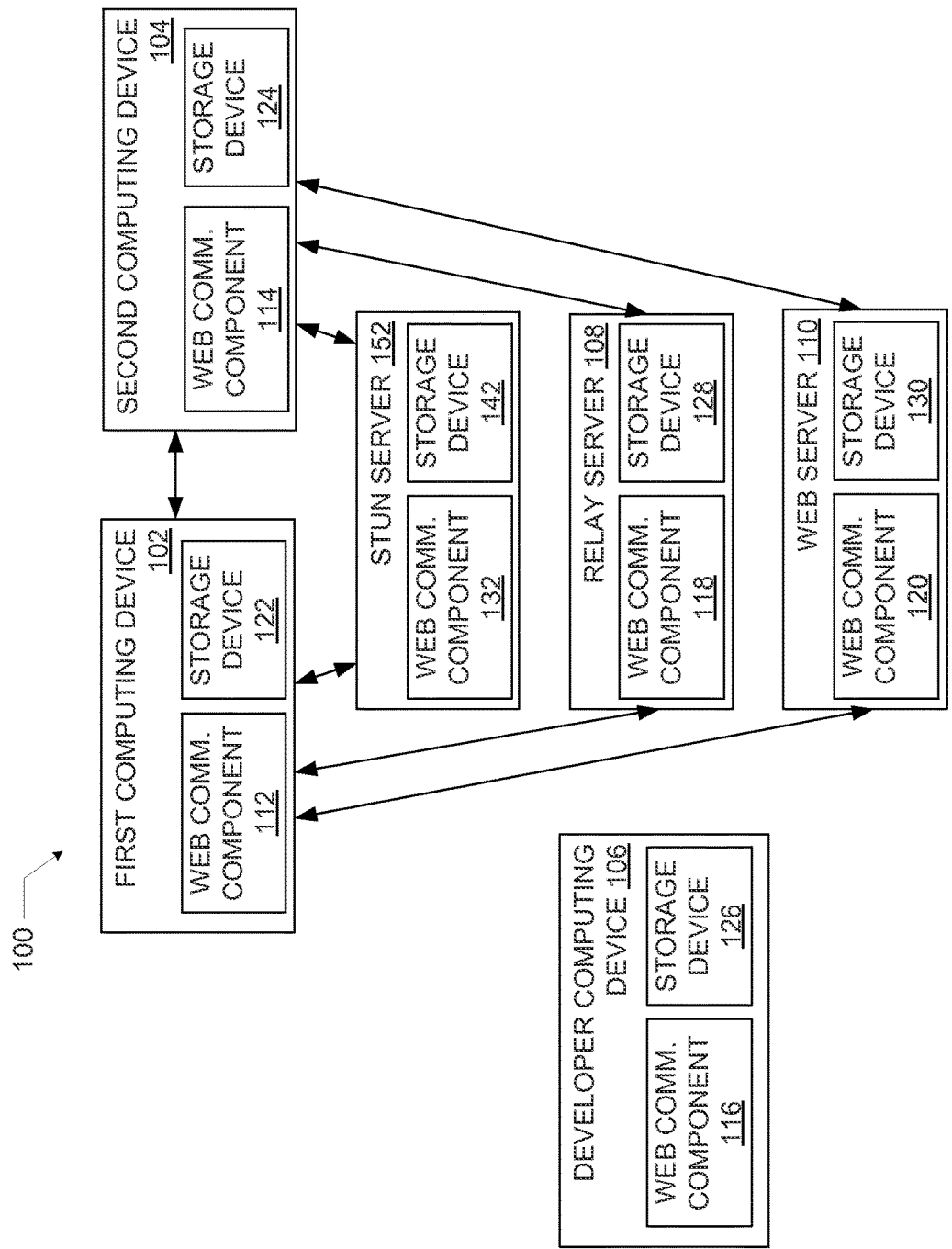
FIG. 1 is a block diagram of an illustrative computing system configured for web communications, in accordance with various embodiments.

Embodiments related to systems and techniques for web communication are disclosed herein. The term "web communication" may refer to any technology that facilitates the transfer of information over a computing network, and various embodiments disclosed herein may impact web communication in different ways. For example, in some embodiments, a computing device may include logic to change the data typically served in response to a request for a web page to improve the speed of service and to enable service by low power devices. In some embodiments, a relay server may include a network port that is multiplexed to handle different types of incoming data and the logic to process these different types of incoming data appropriately. In some embodiments, the latency of communications between different computing devices may be measured and stored in ways that enable improved allocation of computing resources over conventional techniques. These embodiments are simply illustrative, and many additional embodiments are disclosed herein.

Various ones of the embodiments disclosed herein may relate to Web Real Time Communication (WebRTC). WebRTC is a protocol for enabling browser-to-browser or browser-to-device communication. When a device is behind one or more layers of Network Address Translator (NAT) or behind one or more firewalls, direct signaling or a direct peer-to-peer WebRTC connection may not be achievable. In such circumstances, the WebRTC protocol includes Interactive Connectivity Establishment (ICE) protocols for intermediate servers to facilitate communications. One such ICE protocol is Session Traversal Utilities for NAT (STUN), a client server protocol in which a STUN server receives a request from a client, and in response, sends the public Internet Protocol (IP) address of a client to that client, along with information about the type of NAT behind which the client sits (so that the client can provide this information to prospective WebRTC partners). A second ICE protocol is Traversal Using Relays around NAT (TURN), a relaying protocol in which a TURN relay server is positioned to relay messages between two clients whose peer-to-peer communication is blocked (e.g., by a firewall). A TURN server may be regarded as a STUN server with relaying capability, and has a public address. In general, when a client attempts to establish a direct WebRTC connection with another device (e.g., using RTCPeerConnection), the client first tries to set up a direct connection between peers using Universal Datagram Protocol (UDP). If that fails, the client tries Transport Communication Protocol (TCP). If that fails, the client may use a TURN server. Traditionally, addresses (e.g., Uniform Resource Locators (URLs)) for STUN and TURN servers are statically specified (e.g., in an RTCPeerConnection constructor) and may include credential and username values for accessing the servers. As described in detail below, certain ones of the embodiments disclosed herein may improve WebRTC communication.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. As used herein, a signal may be "received" by a component if it is generated externally or internally to that component, and acknowledged and/or processed by that component.

FIG. 1 is a block diagram of an illustrative computing system 100 that may be configured for web communications in accordance with any of the embodiments disclosed herein. The computing system 100 may include a number of computing devices, such as a first computing device 102, a second computing device 104, a STUN server 152, a relay server 108, a web server 110, and a developer computing device 106, communicatively coupled with each other. Each of the computing devices of the computing system 100 may include web communication components (illustrated in FIG. 1 as web communication components 112, 114, 132, 118, 120, and 116 for the first computing device 102, the second computing device 104, the STUN server 152, the relay server 108, the web server 110, and the developer computing device 106, respectively).

Communication within the computing system 100 may be enabled by the communication pathways (indicated by arrows). The communication pathways may each include wired communication pathways and/or wireless communication pathways, over direct couplings, and/or over personal, local, and/or wide area networks. Each of the computing devices of the computing system 100 may include suitable hardware for supporting the communication pathways, such as network interface cards, modems, WiFi devices, Bluetooth® devices, Long Term Evolution (LTE)

devices, and so forth. In some embodiments, the communication pathways may be direct communication pathways between the components as illustrated in FIG. 1. Although particular communication pathways are illustrated in FIG. 1, any suitable communication pathways may be included in the computing system 100 (and in particular, additional communication pathways may be included or illustrated communication pathways may be omitted). For example, no communication pathways are shown between the developer computing device 106 and the other computing devices of the computing system 100. This is simply for ease of illustration, and the developer computing device 106 may be in communication with any of the other computing devices of the computing system 100. In some embodiments, the computing system 100 may include one or more developer computing devices configured as discussed herein with reference to the developer computing device 106, with each developer computing device in communication with one or more of the other computing devices of the computing system 100.

Each of the computing devices included in the computing system 100 may include a processing device (not shown) and a storage device (illustrated in FIG. 1 as storage devices 122, 124, 142, 128, 130, and 126 for the first computing device 102, the second computing device 104, the STUN server 152, the relay server 108, the web server 110, and the developer computing device 106, respectively). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable volatile and/or non-volatile memory or mass storage devices (such as solid-state drive, diskette, hard drive, compact disc read only memory (CD-ROM), and so forth). Each of the computing devices included in the computing system 100 may include one or more buses (and bus bridges, if suitable) to communicatively couple the processing device, the storage device, and any other devices included in the respective computing devices.

The storage device may include a set of computational logic, which may include one or more copies of computer readable media (e.g., non-transitory computer readable media) having instructions stored therein that, when executed by the processing device of the computing device, may cause the computing device to implement any of the techniques and methods disclosed herein, or any portion thereof.

The computing devices of the computing system 100 may each include peripheral devices, which may communicate via wired or wireless communication pathways, such as cameras, printers, scanners, radio frequency identification (RFID) readers, credit card swipe devices, or any other peripheral devices. Except for the web communication teachings of the present disclosure incorporated therein, the first computing device 102, the second computing device 104, the STUN server 152, the relay server 108, the web server 110, and the developer computing device 106 may be a broad range of such devices known in the art. Specific, but not limiting, examples are described below. In some embodiments, the computational logic may include any suitable ones of the sets of logic discussed below.

In some embodiments of the systems disclosed herein, one or more of the components of the computing system 100 shown in FIG. 1 may not be included. For example, in some embodiments, the computing system 100 may not include a STUN server 152. In some embodiments, the computing system 100 may include any desired number of different ones of computing devices that are illustrated in FIG. 1. For example, the computing system 100 may include multiple relay servers configured as discussed herein with reference to the relay server 108, multiple web servers configured as discussed herein with reference to the web server 110, and multiple computing devices configured as discussed herein with reference to the first computing device 102 and the second computing device 104.

Disclosed herein are a number of examples of the web communication components 112, 114, 132, 118, 120, and 116 that may be included in the respective computing devices of the computing system 100. Not all of these web communication components need be included in their respective computing devices, and instead, any combination of the embodiments of the web communication components 112, 114, 132, 118, 120, and 116 may be included in the computing system 100 in accordance with the present disclosure, with any remaining elements provided by conventional logic. For example, the developer computing device 106 may include a web communication component 116 in accordance with any of the embodiments disclosed herein, while the other computing devices in the computing system 100 may be configured in a conventional manner. In another example, the relay server 108, the web server 110, and the first computing device 102 may include web communication components 118, 120, and 112, respectively, in accordance with any of the embodiments disclosed herein, while the other computing devices in the computing system 100 may be configured in a conventional manner.

The embodiments discussed below with reference to FIGS. 2-11 may improve the performance of web servers when serving web pages, particularly when those web servers are embedded in low power devices. Any of these embodiments may be combined with any other embodiment disclosed herein, as suitable.

It may be useful for a computing device to offer a web-based interface as the primary way for users to interact with the computing device, and thus to act as a web server. Conventional web sites are designed and built with powerful enterprise web servers in mind, and typically contain Hypertext Markup Language (HTML), image files, Cascading Style Sheets (CSS), and JavaScript files. However, when the serving device is cost-constrained (e.g., when the storage or processing power available to the device is limited), the device may have difficulty serving a conventional web site, and browsers may be required to make many round-trips to fully load the site. Indeed, in some scenarios, the web browser receiving the web site from the serving device (e.g., a user device, such as a mobile phone) may be a more powerful computing device than the serving device. Additionally, the serving device must store all of the web site components in non-volatile storage, which may be burdensome or impossible for low resource devices. The result of these performance deficiencies may be a degraded user experience when browsing a web site served by the device (relative to a fully functional web site served by an enterprise web server).

Various ones of the embodiments discussed below with reference to FIGS. 2-11 may be used to embed a fully featured web site into a relatively small amount of storage space and to serve the site from a low power device. Examples of low power devices may include system-on-chip devices (e.g., the Intel EDISON device, having a dual-core central processing unit (CPU) operating at 500 MHz and a microcontroller unit (MCU) operating at 100 MHz for low power pre-processing before further CPU analysis), application processors (e.g., the Intel GALILEO device, a single-core 400 MHz application processor), wearable devices (e.g., as discussed above), or board management controller devices (e.g., devices having a dedicated processor, memory, and network connection to enable secure remote management of the platform, such as the Intel Management Engine).

Additionally, various ones of the embodiments discussed below with reference to FIGS. 2-11 may be used to automatically generate web site representations that are targeted to different web server platforms that offer different features. Such embodiments represent a significant technical advance over the manual construction of different web sites for different platforms. For example, some embodiments may take a set of web site files as an input, merge all of the files into a single file in accordance with the HTML specification, run a pre-processor to eliminate features that will not be supported by the target server, perform "minification" operations on the remaining code (e.g., removing white space and editing JavaScript code), compress the result into a single compact block (e.g., via gzip), and format the block into a C header file such that the target server can access the block as a variable and serve it out as requested. Additionally, in some embodiments, the C header file may contain multiple blocks tailored to different target servers with different features.

Figure 2:
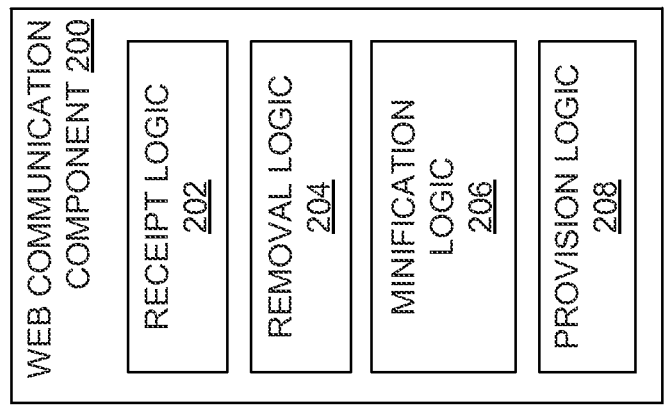
FIG. 2 is a block diagram of an illustrative web communication component that may be included in a developer computing device of the computing system of FIG. 1, in accordance with various embodiments.

FIG. 2 is a block diagram of a web communication component 200 that may be included in a developer computing device of the computing system of FIG. 1, in accordance with various embodiments. In particular, the web communication component 200 may serve as the web communication component 116 of the developer computing device 106 in some embodiments (and will be discussed as such below for illustrative purposes). Although the elements of the web communication component 200 (and any of the web communication components herein) may be illustrated separately, the elements may be combined or divided as suitable, and each may use one or more of the results generated by others in performing its own processing, as discussed below. Data may be communicated between the elements of the web communication component 200 (or between any of the elements of any of the web communication components discussed herein) over a physical bus, a long-distance wired communication pathway, a short- or long-distance wireless communication pathway, or any combination of communication pathways.

The web communication component 200 may include receipt logic 202, removal logic 204, minification logic 206, and provision logic 208. The receipt logic 202 may be configured to receive a first data set representative of a web page. The receipt logic 202 may receive this first data set by retrieving it from a storage location local to the receipt logic 202 or remote from the receipt logic 202. For example, the first data set may be stored in the storage device 126. In some embodiments, as discussed below with reference to the graphical user interface 800 of FIG. 8, the location of the first data set within a file structure of the developer computing device 106 may be provided to the receipt logic 202, and the receipt logic 202 may access the first data set by locating the first data set within the file structure.

In some embodiments, the first data set may include a Hypertext Markup Language (HTML) file (e.g., the index.html file that typically serves as the "master" file for a web page). The first data set may also include one or more additional files that may be referred to within the HTML file for use in the displayed web page, such as one or more image files or one or more Cascading Style Sheets (CSS) files, for example. Thus, in some embodiments, the first data set may include multiple files of different types.

The first data set may include a number of elements for use in the web page that rely on features that may or may not be supported by the platform of the particular web server that will be serving the web page to requesting clients. For example, a traditional, dedicated web server may have the capacity to serve large, high-resolution image files in a web page, while a web server embedded in a low power device may not have such capacity (e.g., may not be able to serve a large, high-resolution image file in a reasonable amount of time). For a web page that is not designed with a particular server platform in mind (the traditional approach to web page design), there may be elements that may not be supported by a platform of the web server that will ultimately be serving the web page. These elements may correspond to portions of the first data set (e.g., portions of HTML code that rely on a feature not supported by the web server).

The removal logic 204 may be coupled with the receipt logic 202, and may be configured to generate a second data set by removing a portion from the first data set. The portion removed by the removal logic 204 may be a portion that corresponds to a platform feature not supported by a platform of the web server that will be serving the web page to a client. The removal logic 204 may identify portions of the first data set corresponding to non-supported platform features by identifying the intended platform, using stored data representative of the platform features supported and/or not supported by the intended platform, and determining what portions of the first data set correspond to non-supported platform features for the intended platform. In some embodiments, the first data set may include tags to delineate various portions of the code that correspond to various platform features that may or may not be supported by the web server. In some such embodiments, the removal logic 204 may identify a tag associated with a platform feature in the first data set, and identify the portion to be removed based on the tag.

For example, an illustrative data set 300, representative of a web page, that includes platform feature tags, in accordance with various embodiments, is illustrated in FIG. 3. In particular, the data set 300 includes two feature tags: the first tag <!--###BEGIN###{SMALLPICTURE}-->, <!--###END{SMALLPICTURE}--> and the second tag <!--###BEGIN###{LARGEPICTURE}-->, <!--###END{LARGEPICTURE}-->. As shown in FIG. 4, the first tag delineates HTML code that calls for the inclusion of an image "face_stock_small.jpg" with a width of 640 pixels and a height of 480 pixels, while the second tag delineates HTML code that calls for the inclusion of an image "face_ stock_large.jpg" with a width of 1300 pixels and a height of 1217 pixels. In this example, the first tag may correspond to a platform feature SMALLPICTURE; if a web server platform supports the provision of small pictures, the HTML code delineated by the SMALLPICTURE tag may not be removed by the removal logic 204. The second tag may correspond to a platform feature LARGEPICTURE; if a web server platform supports the provision of large pictures, the HTML code delineated by the LARGEPICTURE tag may not be removed by the removal logic 204. However, if the web server platform does not support the SMALLPICTURE feature or the LARGEPICTURE feature, the removal logic 204 may remove the corresponding portions of the HTML code. Analogous feature tags may be used in code of other types (e.g., //###BEGIN###{ . . . } and //###END###{ . . . } in JavaScript).

For example, an example data structure 400 that may be used to store platform and platform feature support data, in accordance with various embodiments, is illustrated in FIG. 4. The data structure 400 may be used to organize data in a storage device (e.g., the storage device 126). The data structure 400 may include a platform field 402 and a supported features field 404 for one or more entries (e.g., the entries 406-420 illustrated in FIG. 4). The platform field 402 may take values that identify different platforms for different web servers that may serve a web page. The supported features field 404 may take values that identify what platform features are supported by the platform in the corresponding platform field 402. Example supported platform features illustrated in FIG. 4 include general-purpose input/output (GPIO), remote terminal capability, file access, operating systems (such as Linux for ARM devices and Linux for x86 devices), and the features SMALLPICTURE and LARGEPICTURE discussed above with reference to FIG. 3. The platforms and platform features represented in the data structure 400 may be defined by a developer as appropriate for the web page to be served and the serving platforms.

Figure 6:
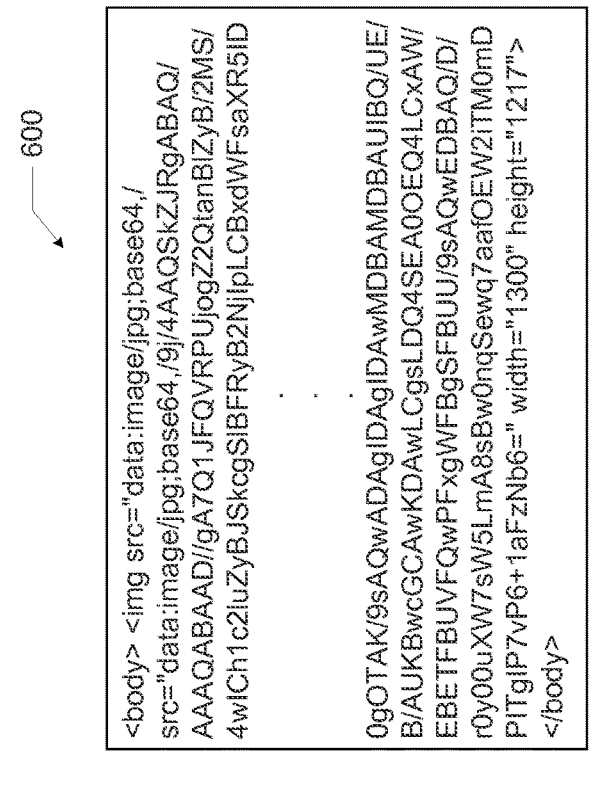
FIG. 6 illustrates a data set, representative of the web page of FIG. 3, generated for provision by a particular web server platform that is different than the web server platform of FIG. 5, in accordance with various embodiments.
Figure 5:
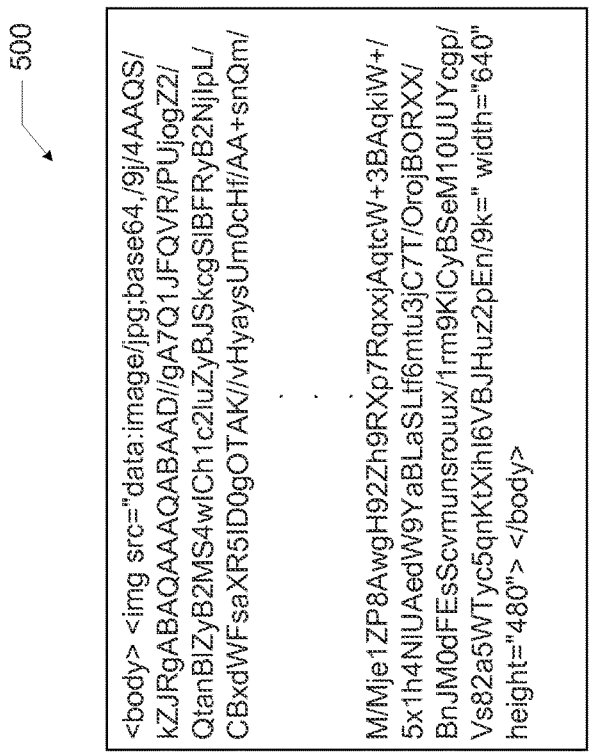
FIG. 5 illustrates a data set, representative of the web page of FIG. 3, generated for provision by a particular web server platform, in accordance with various embodiments.

Still referring to FIG. 2, in some embodiments, the removal logic 204 may receive an indication of a platform of a web server from which the web page represented by the first data set is to be served, and then access a stored association between the platform and platform features supported by the platform (e.g., as stored in the data structure 400 in the storage device 126) to determine what platform features are and are not supported by the platform. The removal logic 204 may then analyze the first data set to identify portions corresponding to platform features that are not supported by the platform, and remove those portions. Illustrations of these operations are shown in FIGS. 5 and 6, and discussed below.

Although the first data set may include tags to delineate different portions corresponding to different platform features (e.g., as discussed above with reference to FIG. 3), this need not be the case. In some embodiments, the data structure 400 or another data structure may also include definitions of various platform features, and the removal logic 204 may identify the platform features supported and/or not supported by a particular platform and then analyze the first data set to determine what portions correspond to supported features and what portions do not (so as to remove the portions that correspond to non-supported features). For example, the SMALLPICTURE feature may be defined as any image having a file size less than a specified size (e.g., measured in kilobytes) and/or a display size less than a specified size (e.g., measured in pixel dimensions). If the first data set includes a portion corresponding to such an image, and the web server platform supports the SMALLPICTURE feature, the removal logic 204 may not remove the portion. If the web server platform does not support the SMALLPICTURE feature, the removal logic 204 may remove the portion.

The web communication component 200 may also include minification logic 206. The minification logic 206 may be coupled to the removal logic 204, and may be configured to generate a third data set by performing at least one minification operation on the second data set (generated by the removal logic 204). As used herein, a "minification operation" may refer to an operation on a data set representative of a first web page that generates a second data set representative of a second web page, wherein the second data set is smaller in size than the first data set but where the display of the first web page by a web browser is the same as the display of the second web page. In other words, a minification operation reduces the size of the representation of a web page without affecting the display of the web page.

The minification logic 206 may perform any of a number of minification operations. For example, the minification logic 206 may replace one or more image files included in the second data set with an inline representation of the one or more image files. An inline representation of an image in an HTML file may be a base 64 representation of an image that is included within the HTML file itself (rather than as a separate file having a graphics format).

In another example, the minification logic 206 may remove code comments from the second data set. Comments are often included in HTML code to improve human readability, but they are not necessary to correctly render the HTML code and thus may be removed without affecting the display of the corresponding web page. In another related example, minification logic 206 may remove white space, line feeds, and carriage returns from the second data set.

In another example, the minification logic 206 may process JavaScript code for faster performance. The conventional, human-readable approach to using JavaScript in a web page involves defining code elements at the bottom of an HTML file and/or referring to one or more separate .js files. The minification logic 206 may inline JavaScript from separate files and these separate definitions, remove code comments, remove unnecessary white space, and remove unnecessary semicolons.

In another example, the minification logic 206 may process CSS data by recognizing CSS blocks, loading referenced CSS files and inlining them (e.g., in a similar manner to the inlining of image data discussed above), removing unnecessary white space, carriage returns, and line feeds, and removing code comments.

FIG. 5 illustrates a data set 500, representative of the web page of FIG. 3, generated for provision by a particular web server platform that does not support the platform feature LARGEPICTURE discussed above with reference to FIGS. 3 and 4, in accordance with various embodiments. In particular, the data set 500 may represent the result when the first data set 300 of FIG. 3 is received by the receipt logic 202, processed by the removal logic 204 to remove portions corresponding to non-supported features, and then processed by the minification logic 206 to further reduce the size. As illustrated in FIG. 5, white space and carriage returns have been removed from the first data set 300 of FIG. 3 (line breaks are included in FIG. 5 so that the data set 500 can be displayed in the figure), the image "face_stock_small.jpg" has been inlined, and code corresponding to the LARGEPICTURE feature does not appear.

FIG. 6 illustrates a data set 600, representative of the web page of FIG. 3, generated for provision by a particular web server platform that is different than the web server platform of FIG. 5 and does not support the platform feature SMALLPICTURE, in accordance with various embodiments. As discussed above with reference to FIG. 5, the data set 600 may represent the result when the first data set 300 of FIG. 3 is received by the receipt logic 202, processed by the removal logic 204 to remove portions corresponding to non-supported features, and then processed by the minification logic 206 to further reduce the size. As illustrated in FIG. 6, white space and carriage returns have been removed from the first data set 300 of FIG. 3 (line breaks are included in FIG. 6 so that the data set 600 can be displayed in the FIG.), the image "face_stock_large.jpg" has been inlined, and code corresponding to the SMALLPICTURE feature does not appear.

The data sets 500 and 600 of FIGS. 5 and 6, respectively, still have human-readable elements. In some embodiments, the minification logic 206 may further perform an encoding from HTML into hexadecimal. In such embodiments, the third data set may be in hexadecimal form (not readable by humans, but readable by web browsers).

Returning to FIG. 2, the web communication component 200 may include provision logic 208. The provision logic 208 may be coupled to the minification logic 206, and may be configured to provide the third data set (generated by the minification logic 206) to a web server (e.g., the web server 110). The web server to which the third data set is provided by the provision logic 208 may have a platform corresponding to the one for which the removal logic 204 removed unsupported features; thus, the third data set may provide a "customized" representation of the web page to the web server, suitable for serving to other computing devices by the web server. Upon receipt of the third data set, the web server may be enabled to provide the third data set to a computing device (e.g., the first computing device 102) in response to a request, to the web server from the computing device, for the web page. In some embodiments, the provision logic 208 may also provide web server code to the web server 110 (e.g., code for a small, single-threaded web server, which may be written in portable C), and the web server 110 may use this code to serve out the third data set to a requesting computing device (e.g., as a statically linked data block). As noted above, the third data set may be compressed (e.g., using gzip) when served by the web server 110, and decompressed by a browser on the requesting computing device.

In some embodiments, different data sets representative of the same web page but targeted to different platforms may be included in a single file. This file may be provided to the different platforms, each of which may identify and use the data set appropriate for its own platform. For example, multiple data sets representative of the same web page may be included in a single header file. FIG. 7 illustrates a header file 700 that includes multiple data sets representative of the web page of FIG. 3 for respective platforms, in accordance with various embodiments. In particular, the header file 700 includes two #if defined statements that identify two different platforms, PHONE and TABLET. Associated with each of these #if defined statements are variables that store a hexadecimal representation of a web page (e.g., as discussed above with reference to the minification logic 206). The variable associated with PHONE may store a representation that includes platform features supported by a PHONE web server platform, and the variable associated with TABLET may store a representation that includes platform features supported by a TABLET web server platform. In this form, the variable representations of the web page may be selectively included in C code depending on the platform of the web server.

Figure 8:
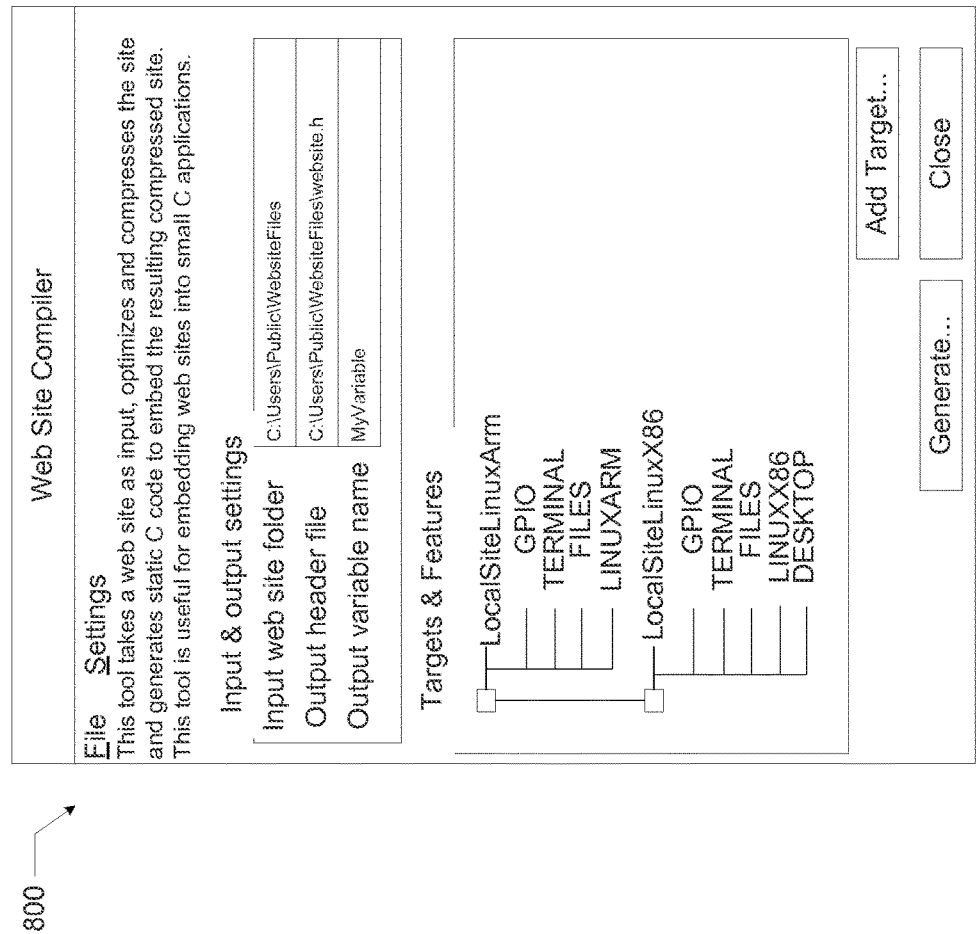
FIG. 8 depicts an illustrative graphical user interface for a tool that generates a header file that contains one or more data sets representative of a web page for respective platforms, in accordance with various embodiments.

In some embodiments, the developer computing device 106 may provide a graphical user interface for a user of the developer computing device 106 to define platforms and their associated supported features, and specify the platform or platforms for which data sets representative of web pages should be generated. FIG. 8 depicts an illustrative graphical user interface 800 for a tool that generates a header file that contains one or more data sets representative of a web page for respective platforms, in accordance with various embodiments. The graphical user interface 800 allows the user to specify a folder that contains the files associated with the web page to be processed, a name and location for a header file that will store the output, a variable name for the output, and one or more target platforms and associated supported features for each platform. Once the user has specified the desired characteristics, the user may click the "Generate" button to cause the tool to merge the web site files, pre-process the files in accordance with the supported features for the selected target platform(s), optimize the files by minification, compress the files (e.g., via gzip), and embed the web site into a header file for later use with C code.

Figure 9:
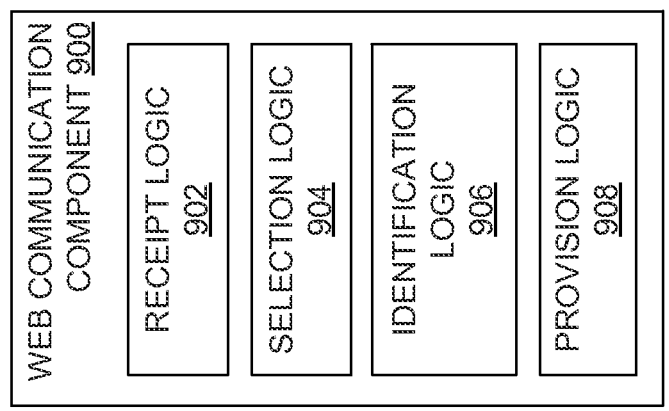
FIG. 9 is a block diagram of an illustrative web communication component that may be included in a web server of the computing system of FIG. 1, in accordance with various embodiments.

A web server receiving a file including multiple representations of a web page for different platforms may be configured to identify the appropriate representation for its own platform and to serve that representation in response to a request for the web page. FIG. 9 is a block diagram of a web communication component 900 that may be included in a web server of the computing system 100, in accordance with various embodiments. In particular, the web communication component 900 may serve as the web communication component 120 of the web server 110 in some embodiments (and will be discussed as such below for illustrative purposes).

The web communication component 900 may include receipt logic 902, selection logic 904, identification logic 906, and provision logic 908. The receipt logic 902 may be configured to receive, from a computing device (e.g., the first computing device 102), a request for a web page (such as an HTML web page).

The selection logic 904 may be configured to select an identifier of a platform of the web server 110 from multiple such identifiers stored in the storage device 130 of the web server 110. Identifiers of different platforms may take the forms illustrated in FIG. 4 for the values in the platform field 402, for example. In some embodiments, the identifiers may take the form of different arguments to #if defined statements in a header file, as discussed above with reference to FIG. 7. For example, the web server 110 may have a header file that identifies two platforms, PHONE and TABLET, and the selection logic 904 may select which of the two platforms is the platform of the web server 110.

The identification logic 906 may be coupled to the receipt logic 902, and may be configured to identify a compressed data set representative of the requested web page based at least in part on the identifier of the platform of the web server selected by the selection logic 904. In other words, upon selection by the selection logic 904 of an identifier of the platform of the web server 110, the identification logic 906 may identify a corresponding compressed data set representative of the requested web page. As used herein, a "compressed" data set may refer to a data set that has undergone a standard compression operation, such as gzip. Thus, in some embodiments, the compressed data set may be a block of gzip data or a gzip file. In some embodiments, the identification logic 906 may identify a compressed data set by loading a variable from a header file into memory, as discussed above with reference to FIG. 7.

The provision logic 908 may be coupled to the identification logic 906, and may be configured to provide, in response to the request for the web page, the compressed data set identified by the identification logic 906. A web browser of the computing device that requested the web page may be configured to decompress the compressed data set to display the requested web page. For example, decompressing the compressed data set may yield an HTML file that can then be displayed by the web browser.

In some embodiments, decompressing the compressed data set may yield the third data set provided by the provision logic 208 of the web communication component 200 to the web server 110, as discussed above with reference to FIGS. 2-6. Thus, for example, in some embodiments, the compressed data set, when decompressed, may include an inline representation of an image, or may be an HTML file without carriage returns. In some embodiments, decompressing the compressed data set may not necessarily result in a human-readable representation of the web page. For example, in some embodiments, the compressed data set may be a hexadecimal encoding of an HTML file.

In some embodiments, the compressed data set may be stored in Random Access Memory (RAM) of the web server 110 prior to identification by the identification logic 906 and provision by the provision logic 908. Such an embodiment is to be contrasted with enterprise-scale web server operation, in which web page files (e.g., HTML and image files) are stored on a hard disk because of their size. Even when enterprise web servers utilize a RAM cache, the purpose and design of such caches is to accommodate the browser that receives the data. In various ones of the embodiments disclosed herein, the purpose and design of RAM storage of the compressed data set is to accommodate the server (e.g., so that it has to do fewer CPU and I/O intensive tasks and thus is able to serve content with fewer resources).

By storing a compressed representation of a web page in RAM, the web server 110 can more quickly retrieve and serve the compressed representation than a conventional web server could with a conventional representation of a web page.

FIG. 10 is a flow diagram of an illustrative process 1000 for web communication that may be performed by a developer computing device of the computing system 100, in accordance with various embodiments. The process 1000 is discussed herein as performed by the developer computing device 106 in communication with the web server 110, but the process 1000 may be performed by and with any suitable computing device. The operations of the method 1000 (and the other methods described herein), although depicted as performed in a particular sequence for the sake of illustration, may be performed in parallel as suitable or in any other order. Any of the operations of the method 1000 (and the other methods described herein) may be performed in accordance with any of the embodiments of the computing system 100 described herein.

At 1002, the developer computing device 106 (e.g., the receipt logic 202) may receive a first data set representative of a web page, wherein the first data set includes a portion that is associated with a platform feature not supported by a platform of a web server that is to serve the web page (e.g., the web server 110).

At 1004, the developer computing device 106 (e.g., the removal logic 204) may generate a second data set by removing the portion from the first data set.

At 1006, the developer computing device 106 (e.g., the minification logic 206) may generate a third data set by performing at least one minification operation on the second data set (generated at 1004) to reduce the size of the second data set.

At 1008, the developer computing device 106 (e.g., the provision logic 208) may provide the third data set to the web server (e.g., the web server 110). The web server may be configured to provide the third data set to a computing device in response to a request, to the web server from the computing device, for the web page. The process 1000 may then end.

FIG. 11 is a flow diagram of an illustrative process 1100 for web communication that may be performed by a web server of the computing system 100, in accordance with various embodiments. The process 1100 is discussed herein as performed by the web server 110 in communication with the first computing device 102, but the process 1100 may be performed by and with any suitable computing device.

At 1102, the web server 110 may store a plurality of identifiers of a corresponding plurality of platforms in a storage device (e.g., the storage device 126). In some embodiments, the storage of a plurality of identifiers may include the storage of a header file.

At 1104, the web server 110 (e.g., the receipt logic 902) may receive, from a computing device (e.g., the first computing device 102) a request for an HTML web page.

At 1106, the web server 110 (e.g., the selection logic 904) may select an identifier of a platform of the web server 110 from the stored plurality of identifiers (stored at 1102).

At 1108, the web server 110 (e.g., the identification logic 906) may identify a compressed data set representative of the web page, with the identification based at least in part on the identifier of the platform of the web server (selected at 1106).

At 1110, the web server 110 (e.g., the provision logic 908) may provide, in response to the request (received at 1104) the compressed data set (identified at 1108) to the computing device. A web browser of the computing device may be configured to decompress the compressed data set to display the web page. The process 1100 may then end.

The embodiments discussed below with reference to FIGS. 12-20 may facilitate the selection of TURN servers in WebRTC environments to improve performance. Any of these embodiments may be combined with any other embodiment disclosed herein, as suitable.

As noted above, when UDP traffic can't be directly routed between endpoints, a TURN server may be used as a relay. Relaying introduces additional complexity and delay into a communication pathway (especially when a TCP control channel is used), but locating the TURN server near one of the endpoints (and using a TURN server that is fast) may reduce this burden. Typically, the selection of a TURN server for a particular web application is statically encoded in the web application, and may not be the best available TURN server at the time of use.

Various embodiments, discussed in detail below with reference to FIGS. 12-20, may improve upon conventional techniques by measuring the latency of communication links between relay servers (e.g., TURN servers) and browsers in a WebRTC system, and storing that information to use when selecting a relay server to facilitate a WebRTC connection. In some embodiments, a TURN server may include multiplexed HTTP/TURN capability to allow web applications to send Asynchronous JavaScript and Extensible Markup Language (AJAX) queries to the TURN server. The web application may report, to a web server, data representative of the latency of the TURN server in responding to the AJAX query. The latency data may also be reported to the TURN server (e.g., via a browser of a computing device that sends the AJAX query). The latency data accumulated by the browsers, web servers, and TURN servers may be used to improve TURN configuration in WebRTC dynamically.

Figure 12:
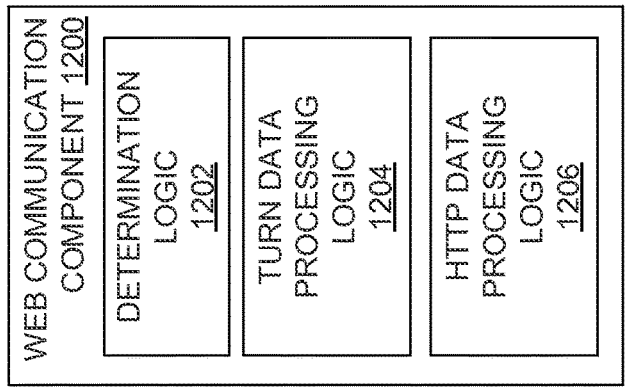
FIG. 12 is a block diagram of an illustrative web communication component that may be included in a relay server of the computing system of FIG. 1, in accordance with various embodiments.

FIG. 12 is a block diagram of an illustrative web communication component 1200 that may be included in a relay server of the computing system 100, in accordance with various embodiments. In particular, the web communication component 1200 may serve as the web communication component 118 of the relay server 108 in some embodiments (and will be discussed as such below for illustrative purposes).

The web communication component 1200 may include determination logic 1202, TURN data processing logic 1204, and HTTP data processing logic 1206. The determination logic 1202 may be coupled to a network port of the relay server 108 and may be configured to determine whether data incoming to the network port from a web browser (e.g., of the first computing device 102) is TURN data or HTTP data. Such a "multiplexed" network port may be referred to herein as a TURN/HTTP network port. In some embodiments, the TURN/HTTP port may be TCP and UDP port 3478. In some embodiments, the determination logic 1202 may be configured to determine whether the incoming data is TURN data or HTTP data by analyzing one or more bytes of the data initially received (e.g., the first bytes of the data stream).

The TURN data processing logic 1204 may be coupled to the determination logic 1202 and may be configured to process data incoming to the network port of the relay server 108 in response to a determination by the determination logic 1202 that the incoming data is TURN data.

The HTTP data processing logic 1206 may be coupled to the determination logic 1202 and may be configured to process data incoming to the network port of the relay server 108 in response to a determination by the determination logic 1202 that the incoming data is HTTP data.

The HTTP data processing logic 1206 may be configured to recognize a predetermined Asynchronous JavaScript and Extensible Markup Language (AJAX) query. AJAX refers to a set of client-side techniques for sending data to and retrieving data from a server in the background, and may include HTML, Extensible HTML (XHTML), CSS, Document Object Model (DOM), Extensible Markup Language (XML), Extensible Stylesheet Language Transformations (XSLT), and JavaScript.

In response to identification of the predetermined AJAX query, the HTTP data processing logic 1206 may be configured to generate a response for provision to the web browser. In some embodiments, the response may include an Internet Protocol (IP) address of the web browser.

In some embodiments, the response may include instructions to the web browser to send a specified number of AJAX queries to the relay server 108. The response may also include a sequence number for each of the specified number of AJAX queries.

The HTTP data processing logic 1206 may be configured to calculate a latency of communication between the web browser of the first computing device 102 and the relay server 108 based at least in part on the response of the web browser to the AJAX query instructions generated by the HTTP data processing logic 1206.

Figure 13:
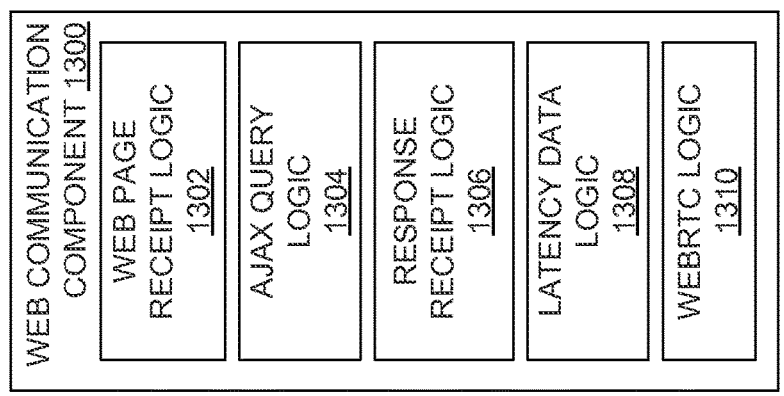
FIG. 13 is a block diagram of an illustrative web communication component that may be included in a computing device of the computing system of FIG. 1, in accordance with various embodiments.

FIG. 13 is a block diagram of an illustrative web communication component 1300 that may be included in a computing device of the computing system 100, in accordance with various embodiments. In particular, the web communication component 1300 may serve as the web communication component 112 of the first computing device 102 in some embodiments (and will be discussed as such below for illustrative purposes).

The web communication component 1300 may include web page receipt logic 1302, AJAX query logic 1304, response receipt logic 1306, latency data logic 1308, and WebRTC logic 1310.

The web page receipt logic 1302 may be configured to receive a web page from the web server 110. The web page may include instructions for the first computing device 102 to perform at least one AJAX query on the TURN/HTTP network port of the relay server 108. In some embodiments, the at least one AJAX query may include multiple AJAX queries.

The AJAX query logic 1304 may be coupled with the web page receipt logic 1302, and may be configured to perform the at least one AJAX query on the network port of the relay server 108.

The response receipt logic 1306 may be coupled with the web page receipt logic 1302, and may be configured to receive a corresponding at least one response, from the relay server 108, to the at least one AJAX query performed by the AJAX query logic 1304. When the at least one AJAX query includes multiple AJAX queries, the at least one response may include corresponding multiple responses. In some embodiments, the at least one response may include instructions to the first computing device 102 to send a specified number of subsequent AJAX queries to the relay server 108, and may further specify a sequence number for each of the specified number of AJAX queries.

The latency data logic 1308 may be coupled with the response receipt logic 1306, and may be configured to generate latency data for provision to the web server 110. The latency data logic 1308 may generate the latency data based at least in part on the at least one response from the relay server 108 to the at least one AJAX query. For example, the latency data logic 1308 may include the average time for the relay server 108 to respond to the at least one AJAX query. This averaging may be taken over all queries, or only some queries (e.g., averaged over all but the first query).

In embodiments in which the response from the relay server 108 includes instructions to the first computing device 102 to send a specified number of subsequent AJAX queries, the latency data logic 1308 may generate latency data by receiving relay server latency data from the relay server 108 (generated by the relay server 108 based on the subsequent AJAX queries). The latency data logic 1308 may further format at least some of the relay server latency data for provision to the web server 110.

In some embodiments, the web server 110 may be configured to store the latency data in a storage device (e.g., the storage device 130) for use in selecting a TURN server for WebRTC communication between the first computing device 102 and another computing device (e.g., the second computing device 104).

Figure 14:
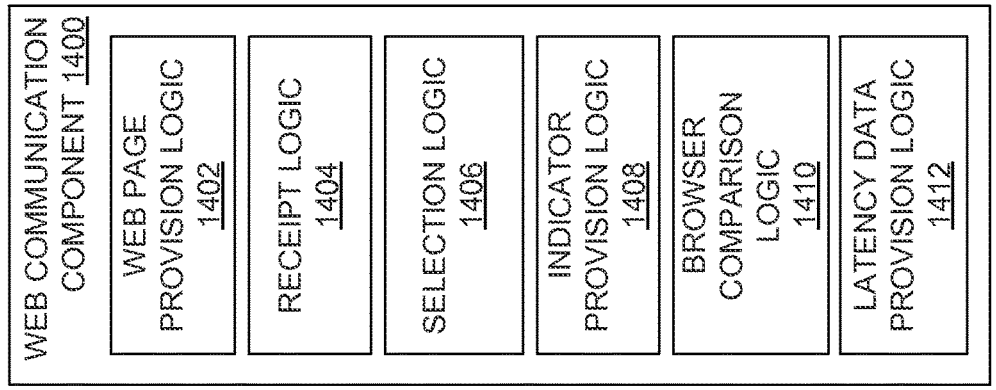
FIG. 14 is a block diagram of an illustrative web communication component that may be included in a web server of the computing system of FIG. 1, in accordance with various embodiments.

FIG. 14 is a block diagram of an illustrative web communication component 1400 that may be included in a web server of the computing system 100, in accordance with various embodiments. In particular, the web communication component 1400 may serve as the web communication component 120 of the web server 110 in some embodiments (and will be discussed as such below for illustrative purposes).

The web communication component 1400 may include web page provision logic 1402, receipt logic 1404, selection logic 1406, indicator provision logic 1408, browser comparison logic 1410, and latency data provision logic 1412. The web page provision logic 1402 may be configured to provide a web page to the web browser of the first computing device 102. The web page provided by the web page provision logic 1402 may include instructions for the web browser to perform at least one AJAX query on the TURN/HTTP network port of the relay server 108.

The receipt logic 1404 may be coupled to the web page provision logic 1402, and may be configured to receive, from the web browser of the first computing device 102, data representative of a latency between the web browser and the relay server 108. The data may be based at least in part on performance by the web browser of the instructions in the web page (provided by the web page provision logic 1402).

In some embodiments, the receipt logic 1404 may be configured to store the data representative of latency between the web browser and the relay server 108 in a data structure in a storage device (e.g., the storage device 130).

In some embodiments, the web page provision logic 1402 and the receipt logic 1404 may be configured to perform the operations with respect to multiple relay servers, and the data structure in the storage device may store data representative of latencies between the web browser of the first computing device 102 and these multiple relay servers. In such embodiments, the selection logic 1406 may be coupled with the storage device (e.g., the storage device 130) that stores latency data, and may be configured to select one of the relay servers based on the stored data representative of latency. For example, the selection logic 1406 may select the relay server that has the smallest latency with the first computing device 102.

The indicator provision logic 1408 may be coupled with a storage device (e.g., the storage device 130) that stores latency data, and may be configured to provide an indicator of the relay server 108 to the web browser of the first computing device 102. The indicator may indicate that the relay server 108 is a candidate TURN server for establishing a WebRTC communication between the web browser and another computing device (e.g., the second computing device 104 or any other browser). In some embodiments, the relay server indicated by the indicator provision logic 1408 may be the relay server selected by the selection logic 1406.

The browser comparison logic 1410 may be coupled with a storage device (e.g., the storage device 130) that stores latency data, and may be configured to determine that a second web browser is in a same subnet as the web browser of the first computing device 102. If the storage device does not include data indicative of the latency between the second web browser and one or more relay servers, the browser comparison logic 1410 may be used to determine whether the second web browser is in a same subnet as a web browser for which there is data stored in the storage device; if a second web browser is in the same subnet, the latency between the second web browser and various relay servers may be similar to the latency between the web browser of the first computing device 102 and the various relay servers, and thus the latency data for the web server of the first computing device 102 may be used to inform the selection of a relay server for communications with the second web browser. In such embodiments, the selection logic 1406 may select one of the relay servers for communication with the second web browser based on the stored data representative of latency with the web browser of the first computing device 102. For example, the selection logic 1406 may select, for communication with the second web browser, the relay server that has the smallest latency with the first computing device 102. Further, the indicator provision logic 1408 may be configured to provide an indicator of the selected relay server to the second web browser.

The latency data provision logic 1412 may be coupled with a storage device (e.g., the storage device 130) that stores latency data, and may be configured to provide the web browser-relay server latency data to the relay server 108.

Figure 15:
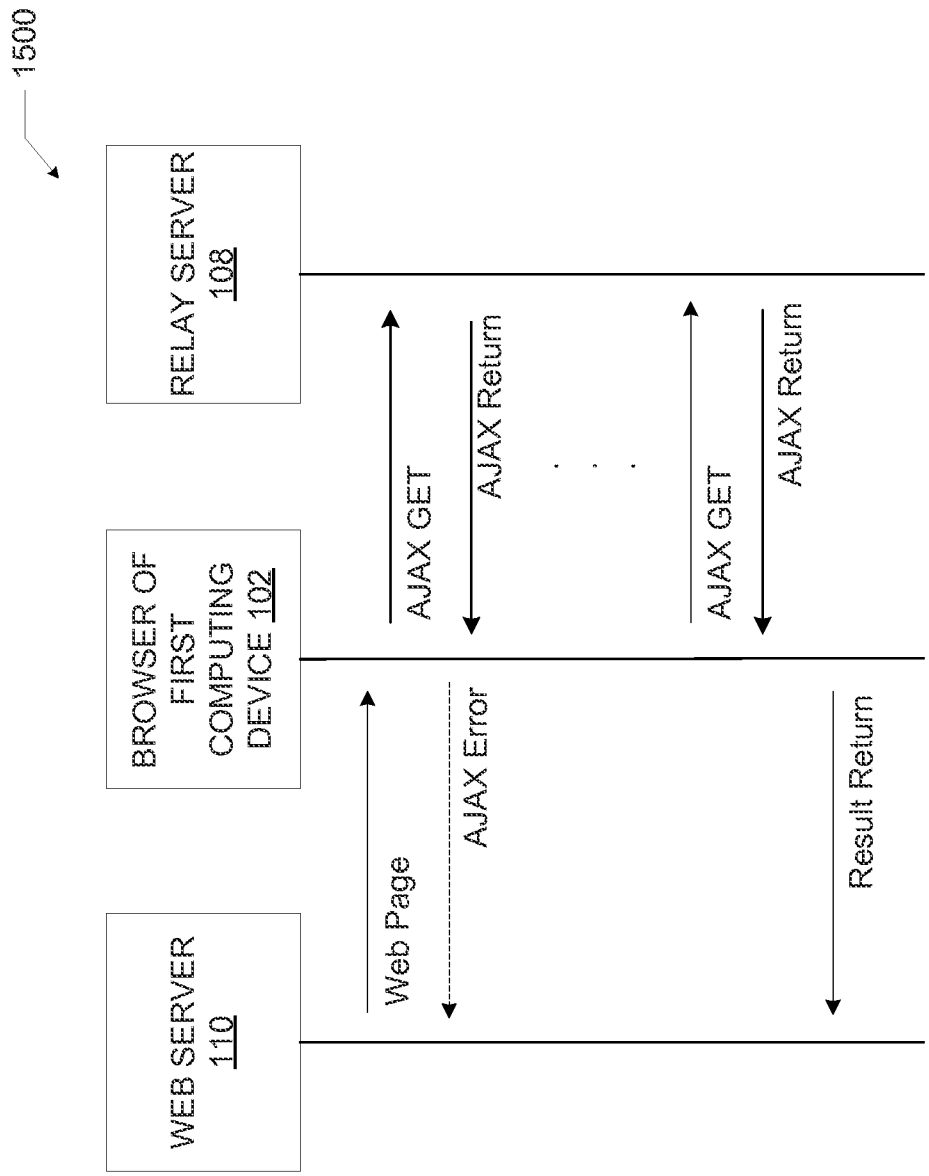
FIGS. 15 and 16 are signal flow diagrams of illustrative processes for web communication between a web server, a computing device, and a relay server of the computing system of FIG. 1, in accordance with various embodiments.
Figure 16:
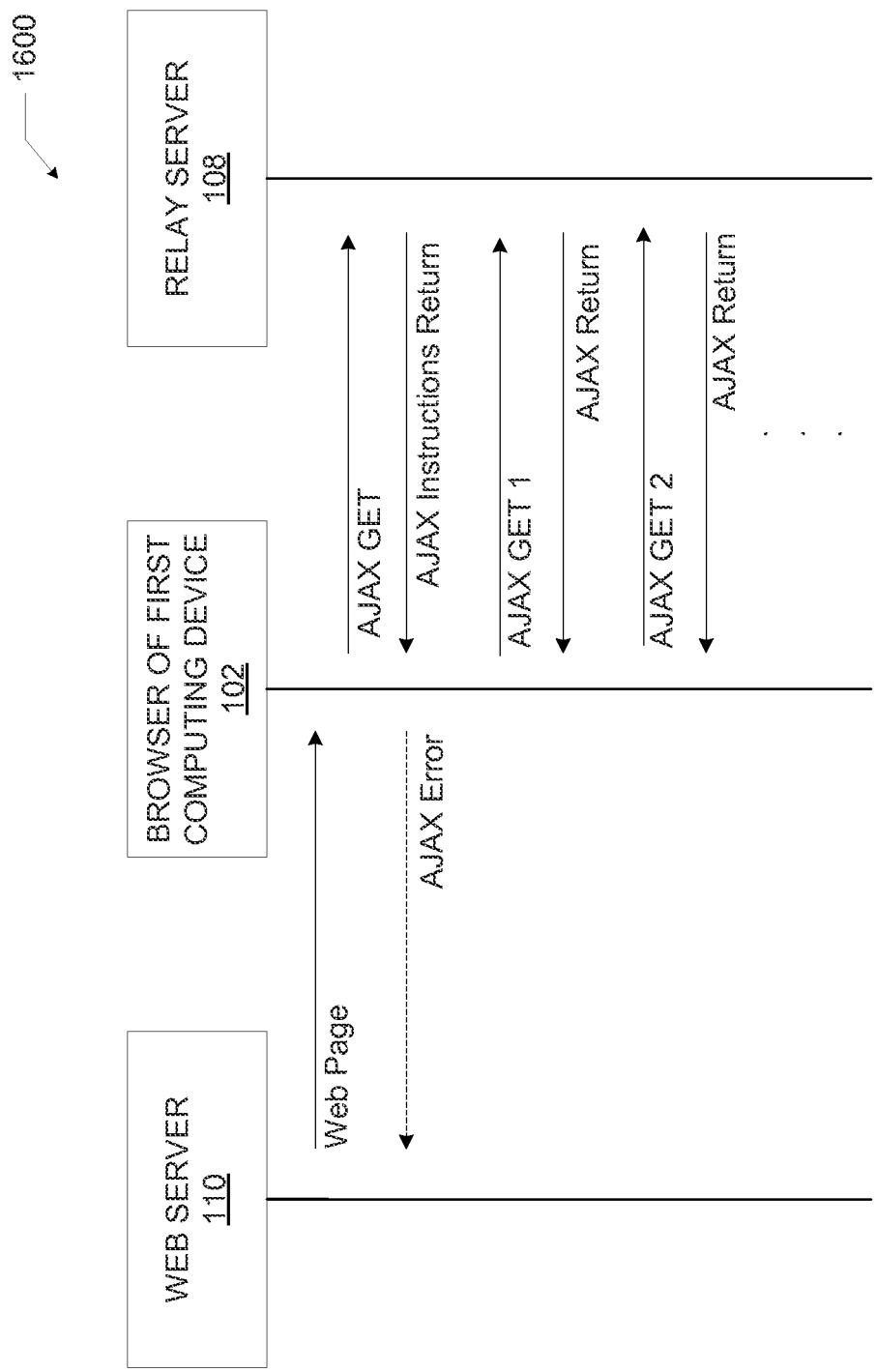

FIGS. 15 and 16 are signal flow diagrams of illustrative processes 1500 and 1600, respectively, for web communication between a web server, a computing device, and a relay server of the computing system 100, in accordance with various embodiments. The processes 1500 and 1600 are illustrated in FIGS. 15 and 16, respectively, for web communication between the web server 110, the first computing device 102, and the relay server 108 (configured with the web communication components 1200, 1300, and 1400, respectively), but the processes 1500 and 1600 may be performed by any suitable computing devices.

In the processes 1500 and 1600, the web server 110 may provide a web page to a web browser of the first computing device 102. The web page may include JavaScript code that causes the browser to perform an AJAX query (such as GET) on the TURN/HTTP network port of the relay server 108 to check for both connectivity and latency. In the processes 1500 and 1600, multiple AJAX queries (e.g., 5 or 10 HTTP GET requests) may be made for more accuracy. If the web browser is not able to reach the relay server 108, the web browser may return an error code to the web server 110. The processes 1500 and 1600 may differ in what entity controls the number of AJAX queries and what entity collects the latency data.

In the process 1500, the browser of the first computing device 102 may perform an AJAX query of the relay server 108, receive a response, and then perform another AJAX query of the relay server 108 (up to a number specified in the web page). The browser of the first computing device 102 may then compute the average time taken to get a response, and may provide that information to the web server 110. This may provide an indication of the latency of data transmission from the browser to the relay server 108.

In the process 1600, the browser of the first computing device 102 may perform a first AJAX query of the relay server 108, and the relay server 108 may respond with instructions for the browser of the first computing device 102 on how many subsequent AJAX queries to make in what sequence numbers to use for each query. The web browser of the first computing device 102 may then make subsequent AJAX queries in accordance with the instructions from the relay server 108. The relay server 108 may then perform the latency measurements based on the AJAX queries and responses. Because most of the AJAX queries in the process 1600 are controlled by the relay server 108, the JavaScript code that is included in the web page provided to the browser by the web server 110 may be simpler. Additionally, if a malicious agent attempts to tamper with the relay server-browser latency measurements, the attempt will be unsuccessful because the malicious agent does not know what sequence numbers are being used.

In some embodiments, when the relay server 108 responds to an AJAX query, the relay server 108 may respond with the external IP address that the browser is using. The web browser may then provide this information to the web server 110 (e.g., in accordance with instructions provided in the web page). Typically, the external IP address of the browser to a web server into a relay server is the same, but if the browser is multi-homes, the IP addresses could be different. The web server 110 may be configured to record this information.

In some embodiments, the storage device 128 of the relay server 108, the storage device 130 of the web server 110, and/or the storage device 122 of the first computing device 102 may be used to store data representative of a measured latency between the web browser of the first computing device 102 and the relay server 108. This measured latency, as discussed above, may be based at least in part on communications between the web browser and the TURN/HTTP network port of the relay server 108. In some embodiments, this data may be stored in a database that reflects connectivity and latency measurements of many locations (e.g., web browsers on computing devices) to each relay server, and may enable the quick determination of which relay server to use when establishing a WebRTC connection.

For example, FIG. 17 illustrates a data structure 1700 that may be used to store source device, target device, and latency data for web communications, in accordance with various embodiments. The data structure 1700 may be used to organize data in a storage device (e.g., the storage device 130 or the storage device 128). The data structure 1700 includes a source field 1702, a relay server field 1704, and a latency field 1706 for one or more entries (e.g., the entries 1708-1712 illustrated in FIG. 17). The source field 1702 may take values that identify different endpoints for a WebRTC connection (e.g., a computing device or a browser on a computing device). The relay server field 1704 may take values that identify different relay servers that may be used to facilitate such a WebRTC connection. The latency field 1706 includes data representative of the latency between the source and the relay server in the corresponding fields 1702 and 1704. As discussed above, if a relay server is to be selected for a new endpoint, the data structure 1700 may be evaluated to determine whether there are any existing endpoints in the same subnet as the new endpoint (e.g., the new endpoint 192.168.1.52 may be in the same subnet as the endpoint 192.168.1.14 when the subnet mask is 255.255.255.0). The latency data of the field 1706 is shown in milliseconds, but any one or more metrics may be used.

FIG. 18 is a flow diagram of an illustrative process 1800 for web communication that may be performed by a relay server of the computing system of FIG. 1, in accordance with various embodiments. The processes 1500 and 1600 of FIGS. 15 and 16, respectively, may include examples of the process 1800. The process 1800 is discussed herein as performed by the relay server 108 in communication with the first computing device 102, but the process 1800 may be performed by and with any suitable computing device.

At 1802, the relay server 108 (e.g., the determination logic 1202) may determine whether first data incoming to a TURN/HTTP network port of the relay server 108 from a web browser of the first computing device 102 is TURN data or HTTP data.

At 1804, the relay server 108 (e.g., the TURN data processing logic 1204) may process the first data in accordance with a TURN protocol in response to a determination that the first data is TURN data.

At 1806, the relay server 108 (e.g., the determination logic 1202) may determine whether second data incoming to a TURN/HTTP network port of the relay server 108 from the web browser of the first computing device 102 is TURN data or HTTP data.

At 1808, the relay server 108 (e.g., the HTTP data processing logic 1206) may process the second data in accordance with an HTTP protocol in response to a determination that the second data is HTTP data. The process 1800 may then end.

FIG. 19 is a flow diagram of an illustrative process 1900 for web communication that may be performed by a computing device of the computing system 100, in accordance with various embodiments. The processes 1500 and 1600 of FIGS. 15 and 16, respectively, may include examples of the process 1900. The process 1900 is discussed herein as performed by the first computing device 102 in communication with the relay server 108 and the web server 110, but the process 1900 may be performed by and with any suitable computing device.

At 1902, the first computing device 102 (e.g., the web page receipt logic 1302) may receive a web page from the web server 110. The web page may include instructions for a web browser of the first computing device 102 to perform at least one AJAX query on a TURN/HTTP network port of the relay server 108.

At 1904, the first computing device 102 (e.g., the AJAX query logic 1304) may perform the at least one AJAX query on the TURN/HTTP network port.

At 1906, the first computing device 102 (e.g., the response receipt logic 1306) may receive a corresponding at least one response, from the relay server 108, to the at least one AJAX query (performed in 1904).

In 1908, the first computing device 102 (e.g., the latency data logic 1308) may generate latency data for provision to the web server 110. The latency data may be based at least in part on the at least one response received at 1906. The process 1900 may then end.

Figure 20:
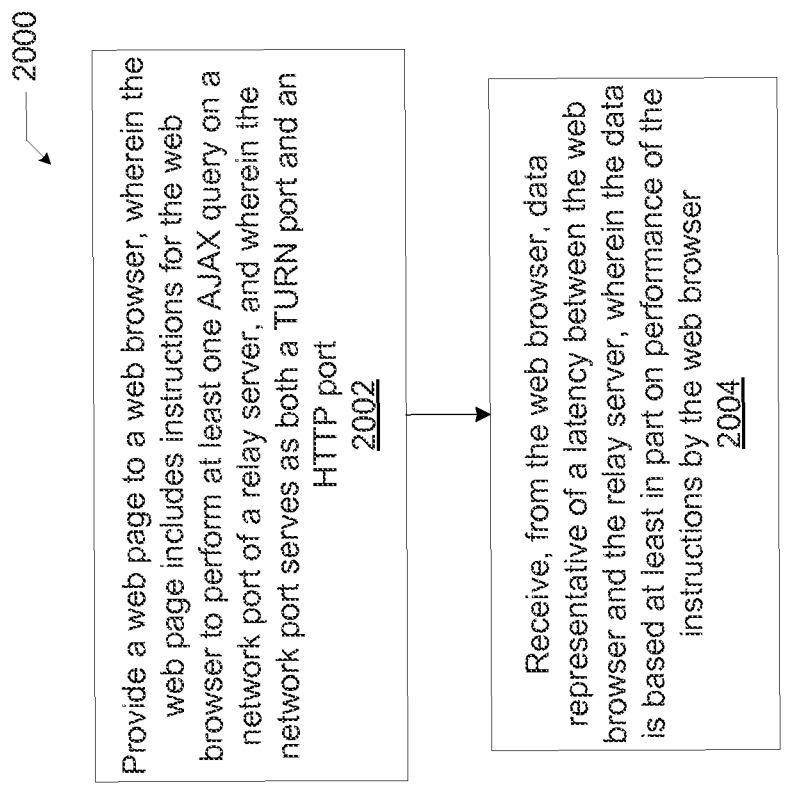
FIG. 20 is a flow diagram of an illustrative process for web communication that may be performed by a web server of the computing system of FIG. 1, in accordance with various embodiments.

FIG. 20 is a flow diagram of an illustrative process 2000 for web communication that may be performed by a web server of the computing system 100, in accordance with various embodiments. The processes 1500 and 1600 of FIGS. 15 and 16, respectively, may include examples of the process 2000. The process 2000 is discussed herein as performed by the web server 110 in communication with the first computing device 102, but the process 2000 may be performed by and with any suitable computing device.

At 2002, the web server 110 (e.g., the web page provision logic 1402) may provide a web page to a web browser of the first computing device 102. The web page may include instructions for the web browser to perform at least one AJAX query on a TURN/HTTP network port of the relay server 108.

At 2004, the web server 110 (e.g., the receipt logic 1404) may receive, from the web browser, data representative of a latency between the web browser and the relay server 108. The data may be based at least in part on performance of the instructions by the web browser. The process 2000 may then end.

The embodiments discussed below with reference to FIGS. 21-25 may improve the performance of candidate discovery in WebRTC communications. Conventionally, the establishment of a WebRTC connection involves the exchange of an offer and answer between two devices, to be followed up with additional candidates. In this context, "candidates" may be possible network interfaces that can be used for communication, and conventional candidate discovery involves each device contacting a STUN server (e.g., the STUN server 152) so that the devices can get information about their own external addresses. The embodiments discussed below with reference to FIGS. 21-25 may achieve the same result without having to communicate with a STUN server, and instead, may use an efficient stateless protocol that reduces WebRTC connection overhead by one network round-trip and simplifies the device's WebRTC stack. This may be accomplished by having a web server send, to a device, an encrypted packet that the device must send back to the server on a specific UDP port. If the server receives a packet, the encrypted data in it tells the server which web browser should get an additional candidate. This approach may remove the need for STUN on the device side, remove one full round-trip from the WebRTC setup, compress the WebRTC offer and answer, and perform server address detection statelessly.

Figure 21:
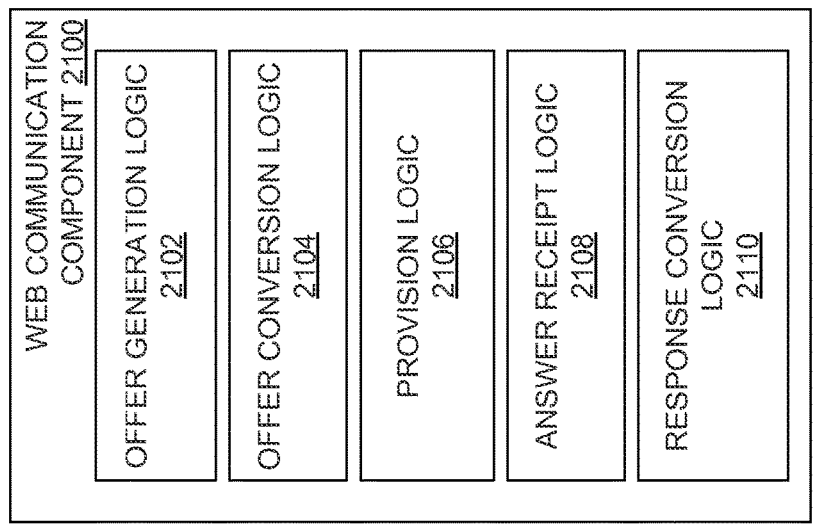
FIG. 21 is a block diagram of an illustrative web communication component that may be included in a computing device of the computing system of FIG. 1, in accordance with various embodiments.

FIG. 21 is a block diagram of an illustrative web communication component 2100 that may be included in a computing device of the computing system 100, in accordance with various embodiments. In particular, the web communication component 2100 may serve as the web communication component 112 of the first computing device 102 in some embodiments (and will be discussed as such below for illustrative purposes).

The web communication component 2100 may include offer generation logic 2102, offer conversion logic 2104, provision logic 2106, answer receipt logic 2108, and response conversion logic 2110.

The offer generation logic 2102 may be configured to generate a WebRTC offer in a first format for establishing WebRTC communication between the first computing device 102 and the second computing device 104 (e.g., a browser of the second computing device 104, or more generally, any other browser). In some embodiments, the first format may be Session Description Protocol (SDP) format.

The offer conversion logic 2104 may be coupled to the offer generation logic 2102, and may be configured to convert the WebRTC offer generated by the offer generation logic 2102 from the first format into a binary block. In some embodiments, the offer conversion logic 2104 may use a JavaScript converter to convert the WebRTC offer in the force format into a binary block. In some embodiments, a size of the binary block may be smaller than a size of the WebRTC offer in the first format. This conversion may be useful for both reducing the amount of data that needs to be transferred (especially when data quotas are in effect, such as with common cellular data agreements), but also because the web server 110 is likely to be implemented by software written in the C programming language, and it may be cumbersome to parse text in the C programming language. The web browser of the first computing device 102, however, may readily parse text using JavaScript, and thus the conversion from the first format into binary may be readily performed at the first computing device 102.

The provision logic 2106 may be coupled with the offer conversion logic 2104, and may be configured to provide the binary block to the web server 110. The web server 110 may be configured to subsequently transmit a corresponding offer to the second computing device 104. In some embodiments, the provision logic 2106 may be configured to provide the binary block to the web server 110 using a WebSocket protocol.

The answer receipt logic 2108 to be configured to receive an answer from the web server 110. The answer received by the answer receipt logic 2108 may be in a binary format, and may be provided to the first computing device 102 by the web server 110 in response to receiving an answer from the second computing device 104 to the converted offer.

The response conversion logic 2110 may be coupled with the answer receipt logic 2108, and may be configured to convert the response from binary format into SDP format.

Figure 22:
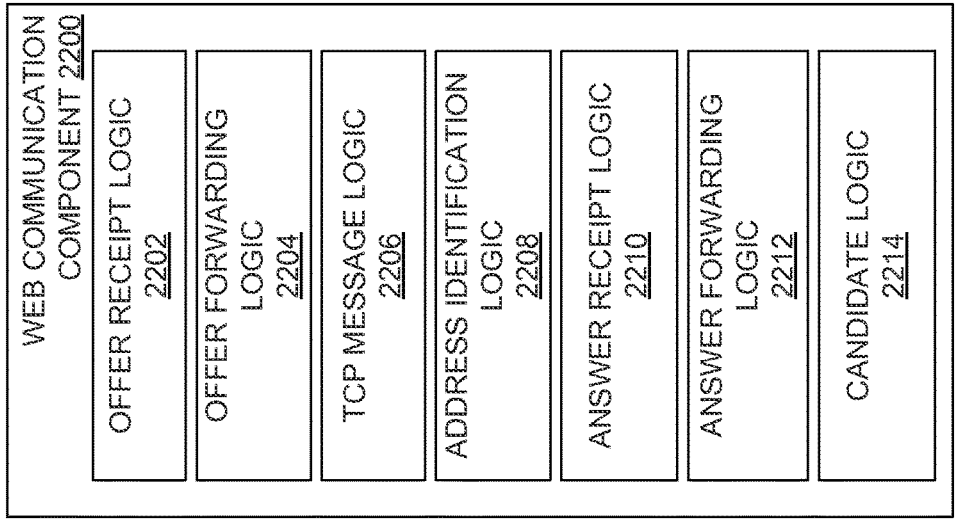
FIG. 22 is a block diagram of an illustrative web communication component that may be included in a web server of the computing system of FIG. 1, in accordance with various embodiments.

FIG. 22 is a block diagram of an illustrative web communication component that may be included in a web server of the computing system 100, in accordance with various embodiments. In particular, the web communication component 2200 may serve as the web communication component 120 of the web server 110 in some embodiments (and will be discussed as such below for illustrative purposes).

The web communication component 2200 may include offer receipt logic 2202, offer forwarding logic 2204, TCP message logic 2206, address identification logic 2208, answer receipt logic 2210, answer forwarding logic 2212, and candidate logic 2214.

The offer receipt logic 2202 may be configured to receive a WebRTC offer from a web browser of the first computing device 102 to the second computing device 104.

The offer forwarding logic 2204 may be coupled with the offer receipt logic 2202, and may be configured to forward the WebRTC offer to the second computing device 104.

The TCP message logic 2206 may be coupled to the offer receipt logic 2202, and may be configured to provide a TCP message to the second computing device 104. The TCP message may include a command that the second computing device 104 send a UDP message to the web server 110. The UDP message may be included in the TCP message. In some embodiments, the UDP message may include an identifier of the web browser of the first computing device 102. In some embodiments, the UDP message may be encrypted using a key known to the web server 110, as discussed further below.

By sending the UDP message in response to the command from the web server 110, the second computing device 104 may communicate the public IP and port of the second computing device 104 to the web server 110. The web server 110 may use this information to contact the second computing device 104. In particular, when the second computing device 104 sends the UDP message, it will cause a router or other intermediate device (e.g., a NAT) to add a UDP port mapping so that the web server 110 can see from what IP address and port the UDP message originated (as discussed below with reference to the address identification logic 2208). The web server 110 may also forward the IP address and port information to the browser of the first computing device 102 in the form of an additional WebRTC candidate (as discussed below with reference to the candidate logic 2214).

In some embodiments, it may be desirable to keep the web server 110 as "stateless" as possible, in that the web server 110 maintains only a small amount of (or no) information about previous events for use in responding to incoming data. In some such embodiments, the UDP message may include all of the data necessary for sending a response back to the browser of the first computing device 102 (so that the web server 110 need not store this data). This data may include, for example, a WebSocket identifier of the browser of the first computing device 102. The UDP message may also be authenticated (e.g., using HMAC-SHA256) and encrypted (e.g., using AES128-CBC) using a randomized key only known to the web server 110. The UDP message may also include an anti-relay token. Upon receipt of the UDP message, the web server 110 may authenticate and decrypt the message, then use the information in the message to send the added candidate to the browser of the first computing device 102.

The address identification logic 2208 may be configured to identify an IP address and port for the second computing device 104 based on the UDP message sent by the second computing device 104 to the web server 110 in response to the command included in the TCP message. In some embodiments, the address identification logic 2208 may identify the IP address and port for the second computing device 104 by identifying a public address for the second computing device 104 and stored as a UDP port mapping in an intermediate device (e.g., a NAT or proxy barrier) located between the web server 110 and the second computing device 104.

The answer receipt logic 2210 may be configured to receive a WebRTC answer from the second computing device 104 in response to receipt, by the second computing device 104, of the WebRTC offer.

The answer forwarding logic 2212 may be coupled to the answer receipt logic 2210, and may be configured to forward the WebRTC answer to the web browser of the first computing device 102.

The candidate logic 2214 may be coupled to the address identification logic 2208, and may be configured to send additional candidate information to the web browser of the first computing device 102. The additional candidate information may include the IP address and port for the second computing device 104.

Figure 23:
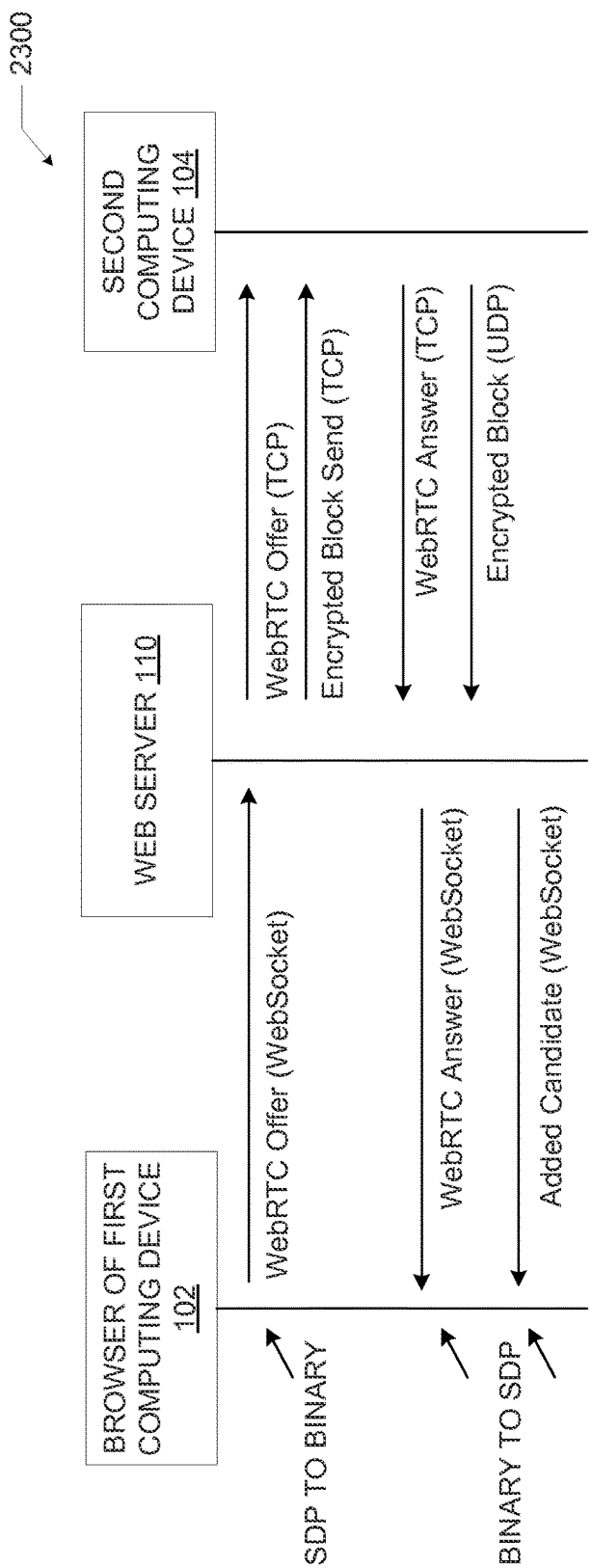
FIG. 23 is a signal flow diagram of an illustrative process for web communication between a web server, a first computing device, and a second computing device of the computing system of FIG. 1, in accordance with various embodiments.

FIG. 23 is a signal flow diagram of an illustrative process 2300 for web communication between a web server, a first computing device, and a second computing device of the computing system 100, in accordance with various embodiments. The process 2300 is illustrated in FIG. 23 for web communication between the first computing device 102, the web server 110, and the second computing device 104, but the process 2300 may be performed by any suitable computing devices.

In the process 2300, the browser of the first computing device 102 may convert a WebRTC offer for communication with the second computing device 104 from SDP into binary, and then may send the converted offer to the web server 110 via WebSockets. The web server 110 may receive the WebRTC offer from the web browser of the first computing device 102, and may add an extra command instructing the second computing device 104 to send a UDP packet back to the web server one or more times on a specific IP address and port. The offer and extra command are labeled "Encrypted Block Send (TCP)" in FIG. 23. This UDP packet may be identically included in the command, so the second computing device 104 simply takes the data from the command and sends it to the specified IP address and port without any modifications.

Once both the WebRTC offer and the extra command reach the second computing device 104, the second computing device 104 may respond to the web server 110 with a WebRTC answer to be transmitted back to the browser of the first computing device 102. After sending the WebRTC answer, the second computing device 104 may execute the UDP send command and send a series of identical UDP packets back to the web server 110 (labeled "Encrypted Block (UDP)" in FIG. 23).

Upon receipt of the WebRTC answer, the web server 110 may forward the answer to the browser of the first computing device 102. Upon receipt of the UDP packets, the web server 110 may decode the incoming UDP packets and use data from the incoming UDP packets to send additional candidate information to the browser of the first computing device 102. For example, the web server 110 may determine that the second computing device 104 has a public IP:port of 45.62.16.76:5922, and may send this address to the browser of the first computing device 102 as an additional candidate. The added candidates and the WebRTC answer may arrive at the browser of the first computing device 102 in any order.

FIG. 24 is a flow diagram of an illustrative process 2400 for web communication that may be performed by a computing device of the computing system 100, in accordance with various embodiments. The process 2300 of FIG. 23 may include an embodiment of the process 2400. The process 2400 is discussed herein as performed by the first computing device 102 in communication with the web server 110 and the second computing device 104, but the process 2400 may be performed by and with any suitable computing device.

At 2402, the first computing device 102 (e.g., the offer generation logic 2102) may generate a WebRTC offer in a first format for establishing WebRTC communication between the first computing device 102 and the second computing device 104.

At 2404, the first computing device 102 (e.g., the offer conversion logic 2104) may convert the WebRTC offer generated at 2402 from the first format into a binary block.

At 2406, the first computing device 102 (e.g., the provision logic 2106) may provide the binary block to the web server 110. The web server 110 may be configured to transmit a corresponding offer to the second computing device 104. The process 2400 may then end.

FIG. 25 is a flow diagram of an illustrative process 2500 for web communication that may be performed by a web server of the computing system of FIG. 1, in accordance with various embodiments. The process 2300 of FIG. 23 may include an embodiment of the process 2500. The process 2500 is discussed herein as performed by the web server 110 in communication with the first computing device 102 and the second computing device 104, but the process 2500 may be performed by and with any suitable computing device.

At 2502, the web server 110 (e.g., the offer receipt logic 2202) may receive a WebRTC offer from a browser of the first computing device 102 to the second computing device 104.

At 2504, the web server 110 (e.g., the offer forwarding logic 2204) may forward the WebRTC offer to the second computing device 104.

At 2506, the web server 110 (e.g., the TCP message logic 2206) may provide a TCP message to the second computing device 104. The TCP message may include a command that the second computing device 104 is to send a UDP message to the web server 110. The UDP message may be included in the TCP message.

At 2508, the web server 110 (e.g., the address identification logic 2208) may identify an IP address and port for the second computing device 104 based on the UDP message sent by the second computing device 104 to the web server 110 in response to the command of 2506. The process 2500 may then end.

Various embodiments discussed below with reference to FIGS. 26-29 may provide improved arrangements of relay servers (e.g., TURN servers in a WebRTC system) and techniques for selecting which relay servers to use for communication between particular endpoints. In particular, techniques are disclosed for federating relay servers in different locations so that traffic routing is efficient and offers an improved user experience. In some embodiments, when relay servers in different geographical locations are configured, the servers may be communicatively connected so as to be able to inventory the location, current load, and available bandwidth for each other and make dynamic selections of the appropriate relay servers for various applications (e.g., on a per-browser basis). In conventional approaches, a single relay server (e.g., a single TURN server) may be set up and used for a particular web application. As discussed above, this approach may be extremely inefficient when the endpoints are far from the single relay server. For example, two computers in India would normally have a short direct round-trip time, but if one of the WebRTC endpoints requires a TURN server that is located in the U.S., the traffic must go to the U.S. and back, resulting in a poor user experience.

FIGS. 26 and 27 illustrate two techniques for federating relay servers: a star configuration and a mesh configuration, respectively. In each technique, multiple relay servers may be connected and configured to share location and bandwidth/load information. This information may be input to any suitable algorithm for determining what configuration of relay servers to give to any specific web application (e.g., any specific requesting browser). In some embodiments, each relay server in the configurations discussed with reference to FIGS. 26 and 27 may give out a security token at regular intervals (e.g., every 10 or 15 minutes) that allows the web server 110 (in communication with the relay server) to generate an authentication username and password pair that can be used by a browser to access the capabilities of that relay server. In some embodiments, the relay servers may not generate the tokens, and instead, for example, the tokens can be generated by the web server that is giving the token to the browser (provided that the web server knows how to encode the tokens). For example, a web server may specify a predetermined amount of time (a "timeout") in a token, sign the token, and give the token to a web browser. The web browser may then use that token, for the predetermined amount of time, with a relay server that accepts tokens signed by the web server.

The relay servers discussed in FIGS. 26 and 27 may be otherwise conventional TURN servers, for example, or may take the form of any of the embodiments of the relay server 108 disclosed herein.

FIG. 26 illustrates a star configuration 2600 of multiple relay servers that may be included in the computing system 100, in accordance with various embodiments. In the star configuration 2600, a master relay server 2602 is connected to multiple slave relay servers 2604-2610. The master relay server 2602 may be co-located with the web server 110, while the slave relay servers 2604-2610 may be stand-alone servers. The web server 110 may receive browser requests (e.g., from a browser included in the first computing device 102), and may intermittently provide the requesting browser with a relay server configuration (e.g., when the browser requires such a configuration to communicate via WebRTC). In an embodiment in which there is only a single master relay server 2602 and no slave relay servers, the master relay server 2602 is the only relay server available, and thus the web server 110 may return an identifier of the master relay server 2602 to the requesting browser. When slave relay servers (e.g., the slave relay servers 2604-2610) are present, they may be configured to maintain a TCP control connection with the master relay server 2602. These control connections may be used to relay server load and to indicate the presence of the slaves to the master relay server 2602. The master relay server 2602 may store data representative of the loads on the slave relay servers 2604-2610 (e.g., as discussed below with reference to FIG. 28), and the web server 110 may use this data to choose an appropriate relay server arrangement for a requesting browser. For example, the master relay server 2602 may record traffic statistics for each slave relay server 2604-2610 to a database every 15 minutes. In some embodiments, a slave relay server may register with more than one master relay server. In some embodiments, a master relay server may also be a slave relay server to another master. In the star configuration 2600, the connections between the master relay server 2602 and the slave relay servers 2604-2610 may be statically configured by a network administrator.

FIG. 27 illustrates a mesh configuration 2700 of multiple relay servers that may be included in the computing system 100, in accordance with various embodiments. The mesh configuration 2700 includes multiple master relay servers 2702-2710. The master relay servers 2702-2710 may be communicatively coupled using a distributed hash table, such that each master relay server 2702-2710 may be set up anywhere on a computing network (e.g., the Internet) with a list of one or more existing master relay servers. As more servers go online, they connect to one another and form a mesh. In some such embodiments, each master relay server may enforce an upper bound on the number of connections that a master relay server can make to other master relay servers (e.g., at most 20 connections). Master relay servers may discover each other and apply a graph balancing algorithm to statistically balance the overall mesh network (even if none of the master relay servers knows the entire topology), in accordance with known techniques. In the mesh configuration 2700, the connections between the master relay servers may be dynamically configured. In some embodiments, each master relay server 2702-2710 may send authentication tokens and usage data to its neighbors. In some embodiments, each master relay server 2702-2710 may record how much traffic it is relaying (and, when relevant, what master relay server the relayed traffic is for).

FIG. 28 illustrates an example data structure 2800 that may be used to store load data for web communications, in accordance with various embodiments. The data structure 2800 may be used to organize data from a star configuration and/or a mesh configuration in a storage device (e.g., the storage device 130 or the storage device 128), and may be accessed by the web server 110 when selecting a relay server arrangement for a requesting web application. The data structure 2800 includes relay server field 2802, a current master field 2804, a current load field 2806, a previous load 1 field 2808, and a previous load 2 field 2810 for one or more entries (e.g., the entries 2812-2816 illustrated in FIG. 28). The relay server field 2802 may take values that identify different relay servers. The current master field 2804 may take values that identify the master relay server for which the server in the corresponding relay server field 2802 is currently routing traffic. When there is no separate master, this value may be N/A or another suitable value. The current load field 2806 may take values representative of the current load on the server identified in the corresponding relay server field 2802. In FIG. 28, the current load is expressed as a percentage of capacity, but any suitable load metric(s) may be used. The previous load 1 field 2808 and the previous load 2 field 2810 may take values representative of the loads on the server identified in the corresponding relay server field 2802 at two previous time points (separated, e.g., by some predetermined interval). Although two "historical" load data points are illustrated in FIG. 28, any number may be used, and the measurement times of the data may be separated by any desired interval.

In embodiments in which each relay server gathers usage data, each relay server may record what master relay server routed the browser to use its relay services, and how much relaying the relay server performed for that master relay server. Each relay server may periodically inform each master relay server of its overall traffic load (measured in, e.g., session count and bits relayed) and the traffic load of sessions that are due to its authentication tokens (e.g., session counts and bits relayed). In such embodiments, each master relay server may have access to data representative of which browsers are generating relay server load, and where that load is generated.

In both star and mesh configurations, when the web server 110 needs a relay server arrangement to provide to a web application, the web server 110 may access the data structure 2800 and select a suitable relay server or servers based at least in part on the load data therein. In some embodiments, the web server 110 may also access stored data indicative of the geographic location of various relay servers, and may select a suitable relay server or servers based at least in part on the location data therein. FIG. 29 illustrates an example data structure 2900 that may be used to store relay server location data for web communications, in accordance with various embodiments. The data structure 2900 may be used to organize data from a star configuration and/or a mesh configuration in a storage device (e.g., the storage device 130 or the storage device 128), and may be accessed by the web server 110 when selecting a relay server arrangement for a requesting web application. The data structure 2900 may take the form of an IP address location table, and may include a relay server field 2902 and location field 2904 and example entries 2906-2910. The relay server field 2902 may take values that identify different relay servers. The location field 2904 may take values that specify a location of the relay server identified in the corresponding relay server field 2902. In some embodiments, the location field 2904 may be included in the data structure 2900.

When a browser needs a relay server arrangement (e.g., a TURN server arrangement), the web server 110 may need to quickly identify a suitable arrangement. In some embodiments, the web server 110 may look at the IP location of the browser request and match it to the geographically nearest relay server (based on the data in the data structure 2900). The web server 110 may also include a "backup" relay server in the configuration line in case the geographically selected relay server is not available. The selection of this backup relay server may be made on the basis of any suitable data (e.g., load data).

Many of the embodiments disclosed herein have related to improved WebRTC performance. WebRTC may provide a useful protocol for browser-to-browser and browser-to-device communication, and most conventional uses of WebRTC are point-to-point. Described below are techniques for using WebRTC communication to create a web-based mesh network in which browsers peer together using a distributed hash table. Each connection in the mesh may be a WebRTC connection, and browsers may act as routers for communications in the mesh. Such an infrastructure may be used to send messages, files, audio, and video, and perform web operations such as search and remote collaboration. Once configured, browsers in this mesh may not require a central server to communicate, and may operate substantially independently of any central entity. Such an infrastructure may build on web technologies (requiring only a compliant browser) and thus may be platform-agnostic, and may be readily scaled and distributed to many platforms. This may represent an improvement over conventional approaches to computing meshes, which have required the installation of platform-specific proprietary software, or server-centric solutions, which have required heavy back-end infrastructure.

In some embodiments, a browser of the first computing device 102 that supports WebRTC may be served, by the web server 110, a JavaScript application that is built to form a browser-to-browser peer-to-peer mesh network (e.g., with a WebRTC-compliant browser of the second computing device 104). Browsers in this peer-to-peer network may be referred to as "nodes" in the discussion below. In addition to serving the application, the web server 110 may exchange WebRTC offers between the browser of the first computing device 102 and a few other browsers so that the browser of the first computing device 102 may have a few initial data connections. Once the browser of the first computing device 102 has a few initial data connections, the browser may no longer need to communicate with the web server 110, and instead can use its WebRTC connections to other nodes to discover new nodes, exchange WebRTC connection offers with new nodes via existing nodes, and use cryptographic browser application program interfaces (APIs) to provide end-to-end security.

In some particular embodiments, the JavaScript application may utilize the Web Cryptography API and the WebRTC API, both defined by the World Wide Web Consortium. The Web Cryptography API may enable a browser to have a unique, provable identity, and to encrypt, decrypt, sign, and verify messages using a Public Key Infrastructure (PKI). The WebRTC API may enable browsers to create direct connections with other browsers. The JavaScript application may, for example, have each browser establish a number of WebRTC connections with other browsers (e.g., with a predetermined maximum, such as 20), thereby forming a balanced mesh that can route messages between nodes. Since each browser can encrypt and sign messages using PKI via the Web Cryptography API, messages can securely move from node to node in the mesh.

Figure 30:
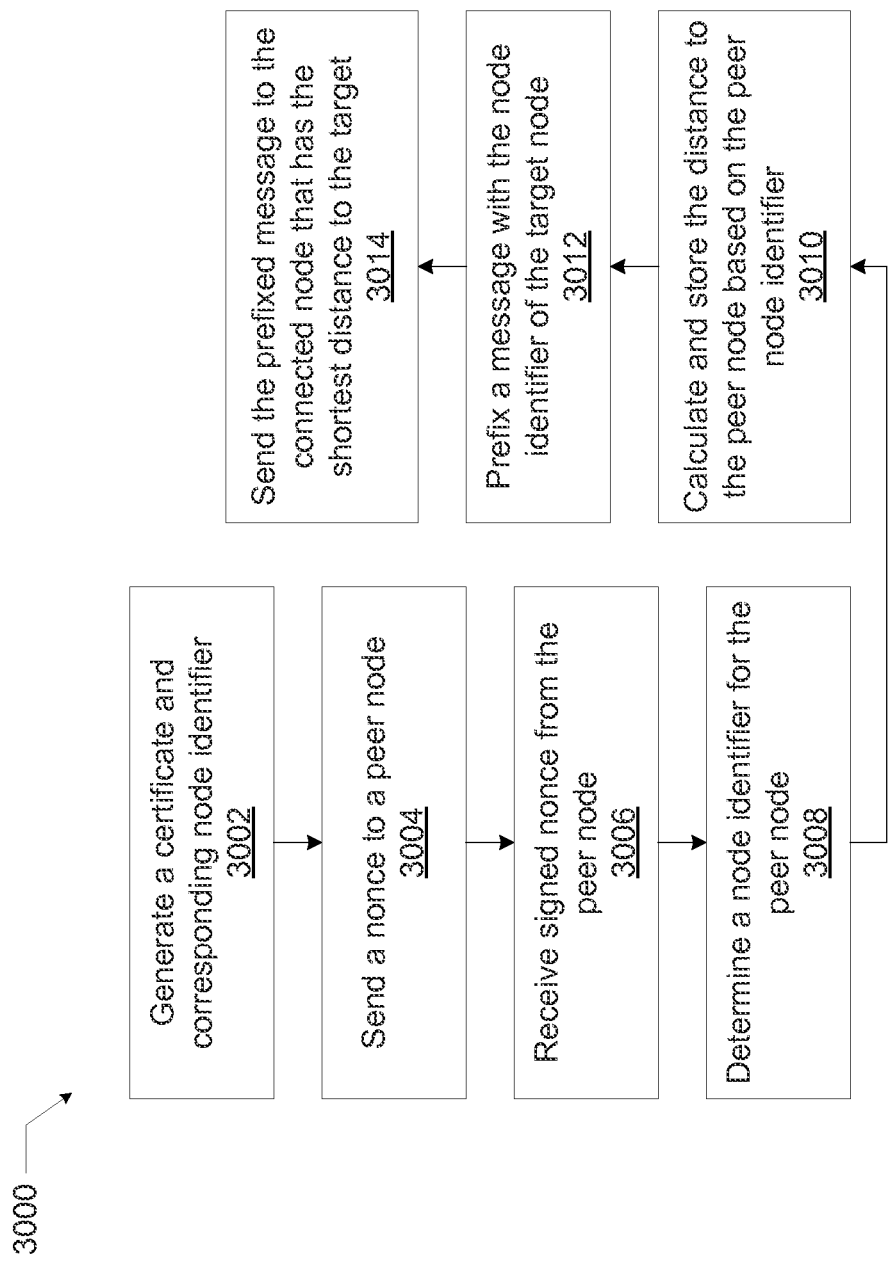
FIG. 30 is a flow diagram of an illustrative process for web communication that may be performed by a computing device of the computing system of FIG. 1, in accordance with various embodiments.

Any of a number of techniques may be used to pass messages in the mesh discussed above. For example, FIG. 30 is a flow diagram of an illustrative process 3000 for web communication that may be performed by a computing device of the computing system 100, in accordance with various embodiments. The process 3000 is discussed herein as performed by a browser of the first computing device 102, but the process 3000 may be performed by any suitable computing device.

At 3002, the browser of the first computing device 102 may generate a certificate and corresponding node identifier. The node identifier may be a hash of the certificate (e.g., a 32-bit hash).

At 3004, the browser may send a nonce to a peer node to initiate connection with the peer node (e.g., a browser of the second computing device 104). The nonce is a random string that may be signed by the peer node and returned.

At 3006, the browser may receive the signed nonce from the peer node.

At 3008, the browser may determine a node identifier for the peer node based on the signed nonce. For example, the browser may learn and verify the node identifier of the peer node based on the signed nonce.

At 3010, the browser may calculate and store a distance between the browser and the peer node based on the peer node identifier. In some embodiments, a distance function may be defined as the length of the node identifier in bits (e.g., 32) minus the number of bits that are the same at the same positions between the node identifier of the browser and the node identifier of the peer node. For example, if the browser node identifier is 101011 and the peer node identifier is 110001, the distance between the browser and the peer node would be 6−2=4. In some embodiments, the browser may maintain a maximum or predetermined number of connections with peer nodes having a given distance (e.g., 4 nodes at a distance of 3, 3 nodes at a distance of 2, etc.). The result of proper selection of the number of peer nodes at given distances may be a balanced graph.

At 3012, the browser may prefix a message, destined for a target node, with the node identifier of the target node.

At 3014, the browser may send the prefixed message to the node with which the browser is connected that has the shortest distance to the target node (with distance defined as discussed above with reference to 3010). The process 3000 may then end. The receiver of the message will repeat the operations of 3014 until the message either fails to route or arrives at its destination. Even in very large meshes, this approach typically only requires a few "hops" to route a message between any source and target.

In some embodiments, the process 3000 may be modified to use a distributed hash table or spanning tree multicast approach, in accordance with known techniques. Once a mesh has been built, primitives like SendMessage( ), SendMulticast( ), and GetHashEntry( ) (to determine a node identifier) can be defined and used by applications to discover other nodes, advertise services, and distribute information about files and other data. For example, a user on a browser may send a multicast query to many other browsers.

Figure 31:
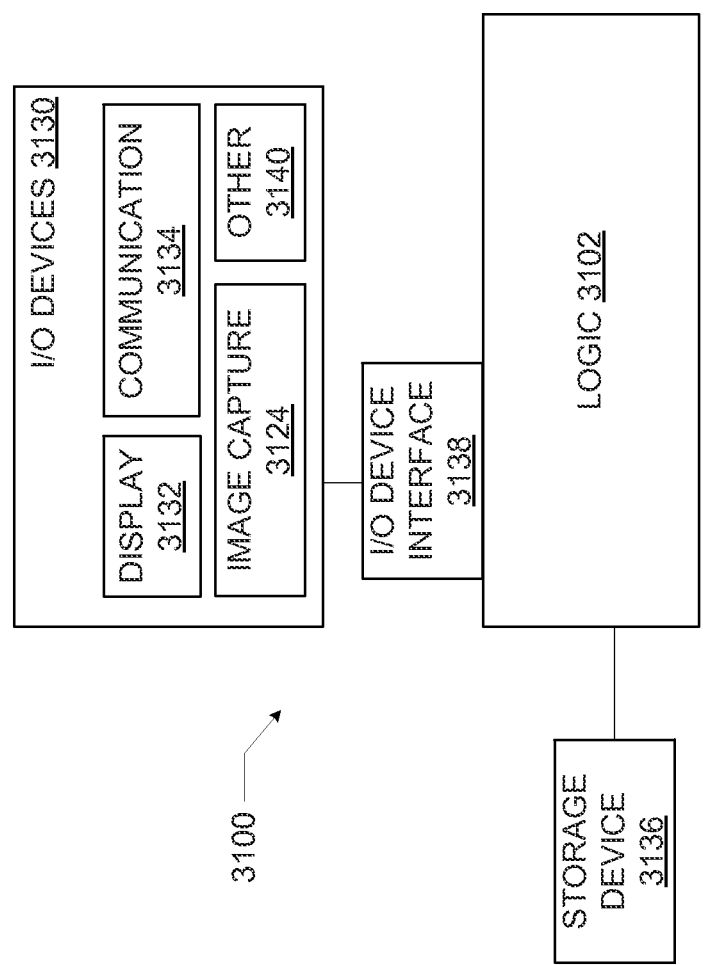
FIG. 31 is a block diagram of an illustrative computing device that may be used to implement any suitable ones of the embodiments disclosed herein.

FIG. 31 is a block diagram of an illustrative computing device 3100 that may be used to implement any suitable ones of the embodiments disclosed herein. Although a number of components are illustrated in FIG. 31, various embodiments may omit components as appropriate for the web communication operations to be performed. The computing device 3100 may include input/output (I/O) devices 3130. The I/O devices 3130 may include an image capture device 3124, a display 3132, a communication device 3134, and/or other I/O devices 3140. In some embodiments, the I/O devices 3130 may include one or more of the peripheral devices discussed above with reference to FIG. 1. Although the I/O devices 3130 (and other components described herein) may be referred to in the plural, any number of I/O devices may be included in the I/O devices 3130 (and similarly, any component may include multiple such components).

In some embodiments, the image capture device 3124 may include one or more digital cameras, for example, and may use any imaging wavelength (e.g., visible or infrared light). As used herein, the term "camera" may include still image cameras and video cameras. In some embodiments, the image capture device 3124 may capture video, such as high-definition video. In some embodiments, the image capture device 3124 may be configured to stream image data (e.g., video data) to other devices via a wired or wireless communication pathway. For example, the image capture device 3124 may be included in the first computing device 102, but may be controlled by the second computing device 104 using a WebRTC connection.

The display 3132 may include one or more heads-up displays (i.e., displays including a projector arranged in an optical collimator configuration and a combiner to provide data without requiring a user to look away from his or her typical viewpoint), computer monitors, projectors, touchscreen displays, liquid crystal displays (LCDs), light-emitting diode displays, or flat panel displays, for example.

The communication device 3134 may include one or more devices that enable wireless and/or wired communication between various devices instantiating the computing device 3100 and with devices external to the computing device 3100. In particular, the communication device 3134 may enable one or more of the communication pathways illustrated in FIG. 1, and may include suitable hardware for supporting the communication pathways 108, 110, and 112, such as network interface cards, modems, WiFi devices, Bluetooth devices, Near Field Communications (NFC) devices, and so forth. For example, the communication device 3134 may provide the hardware required to support one or more network ports, as known in the art.

The other I/O devices 3140 may include any suitable I/O devices, such as a keyboard, a cursor control device such as a mouse, a stylus, a touchpad, a bar code reader, a Quick Response (QR) code reader, an RFID reader, a short-range wireless receiver (e.g., a Bluetooth receiver), an audio capture device (which may include one or more microphones arranged in various configurations), an audio output device (e.g., one or more speakers or other audio transducers that may be, for example, mounted in one or more earphones or earbuds), printers, projectors, additional storage devices, or any other suitable I/O device.

The computing device 3100 may include logic 3102 and an I/O device interface 3138. The I/O device interface 3138 may be configured to receive data from the I/O devices 3130 and provide the data to the logic 3102, and may also be configured to receive data from the logic 3102 and provide it to the I/O devices 3130. The computing device 3100 may include a storage device 3136. The storage device 3136 may act as any of the storage devices disclosed herein (such as any of the storage devices 122, 124, 142, 128, 130, and 126 illustrated in FIG. 1). In some embodiments, the storage device 3136 may include one or more databases or other data storage structures, which may include memory structures for storing any of the data described herein used for web communication operations. Various examples of data structures that may be included in the storage device 3136 are discussed above. The storage device 3136 may include any volatile or nonvolatile memory device, such as one or more hard drives, solid state logic, or portable storage media, for example. The logic 3102 may include any of the logic disclosed herein (e.g., with reference to any of the web communication components), in any suitable combination.

In some embodiments, the computing device 3100 may be a mobile computing device. As used herein, a "mobile computing device" may refer to a computing device that is configured for carrying along with a user. In some embodiments, a mobile computing device may be a wearable computing device, and may be integrated into a garment, accessory, or other support structure that is configured to be worn on the body of the user (or "wearer"). Examples of suitable support structures for the mobile computing device 102 may include glasses, a headset, a hair accessory (e.g., a headband or barrette), an ear piece, jewelry (e.g., a brooch, earrings, or a necklace), a wrist band (e.g., a wristwatch), a neck band (e.g., a tie or scarf), a garment (e.g., a shirt, pants, a dress, a skirt, or a jacket), a hat, shoes, a lanyard or name tag, a contact lens, or an implantable support structure, among others. In some embodiments, a mobile computing device may be a computing device configured for carrying in a pocket, backpack, or other carrying case. Examples of mobile computing devices include cellular phones, smartphones, other personal mobile communication devices, tablets, electronic book readers, personal digital assistants, laptops, or other such computing devices. Web communication and other operations performed by a mobile computing device may be controlled by an app or plug-in on the mobile computing device, for example. Although a mobile computing device may be referred to in the singular, a mobile computing device may include two or more distinct devices associated with the user. For example, a mobile computing device may include a wrist-mounted computing device in communication with a smartphone. Processing operations performed by the mobile computing device in this example may be distributed between the wrist-mounted computing device and the smartphone.

In some embodiments, the computing device 3100 may be a stationary personal computing device. As used herein, a "stationary personal computing device" may refer to a computing device configured to rest semi-permanently on a surface (e.g., as a server does in a rack or a desktop computer does on a desk). Examples of personal computing devices that may serve as a stationary personal computing device include desktop computing devices, point-of-sale terminals, terminals located at a security desk in a facility, and large shared computing kiosks. Web communication and other operations performed by a stationary personal computing device may be controlled by an application or plug-in on the stationary personal computing device, for example. In some embodiments, a stationary personal computing device or a remote computing device (discussed below) may have more computing resources (e.g., processing power, memory, and/or communication bandwidth) than a mobile computing device. Thus, in some embodiments, data captured and preliminarily processed by a mobile computing device may be transmitted over a communication pathway to a stationary personal computing device, or to a remote computing device for further processing.

In some embodiments, the computing device 3100 may be a remote computing device. As used herein, a "remote computing device" may refer to one or more servers (e.g., arranged in a "cloud" computing configuration) or other computing devices remote from a user. Communication between a remote computing device and any other computing device may be configured according to any remote wired or wireless communication protocol. In some embodiments, a remote computing device may have more computing resources (e.g., processing power, memory, and/or communication bandwidth) than a mobile computing device or a stationary personal computing device. Thus, in some embodiments, data captured and preliminarily processed by a mobile computing device and/or a stationary personal computing device may be transmitted over one or more communication pathways to a remote computing device for further processing The following paragraphs provide examples of various ones of the embodiments disclosed herein.

Example A1 is a computing device, including: first logic to receive a first data set representative of a web page, and may further specify that the first data set includes a portion that is associated with a platform feature not supported by a platform of a web server that is to serve the web page; second logic, coupled to the first logic, to generate a second data set by removing the portion from the first data set; third logic, coupled to the second logic, to generate a third data set by performing at least one minification operation on the second data set to reduce a size of the second data set; and fourth logic, coupled to the third logic, to provide the third data set to the web server, wherein the web server is to provide the third data set to a second computing device in response to a request, by the second computing device to the web server, for the web page.

Example A2 may include the subject matter of Example A1, and may further specify that the second logic is further to: receive an indicator of the platform; and determine, by accessing a stored association between the platform and platform features supported by the platform, that the platform feature is not supported by the platform.

Example A3 may include the subject matter of Example A2, and may further specify that the second logic, as part of generation of the second data set, is to: identify a tag, associated with the platform feature, in the first data set; and identify the portion based on the tag.

Example A4 may include the subject matter of any of Examples A1-3, and may further specify that: the platform is a first platform; the web server is a first web server; the platform feature is supported by a second platform of a second web server that is to serve the web page; the second logic is to generate a fourth data set based on the first data set, wherein the fourth data set includes the portion; the third logic is to generate a fifth data set by performing at least one minification operation on the fourth data set to reduce a size of the fourth data set; and the fourth logic is to: provide the third and fifth data sets to the first web server, and provide the third and fifth data sets to the second web server.

Example A5 may include the subject matter of Example A4, and may further specify that the fourth logic is to provide the third and fifth data sets to the first web server in a single file.

Example A6 may include the subject matter of Example A5, and may further specify that the single file is a single header file.

Example A7 may include the subject matter of any of Examples A1-6, and may further specify that the first data set includes at least one image file, and wherein the third logic, as part of generation of the third data set, is to replace the at least one image file with an inline representation of the at least one image file.

Example A8 may include the subject matter of any of Examples A1-7, and may further specify that the first data set includes code comments, and wherein the third logic, as part of generation of the third data set, is to remove the code comments.

Example A9 may include the subject matter of any of Examples A1-8, and may further specify that: the web page includes code to establish a Web Real Time Communications (WebRTC) connection between the second computing device and a third computing device; the WebRTC connection is facilitated by a Traversal Using Relays around Network Address Translator (TURN) server; and the TURN server is one of a plurality of TURN servers arranged in a star configuration or a mesh configuration.

Example A10 may include the subject matter of any of Examples A1-9, and may further specify that the web page includes instructions for a web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A11 may include the subject matter of any of Examples A1-10, and may further specify that the web page includes JavaScript code to establish peer-to-peer Web Real Time Communications (WebRTC) connections between the second computing device and a plurality of other computing devices.

Example A12 may include the subject matter of any of Examples A1-11, and may further specify that the web page includes code to generate a Web Real Time Communication (WebRTC) offer in a first format for establishing WebRTC communication between the second computing device and a third computing device, code to convert the WebRTC offer from the first format into a binary block, and code to provide the binary block to the web server, and wherein the web server is to transmit a corresponding offer to the third computing device.

Example A13 is one or more computer readable media having instructions thereon that, in response to execution by one or more processing devices of a computing device, cause the computing device to: receive a first data set representative of a web page, wherein the first data set includes a portion that is associated with a platform feature not supported by a platform of a web server that is to serve the web page; generate a second data set by removing the portion from the first data set; generate a third data set by performing at least one minification operation on the second data set to reduce a size of the second data set; and provide the third data set to the web server, wherein the web server is to provide the third data set to a second computing device in response to a request, by the second computing device to the web server, for the web page.

Example A14 may include the subject matter of Example A13, and may further specify that the instructions are further to cause the computing device to: receive an indicator of the platform; and determine, by accessing a stored association between the platform and platform features supported by the platform, that the platform feature is not supported by the platform.

Example A15 may include the subject matter of Example A14, and may further specify that the instructions are to cause the computing device, as part of generation of the second data set, to: identify a tag, associated with the platform feature, in the first data set; and identify the portion based on the tag.

Example A16 may include the subject matter of any of Examples A13-15, and may further specify that the platform is a first platform, the web server is a first web server, and the platform feature is supported by a second platform of a second web server that is to serve the web page, and may further specify that the instructions are further to cause the computing device to: generate a fourth data set based on the first data set, wherein the fourth data set includes the portion; generate a fifth data set by performing at least one minification operation on the fourth data set to reduce a size of the fourth data set; provide the fifth data set to the first web server; and provide the third and fifth data sets to the second web server.

Example A17 may include the subject matter of Example A16, and may further specify that the third and fifth data sets are to be provided to the first web server in a single file.

Example A18 may include the subject matter of Example A17, and may further specify that the single file is a single header file.

Example A19 may include the subject matter of any of Examples A13-18, and may further specify that the first data set includes at least one image file, and wherein instructions are to cause the computing device, as part of generation of the third data set, to replace the at least one image file with an inline representation of the at least one image file.

Example A20 may include the subject matter of any of Examples A13-19, and may further specify that the first data set includes code comments, and wherein the instructions are to cause the computing device, as part of generation of the third data set, to remove the code comments.

Example A21 may include the subject matter of any of Examples A13-20, and may further specify that: the web page includes code to establish a Web Real Time Communications (WebRTC) connection between the second computing device and a third computing device; the WebRTC connection is facilitated by a Traversal Using Relays around Network Address Translator (TURN) server; and the TURN server is one of a plurality of TURN servers arranged in a star configuration or a mesh configuration.

Example A22 may include the subject matter of any of Examples A13-21, and may further specify that the web page includes instructions for a web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A23 may include the subject matter of any of Examples A13-22, and may further specify that the web page includes JavaScript code to establish peer-to-peer Web Real Time Communications (WebRTC) connections between the second computing device and a plurality of other computing devices.

Example A24 may include the subject matter of any of Examples A13-23, and may further specify that the web page includes code to generate a Web Real Time Communication (WebRTC) offer in a first format for establishing WebRTC communication between the second computing device and a third computing device, code to convert the WebRTC offer from the first format into a binary block, and code to provide the binary block to the web server, and wherein the web server is to transmit a corresponding offer to the third computing device.

Example A25 is a computing device, including: means for receiving a first data set representative of a web page, and may further specify that the first data set includes a portion that is associated with a platform feature not supported by a platform of a web server that is to serve the web page; means for generating a second data set by removing the portion from the first data set; means for generating a third data set by performing at least one minification operation on the second data set to reduce a size of the second data set; and means for providing the third data set to the web server, wherein the web server is to provide the third data set to a second computing device in response to a request, by the second computing device to the web server, for the web page.

Example A26 may include the subject matter of Example A25, and may further specify that the means for generating the second data set includes: means for receiving an indicator of the platform; and means for determining, by accessing a stored association between the platform and web server features supported by the platform, that the platform feature is not supported by the platform.

Example A27 may include the subject matter of Example A26, and may further specify that the means for generating the second data set includes: means for identifying a tag, associated with the platform feature, in the first data set; and means for identifying the portion based on the tag.

Example A28 may include the subject matter of any of Examples A25-27, and may further specify that: the platform is a first platform; the web server is a first web server; the platform feature is supported by a second platform of a second web server that is to serve the web page; the means for generating the second data set includes means for generating a fourth data set based on the first data set, wherein the fourth data set includes the portion; the means for generating the third data set includes means for generating a fifth data set by performing at least one minification operation on the fourth data set to reduce a size of the fourth data set; and the means for providing the third data set to the web server includes: means for providing the third and fifth data sets to the first web server, and means for providing the third and fifth data sets to the second web server.

Example A29 may include the subject matter of Example A28, and may further specify that the means for providing the third data set to the web server includes means for providing the third and fifth data sets to the first web server in a single file.

Example A30 may include the subject matter of Example A29, and may further specify that the single file is a single header file.

Example A31 may include the subject matter of any of Examples A25-30, and may further specify that the first data set includes at least one image file, and that the means for generating the third data set includes means for replacing the at least one image file with an inline representation of the at least one image file.

Example A32 may include the subject matter of any of Examples A25-31, and may further specify that the first data set includes code comments, and wherein the means for generating the third data set includes means for removing the code comments.

Example A33 may include the subject matter of any of Examples A25-32, and may further specify that: the web page includes code to establish a Web Real Time Communications (WebRTC) connection between the second computing device and a third computing device; the WebRTC connection is facilitated by a Traversal Using Relays around Network Address Translator (TURN) server; and the TURN server is one of a plurality of TURN servers arranged in a star configuration or a mesh configuration.

Example A34 may include the subject matter of any of Examples A25-33, and may further specify that the web page includes instructions for a web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A35 may include the subject matter of any of Examples A25-34, and may further specify that the web page includes JavaScript code to establish peer-to-peer Web Real Time Communications (WebRTC) connections between the second computing device and a plurality of other computing devices.

Example A36 may include the subject matter of any of Examples A25-35, and may further specify that the web page includes code to generate a Web Real Time Communication (WebRTC) offer in a first format for establishing WebRTC communication between the second computing device and a third computing device, code to convert the WebRTC offer from the first format into a binary block, and code to provide the binary block to the web server, and wherein the web server is to transmit a corresponding offer to the third computing device.

Example A37 is a method for web communication, including: receiving, by a computing device, a first data set representative of a web page, and may further specify that the first data set includes a portion that is associated with a platform feature not supported by a platform of a web server that is to serve the web page; generating, by the computing device, a second data set by removing the portion from the first data set; generating, by the computing device, a third data set by performing at least one minification operation on the second data set to reduce a size of the second data set; and providing, by the computing device, the third data set to the web server, wherein the web server is to provide the third data set to a second computing device in response to a request, by the second computing device to the web server, for the web page.

Example A38 may include the subject matter of Example A37, and may further include: receiving, by the computing device, an indicator of the platform; and determining, by the computing device, by accessing a stored association between the platform and platform features supported by the platform, that the platform feature is not supported by the platform.

Example A39 may include the subject matter of Example A38, and may further include, as part of generating the second data set: identifying a tag, associated with the platform feature, in the first data set; and identifying the portion based on the tag.

Example A40 may include the subject matter of any of Examples A37-39, and may further specify that the platform is a first platform, the web server is a first web server, and the platform feature is supported by a second platform of a second web server that is to serve the web page, and may further include: generating, by the computing device, a fourth data set based on the first data set, wherein the fourth data set includes the portion; generating, by the computing device, a fifth data set by performing at least one minification operation on the fourth data set to reduce a size of the fourth data set; providing, by the computing device, the fifth data set to the first web server; and providing, by the computing device, the third and fifth data sets to the second web server.

Example A41 may include the subject matter of Example A40, and may further specify that the third and fifth data sets are to be provided to the first web server in a single file.

Example A42 may include the subject matter of Example A41, and may further specify that the single file is a single header file.

Example A43 may include the subject matter of any of Examples A37-42, and may further specify that the first data set includes at least one image file, and further including, as part of generation of the third data set, replacing the at least one image file with an inline representation of the at least one image file.

Example A44 may include the subject matter of any of Examples A37-43, and may further specify that the first data set includes code comments, and further including, as part of generation of the third data set, removing the code comments.

Example A45 may include the subject matter of any of Examples A37-44, and may further specify that: the web page includes code to establish a Web Real Time Communications (WebRTC) connection between the second computing device and a third computing device; the WebRTC connection is facilitated by a Traversal Using Relays around Network Address Translator (TURN) server; and the TURN server is one of a plurality of TURN servers arranged in a star configuration or a mesh configuration.

Example A46 may include the subject matter of any of Examples A37-45, and may further specify that the web page includes instructions for a web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A47 may include the subject matter of any of Examples A37-46, and may further specify that the web page includes JavaScript code to establish peer-to-peer Web Real Time Communications (WebRTC) connections between the second computing device and a plurality of other computing devices.

Example A48 may include the subject matter of any of Examples A37-47, and may further specify that the web page includes code to generate a Web Real Time Communication (WebRTC) offer in a first format for establishing WebRTC communication between the second computing device and a third computing device, code to convert the WebRTC offer from the first format into a binary block, and code to provide the binary block to the web server, and wherein the web server is to transmit a corresponding offer to the third computing device.

Example A49 is a web server, including: a storage device to store a plurality of identifiers of a corresponding plurality of platforms; first logic to receive, from a computing device, a request for a Hypertext Markup Language (HTML) web page; second logic to select an identifier of a platform of the web server from the stored plurality of identifiers; third logic, coupled to the first logic, to identify a compressed data set representative of the web page based at least in part on the identifier of the platform of the web server; and fourth logic, coupled to the second logic, to provide, in response to the request, the compressed data set to the computing device, wherein a web browser of the computing device is to decompress the compressed data set to display the web page.

Example A50 may include the subject matter of Example A49, and may further specify that the compressed data set is gzip data.

Example A51 may include the subject matter of any of Examples A49-50, and may further specify that the compressed data set, when decompressed, is a Hypertext Markup Language (HTML) file including an inline representation of an image.

Example A52 may include the subject matter of any of Examples A49-51, and may further specify that the compressed data set is stored in Random Access Memory (RAM) of the web server when the request is received.

Example A53 may include the subject matter of any of Examples A49-52, and may further specify that the compressed data set, when decompressed, is a Hypertext Markup Language (HTML) file without carriage returns.

Example A54 may include the subject matter of any of Examples A49-53, and may further specify that the compressed data set is stored in a header file.

Example A55 may include the subject matter of any of Examples A49-54, and may further specify that the compressed data set is stored as a variable.

Example A56 may include the subject matter of any of Examples A49-55, and may further specify that the compressed data set, when decompressed, is a hexadecimal encoding of Hypertext Markup Language (HTML) code.

Example A57 may include the subject matter of any of Examples A49-56, and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example A58 may include the subject matter of any of Examples A49-57, and may further specify that the web page includes instructions for the browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A59 may include the subject matter of any of Examples A49-58, and may further specify that the web page includes JavaScript code to establish peer-to-peer Web Real Time Communications (WebRTC) connections between the computing device and a plurality of other computing devices.

Example A60 may include the subject matter of any of Examples A49-59, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example A61 is one or more computer readable media having instructions thereon that, in response to execution by one or more processing devices of a web server, cause the web server to: store a plurality of identifiers of a corresponding plurality of platforms; receive, from a computing device, a request for a Hypertext Markup Language (HTML) web page; select an identifier of a platform of the web server from the stored plurality of identifiers; identify a compressed data set representative of the web page based at least in part on the identifier of the platform of the web server; and provide, in response to the request, the compressed data set to the computing device, wherein a web browser of the computing device is to decompress the compressed data set to display the web page.

Example A62 may include the subject matter of Example A61, and may further specify that the compressed data set is a gzip file.

Example A63 may include the subject matter of any of Examples A61-62, and may further specify that the compressed data set, when decompressed, is a Hypertext Markup Language (HTML) file including an inline representation of an image.

Example A64 may include the subject matter of any of Examples A61-63, and may further specify that the compressed data set is stored in Random Access Memory (RAM) of the web server when the request is received.

Example A65 may include the subject matter of any of Examples A61-64, and may further specify that the compressed data set, when decompressed, is a Hypertext Markup Language (HTML) file without carriage returns.

Example A66 may include the subject matter of any of Examples A61-65, and may further specify that the compressed data set is stored in a header file.

Example A67 may include the subject matter of any of Examples A61-66, and may further specify that the compressed data set is stored as a variable.

Example A68 may include the subject matter of any of Examples A61-67, and may further specify that the compressed data set, when decompressed, is a hexadecimal encoding of Hypertext Markup Language (HTML) code.

Example A69 may include the subject matter of any of Examples A61-68, and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example A70 may include the subject matter of any of Examples A61-69, and may further specify that the web page includes instructions for the browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A71 may include the subject matter of any of Examples A61-70, and may further specify that the web page includes JavaScript code to establish peer-to-peer Web Real Time Communications (WebRTC) connections between the computing device and a plurality of other computing devices.

Example A72 may include the subject matter of any of Examples A61-71, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example A73 is a web server, including: a storage device to store a plurality of identifiers of a corresponding plurality of platforms; means for receiving, from a computing device, a request for a Hypertext Markup Language (HTML) web page; means for selecting an identifier of a platform of the web server from the stored plurality of identifiers; means for identifying a compressed data set representative of the web page based at least in part on the identifier of the platform of the web server; and means for providing, in response to the request, the compressed data set to the computing device, wherein a web browser of the computing device is to decompress the compressed data set to display the web page.

Example A74 may include the subject matter of Example A73, and may further specify that the compressed data set is gzip data.

Example A75 may include the subject matter of any of Examples A73-74, and may further specify that the compressed data set, when decompressed, is a Hypertext Markup Language (HTML) file including an inline representation of an image.

Example A76 may include the subject matter of any of Examples A73-75, and may further specify that the compressed data set is stored in Random Access Memory (RAM) of the web server when the request is received.

Example A77 may include the subject matter of any of Examples A73-76, and may further specify that the compressed data set, when decompressed, is a Hypertext Markup Language (HTML) file without carriage returns.

Example A78 may include the subject matter of any of Examples A73-77, and may further specify that the compressed data set is stored in a header file.

Example A79 may include the subject matter of any of Examples A73-78, and may further specify that the compressed data set is stored as a variable.

Example A80 may include the subject matter of any of Examples A73-79, and may further specify that the compressed data set, when decompressed, is a hexadecimal encoding of Hypertext Markup Language (HTML) code.

Example A81 may include the subject matter of any of Examples A73-80, and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example A82 may include the subject matter of any of Examples A73-81, and may further specify that the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A83 may include the subject matter of any of Examples A73-82, and may further specify that the web page includes JavaScript code to establish peer-to-peer Web Real Time Communications (WebRTC) connections between the computing device and a plurality of other computing devices.

Example A84 may include the subject matter of any of Examples A73-83, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example A85 is a method for web communication, including: storing, by a web server, a plurality of identifiers of a corresponding plurality of platforms; receiving, at the web server from a computing device, a request for a Hypertext Markup Language (HTML) web page; selecting, by the web server, an identifier of a platform of the web server from the stored plurality of identifiers; identifying, by the web server, a compressed data set representative of the web page based at least in part on the identifier of the platform of the web server; and providing, by the web server in response to the request, the compressed data set to the computing device, wherein a web browser of the computing device is to decompress the compressed data set to display the web page.

Example A86 may include the subject matter of Example A85, and may further specify that the compressed data set is gzip data.

Example A87 may include the subject matter of any of Examples A85-86, and may further specify that the compressed data set, when decompressed, is a Hypertext Markup Language (HTML) file including an inline representation of an image.

Example A88 may include the subject matter of any of Examples 85-87 and may further specify that the compressed data set is stored in Random Access Memory (RAM) of the web server when the request is received.

Example A89 may include the subject matter of any of Examples A85-88, and may further specify that the compressed data set, when decompressed, is a Hypertext Markup Language (HTML) file without carriage returns.

Example A90 may include the subject matter of any of Examples A85-89, and may further specify that the compressed data set is stored in a header file.

Example A91 may include the subject matter of any of Examples A85-90, and may further specify that the compressed data set is stored as a variable.

Example A92 may include the subject matter of any of Examples A85-91, and may further specify that the compressed data set, when decompressed, is a hexadecimal encoding of Hypertext Markup Language (HTML) code.

Example A93 may include the subject matter of any of Examples A85-92 and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example A94 may include the subject matter of any of Examples A85-93, and may further specify that the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example A95 may include the subject matter of any of Examples A85-94, and may further specify that the web page includes JavaScript code to establish peer-to-peer Web Real Time Communications (WebRTC) connections between the computing device and a plurality of other computing devices.

Example A96 may include the subject matter of any of Examples A85-95, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example A97 is one or more computer readable media having instructions thereon that, in response to execution by one or more processing devices of a computing device, cause the computing device to perform the method of any of Examples A37-48 and A85-96.

Example A98 is an apparatus including means for performing the method of any of Examples A37-48 and A85-96.

Example B1 is a relay server, including: a network port; first logic, coupled to the network port, to determine whether data incoming to the network port from a web browser is Traversal Using Relays around Network Address Translator (TURN) data or Hypertext Transfer Protocol (HTTP) data; second logic, coupled to the first logic, to process the data in response to a determination that the incoming data is TURN data; and third logic, coupled to the first logic, to process the data in response to a determination that the incoming data is HTTP data.

Example B2 may include the subject matter of Example B1, and may further specify that the first logic is to determine whether the incoming data is TURN data or HTTP data by analyzing one or more bytes of the data initially received.

Example B3 may include the subject matter of any of Examples B1-2, and may further specify that, when the incoming data is a predetermined HTTP data Asynchronous JavaScript and Extensible Markup Language (AJAX) query, the third logic is to generate a response for provision to the web browser, wherein the response includes an Internet Protocol address of the web browser.

Example B4 may include the subject matter of any of Examples B1-3, and may further specify that, when the incoming data is a predetermined HTTP data Asynchronous JavaScript and Extensible Markup Language (AJAX) query, the third logic is to generate a response for provision to the web browser, wherein the response includes instructions to the web browser to send a specified number of AJAX queries to the relay server.

Example B5 may include the subject matter of Example B4, and may further specify that the response further includes a sequence number for each of the specified number of AJAX queries.

Example B6 may include the subject matter of any of Examples B4-5, and may further specify that the third logic is further to calculate a latency of communication between the web browser and the relay server based at least in part on a response of the web browser to the instructions.

Example B7 may include the subject matter of any of Examples B4-6, and may further include: a storage device having a data structure to store data representative of a measured latency between the web browser and the relay server, wherein the measured latency is based at least in part on communications between the web browser and the network port.

Example B8 may include the subject matter of any of Examples B1-7, and may further specify that the relay server is one of a plurality of relay servers arranged in a star configuration or a mesh configuration.

Example B9 may include the subject matter of any of Examples B1-8, and may further specify that the relay server facilitates Web Real Time Communications (WebRTC) connections between a computing device associated with the web server and a plurality of other computing devices.

Example B10 is one or more computer readable media having instructions thereon that, in response to execution by one or more processing devices of a relay server, cause the relay server to: determine whether data incoming to a network port of the relay server, from a web browser, is Traversal Using Relays around Network Address Translator (TURN) data or Hypertext Transfer Protocol (HTTP) data; process the data in accordance with a TURN protocol in response to a determination that the incoming data is TURN data; and process the data in accordance with an HTTP protocol in response to a determination that the incoming data is HTTP data.

Example B11 may include the subject matter of Example B10, and may further specify that the instructions are to cause the relay server, as part of determination of whether the incoming data is TURN data or HTTP data, to analyze one or more bytes of the data initially received.

Example B12 may include the subject matter of any of Examples B10-11, and may further specify that, when the incoming data is a predetermined HTTP data Asynchronous JavaScript and Extensible Markup Language (AJAX) query, the instructions are to cause the relay server to generate a response for provision to the web browser, and may further specify that the response includes an Internet Protocol address of the web browser.

Example B13 may include the subject matter of any of Examples B10-12, and may further specify that, when the incoming data is a predetermined HTTP data Asynchronous JavaScript and Extensible Markup Language (AJAX) query, the instructions are to cause the relay server to generate a response for provision to the web browser, wherein the response includes instructions to the web browser to send a specified number of AJAX queries to the relay server.

Example B14 may include the subject matter of Example B13, and may further specify that the response further includes a sequence number for each of the specified number of AJAX queries.

Example B15 may include the subject matter of any of Examples B13-14, and may further specify that the instructions are further to cause the relay server to calculate a latency of communication between the web browser and the relay server based at least in part on a response of the web browser to the instructions.

Example B16 may include the subject matter of any of Examples B13-15, and may further specify that the instructions are further to cause the relay server to: store data representative of a measured latency between the web browser and the relay server in a data structure of a storage device, wherein the measured latency is based at least in part on communications between the web browser and the network port.

Example B17 may include the subject matter of any of Examples B10-16, and may further specify that the relay server is one of a plurality of relay servers arranged in a star configuration or a mesh configuration.

Example B18 may include the subject matter of any of Examples B10-17, and may further specify that the instructions are further to cause the relay server to: facilitate Web Real Time Communications (WebRTC) connections between a computing device associated with the web browser and a plurality of other computing devices.

Example B19 is a relay server, including: a network port; means for determining whether data incoming to the network port from a web browser is Traversal Using Relays around Network Address Translator (TURN) data or Hypertext Transfer Protocol (HTTP) data; means for processing the data in response to a determination that the incoming data is TURN data; and means for processing the data in response to a determination that the incoming data is HTTP data.

Example B20 may include the subject matter of Example B19, and may further specify that the means for determining is to determine whether the incoming data is TURN data or HTTP data by analyzing one or more bytes of the data initially received.

Example B21 may include the subject matter of any of Examples B19-20, and may further specify that, when the incoming data is a predetermined HTTP data Asynchronous JavaScript and Extensible Markup Language (AJAX) query, the means for processing the data in response to a determination that the incoming data is HTTP data is to generate a response for provision to the web browser, wherein the response includes an Internet Protocol address of the web browser.

Example B22 may include the subject matter of any of Examples B19-21, and may further specify that, when the incoming data is a predetermined HTTP data Asynchronous JavaScript and Extensible Markup Language (AJAX) query, the means for processing the data in response to a determination that the incoming data is HTTP data is to generate a response for provision to the web browser, wherein the response includes instructions to the web browser to send a specified number of AJAX queries to the relay server.

Example B23 may include the subject matter of Example B22, and may further specify that the response further includes a sequence number for each of the specified number of AJAX queries.

Example B24 may include the subject matter of any of Examples B22-23, and may further specify that the means for processing the data in response to a determination that the incoming data is HTTP data is further to calculate a latency of communication between the web browser and the relay server based at least in part on a response of the web browser to the instructions.

Example B25 may include the subject matter of any of Examples B22-24, and may further include: a storage device having a data structure to store data representative of a measured latency between the web browser and the relay server, wherein the measured latency is based at least in part on communications between the web browser and the network port.

Example B26 may include the subject matter of any of Examples B19-25, and may further specify that the relay server is one of a plurality of relay servers arranged in a star configuration or a mesh configuration.

Example B27 may include the subject matter of any of Examples B19-26, and may further specify that the relay server facilitates Web Real Time Communications (WebRTC) connections between a computing device associated with the web browser and a plurality of other computing devices.

Example B28 is a method for web communications, including: determining, by a relay server, whether first data incoming to a network port of the relay server, from a web browser, is Traversal Using Relays around Network Address Translator (TURN) data or Hypertext Transfer Protocol (HTTP) data; processing the first data, by the relay server, in accordance with a TURN protocol in response to a determination that the first data is TURN data; determining, by the relay sever, whether second data incoming to the network port of the relay server, from the web browser, is TURN data or HTTP data; and processing the second data, by the relay server, in accordance with an HTTP protocol in response to a determination that the second data is HTTP data.

Example B29 may include the subject matter of Example B28, and may further specify that the method includes, as part of determining whether the second data is TURN data or HTTP data, analyzing one or more bytes of the data initially received.

Example B30 may include the subject matter of any of Examples B28-29, and may further include: when the second data is a predetermined HTTP data Asynchronous JavaScript and Extensible Markup Language (AJAX) query, generating, by the relay server, a response for provision to the web browser, wherein the response includes an Internet Protocol address of the web browser.

Example B31 may include the subject matter of any of Examples B28-30, and may further include: when the incoming data is a predetermined HTTP data Asynchronous JavaScript and Extensible Markup Language (AJAX) query, generating, by the relay server, a response for provision to the web browser, wherein the response includes instructions to the web browser to send a specified number of AJAX queries to the relay server.

Example B32 may include the subject matter of Example B31, and may further specify that the response further includes a sequence number for each of the specified number of AJAX queries.

Example B33 may include the subject matter of any of Examples B31-32, and may further include: calculating, by the relay server a latency of communication between the web browser and the relay server based at least in part on a response of the web browser to the instructions.

Example B34 may include the subject matter of any of Examples B31-33, and may further include: storing, by the relay server data representative of a measured latency between the web browser and the relay server in a data structure of a storage device, wherein the measured latency is based at least in part on communications between the web browser and the network port.

Example B35 may include the subject matter of any of Examples B28-34, and may further specify that the relay server is one of a plurality of relay servers arranged in a star configuration or a mesh configuration.

Example B36 may include the subject matter of any of Examples B28-35, and may further include: facilitating Web Real Time Communications (WebRTC) connections, by the relay server, between a computing device associated with the web browser and a plurality of other computing devices.

Example B37 is a computing device, including: first logic to receive a web page from a web server, wherein the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; second logic, coupled with the first logic, to perform the at least one AJAX query on the network port; third logic to receive a corresponding at least one response, from the relay server, to the at least one AJAX query; and fourth logic, coupled with the third logic, to generate latency data for provision to the web server, wherein the latency data is based at least in part on the at least one response.

Example B38 may include the subject matter of Example B37, and may further specify that the web server is to store the latency data in a storage device for use in selecting a TURN server for Web Real Time Communications (WebRTC) communication between the computing device and another computing device.

Example B39 may include the subject matter of any of Examples B37-38, and may further specify that the at least one AJAX query includes a plurality of AJAX queries, the at least one response includes a corresponding plurality of responses, and the fourth logic is to generate latency data by computing an average response time for the plurality of AJAX queries.

Example B40 may include the subject matter of any of Examples B37-39, and may further specify that the at least one response includes instructions to the computing device to send a specified number of subsequent AJAX queries to the relay server and a sequence number for each of the specified number of AJAX queries.

Example B41 may include the subject matter of Example B40, and may further specify that the fourth logic is to generate latency data by receiving relay server latency data from the relay server and formatting at least some of the relay server latency data for provision to the web server, and wherein the relay server is to generate the relay server latency data based on the subsequent AJAX queries.

Example B42 may include the subject matter of any of Examples B37-41, and may further include: fifth logic to establish a Web Real Time Communications (WebRTC) communication between the computing device and another computing device via the relay server.

Example B43 may include the subject matter of any of Examples B37-42, and may further specify that: the web page includes code to establish a Web Real Time Communications (WebRTC) connection between the computing device and another computing device; the WebRTC connection is facilitated by the relay server; and the relay server is one of a plurality of Traversal Using Relays around Network Address Translator (TURN) servers arranged in a star configuration or a mesh configuration.

Example B44 may include the subject matter of any of Examples B37-43, and may further specify that the web page includes JavaScript code to establish peer-to-peer Web Real Time Communications (WebRTC) connections between the computing device and a plurality of other computing devices.

Example B45 may include the subject matter of any of Examples B37-44, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example B46 is one or more computer readable media having instructions thereon that, in response to execution by one or more processing devices of a computing device, cause the computing device to: receive a web page from a web server, wherein the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; perform the at least one AJAX query on the network port; receive a corresponding at least one response, from the relay server, to the at least one AJAX query; and generate latency data for provision to the web server, wherein the latency data is based at least in part on the at least one response.

Example B47 may include the subject matter of Example B46, and may further specify that the web server is to store the latency data in a storage device for use in selecting a TURN server for Web Real Time Communications (WebRTC) communication between the computing device and another computing device.

Example B48 may include the subject matter of any of Examples B46-47, and may further specify that the at least one AJAX query includes a plurality of AJAX queries, the at least one response includes a corresponding plurality of responses, and the instructions are to cause the computing device to, as part of generation of latency data, compute an average response time for the plurality of AJAX queries.

Example B49 may include the subject matter of any of Examples B46-48, and may further specify that the at least one response includes instructions to the computing device to send a specified number of subsequent AJAX queries to the relay server and a sequence number for each of the specified number of AJAX queries.

Example B50 may include the subject matter of Example B49, and may further specify that the instructions are to cause the computing device to, as part of generation of latency data, receive relay server latency data from the relay server and formatting at least some of the relay server latency data for provision to the web server, and wherein the relay server is to generate the relay server latency data based on the subsequent AJAX queries.

Example B51 may include the subject matter of any of Examples B46-50, and may further specify that the instructions are further to cause the computing device to: establish a Web Real Time Communications (WebRTC) communication between the computing device and another computing device via the relay server.

Example B52 may include the subject matter of any of Examples B46-51, and may further specify that: the web page includes code to establish a Web Real Time Communications (WebRTC) connection between the computing device and another computing device; the WebRTC connection is facilitated by the relay server; and the relay server is one of a plurality of Traversal Using Relays around Network Address Translator (TURN) servers arranged in a star configuration or a mesh configuration.

Example B53 may include the subject matter of any of Examples B46-52, and may further specify that the web page includes JavaScript code to establish peer-to-peer Web Real Time Communications (WebRTC) connections between the computing device and a plurality of other computing devices.

Example B54 may include the subject matter of any of Examples B46-53, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example B55 is a computing device, including: means for receiving a web page from a web server, wherein the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; means for performing the at least one AJAX query on the network port; means for receiving a corresponding at least one response, from the relay server, to the at least one AJAX query; and means for generating latency data for provision to the web server, wherein the latency data is based at least in part on the at least one response.

Example B56 may include the subject matter of Example B55, and may further specify that the web server is to store the latency data in a storage device for use in selecting a TURN server for Web Real Time Communications (WebRTC) communication between the computing device and another computing device.

Example B57 may include the subject matter of any of Examples B55-56, and may further specify that the at least one AJAX query includes a plurality of AJAX queries, the at least one response includes a corresponding plurality of responses, and the means for generating, as part of generation of latency data, is to compute an average response time for the plurality of AJAX queries.

Example B58 may include the subject matter of any of Examples B55-57, and may further specify that the at least one response includes instructions to the computing device to send a specified number of subsequent AJAX queries to the relay server and a sequence number for each of the specified number of AJAX queries.

Example B59 may include the subject matter of Example B58, and may further specify that the means for generating, as part of generation of latency data, is to receive relay server latency data from the relay server and format at least some of the relay server latency data for provision to the web server, and wherein the relay server is to generate the relay server latency data based on the subsequent AJAX queries.

Example B60 may include the subject matter of any of Examples B55-59, and may further include: means for establishing a Web Real Time Communications (WebRTC) communication between the computing device and another computing device via the relay server.

Example B61 may include the subject matter of any of Examples B55-60, and may further specify that: the web page includes code to establish a Web Real Time Communications (WebRTC) connection between the computing device and another computing device; the WebRTC connection is facilitated by the relay server; and the relay server is one of a plurality of Traversal Using Relays around Network Address Translator (TURN) servers arranged in a star configuration or a mesh configuration.

Example B62 may include the subject matter of any of Examples B55-61, and may further specify that the web page includes JavaScript code to establish peer-to-peer Web Real Time Communications (WebRTC) connections between the computing device and a plurality of other computing devices.

Example B63 may include the subject matter of any of Examples B55-62, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example B64 is a method for web communication, including: receiving, by a computing device, a web page from a web server, wherein the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; performing, by the computing device, the at least one AJAX query on the network port of the relay server; receiving, by the computing device, a corresponding at least one response, from the relay server, to the at least one AJAX query; and generating, by the computing device, latency data for provision to the web server, wherein the latency data is based at least in part on the at least one response.

Example B65 may include the subject matter of Example B64, and may further specify that the web server is to store the latency data in a storage device for use in selecting a TURN server for Web Real Time Communications (WebRTC) communication between the computing device and another computing device.

Example B66 may include the subject matter of any of Examples B64-65, and may further specify that the at least one AJAX query includes a plurality of AJAX queries, the at least one response includes a corresponding plurality of responses, and the method includes, as part of generating latency data, computing an average response time for the plurality of AJAX queries.

Example B67 may include the subject matter of any of Examples B64-66, and may further specify that the at least one response includes instructions to the computing device to send a specified number of subsequent AJAX queries to the relay server and a sequence number for each of the specified number of AJAX queries.

Example B68 may include the subject matter of Example B67, and may further specify that the method further includes, as part of generating latency data, receiving relay server latency data from the relay server and formatting at least some of the relay server latency data for provision to the web server, and wherein the relay server is to generate the relay server latency data based on the subsequent AJAX queries.

Example B69 may include the subject matter of any of Examples B64-68, and may further include: establishing, by the computing device, a Web Real Time Communications (WebRTC) communication between the computing device and another computing device via the relay server.

Example B70 may include the subject matter of any of Examples B64-69, and may further specify that: the web page includes code to establish a Web Real Time Communications (WebRTC) connection between the computing device and another computing device; the WebRTC connection is facilitated by the relay server; and the relay server is one of a plurality of Traversal Using Relays around Network Address Translator (TURN) servers arranged in a star configuration or a mesh configuration.

Example B71 may include the subject matter of any of Examples B64-70, and may further specify that the web page includes JavaScript code to establish peer-to-peer Web Real Time Communications (WebRTC) connections between the computing device and a plurality of other computing devices.

Example B72 may include the subject matter of any of Examples B64-71, and may further specify that the web page includes code to generate a Web Real Time Communication (WebRTC) offer in a first format for establishing WebRTC communication between the computing device and another computing device, code to convert the WebRTC offer from the first format into a binary block, and code to provide the binary block to the web server, and wherein the web server is to transmit a corresponding offer to the another computing device.

Example B73 is a web server, including: first logic to provide a web page to a web browser of a computing device, wherein the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; and second logic, coupled with the first logic, to receive, from the web browser, data representative of a latency between the web browser and the relay server, wherein the data is based at least in part on performance of the instructions by the web browser.

Example B74 may include the subject matter of Example B73, and may further include: a storage device, coupled with the second logic, having a data structure to store the data representative of the latency between the web browser and the relay server.

Example B75 may include the subject matter of Example B74, and may further include: third logic, coupled with the storage device, to provide an indicator of the relay server to the web browser as a candidate TURN server for establishing a Web Real Time Communications (WebRTC) communication between the web browser and another computing device.

Example B76 may include the subject matter of any of Examples B74-75, and may further specify that: the relay server is a first relay server, and the data structure is further to store data representative of a latency between the web browser and a second relay server different from the first relay server.

Example B77 may include the subject matter of Example B76, and may further include: third logic, coupled with the storage device, to select a relay server from the first relay server and the second relay server based on the stored data representative of latency; and fourth logic, coupled with the third logic, to provide an indicator of the selected relay server to the web browser as a candidate TURN server for establishing a Web Real Time Communications (WebRTC) communication between the web browser and another computing device.

Example B78 may include the subject matter of any of Examples B76-77, and may further specify that the web browser is a first web browser, and may further specify that the web server further includes: third logic, coupled with the storage device, to determine that a second web browser is in a same subnet as the first web browser; fourth logic, coupled with the storage device, to select a relay server from the first relay server and the second relay server based on the stored data representative of latency between the first web browser and the first and second relay servers; and fifth logic, coupled with the fourth logic, to provide an indicator of the selected relay server to the web browser as a candidate TURN server for establishing a Web Real Time Communications (WebRTC) communication between the second web browser and another computing device.

Example B79 may include the subject matter of any of Examples B74-78, and may further include: third logic to provide the data representative of the latency between the web browser and the relay server to the relay server.

Example B80 may include the subject matter of any of Examples B73-79, and may further specify that the web page is a Hypertext Markup Language (HTML) web page, and may further specify that the first logic is to, as part of provision of the web page to the web browser: store a plurality of identifiers of a corresponding plurality of platforms; receive a request for the web page; select an identifier of a platform of the web server from the stored plurality of identifiers; identify a compressed data set representative of the web page based at least in part on the identifier of the platform of the web server; and provide, in response to the request, the compressed data set to the web browser, wherein the web browser is to decompress the compressed data set to display the web page.

Example B81 may include the subject matter of any of Examples B73-80, and may further specify that: the web page includes code to establish a Web Real Time Communications (WebRTC) connection between the computing device and another computing device; the WebRTC connection is facilitated by the relay server; and the relay server is one of a plurality of Traversal Using Relays around Network Address Translator (TURN) servers arranged in a star configuration or a mesh configuration.

Example B82 may include the subject matter of any of Examples B73-81, and may further specify that the web page includes JavaScript code to establish peer-to-peer Web Real Time Communications (WebRTC) connections between the web browser and a plurality of computing devices.

Example B83 may include the subject matter of any of Examples B73-82, and may further specify that the web page includes code to generate a Web Real Time Communication (WebRTC) offer in a first format for establishing WebRTC communication between the web browser and a computing device, code to convert the WebRTC offer from the first format into a binary block, and code to provide the binary block to the web server, and wherein the web server is to transmit a corresponding offer to the computing device.

Example B84 is one or more computer readable media having instructions thereon that, in response to execution by one or more processing devices of a web server, cause the web server to: provide a web page to a web browser of a computing device, wherein the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; and receive, from the web browser, data representative of a latency between the web browser and the relay server, wherein the data is based at least in part on performance of the instructions by the web browser.

Example B85 may include the subject matter of Example B84, and may further specify that the instructions are further to cause the web server to: store the data representative of the latency between the web browser and the relay server in a storage device.

Example B86 may include the subject matter of Example B85, and may further specify that the instructions are further to cause the web server to: provide an indicator of the relay server to the web browser as a candidate TURN server for establishing a Web Real Time Communications (WebRTC) communication between the web browser and another computing device.

Example B87 may include the subject matter of any of Examples B85-86, and may further specify that the relay server is a first relay server, and wherein the instructions are further to cause the web server to store data representative of a latency between the web browser and a second relay server different from the first relay server.

Example B88 may include the subject matter of Example B87, and may further specify that the instructions are further to cause the web server to: select a relay server from the first relay server and the second relay server based on the stored data representative of latency; and provide an indicator of the selected relay server to the web browser as a candidate TURN server for establishing a Web Real Time Communications (WebRTC) communication between the web browser and another computing device.

Example B89 may include the subject matter of any of Examples B87-88, and may further specify that the web browser is a first web browser, and wherein the instructions are further to cause the web server to: determine that a second web browser is in a same subnet as the first web browser; select a relay server from the first relay server and the second relay server based on the stored data representative of latency between the first web browser and the first and second relay servers; and provide an indicator of the selected relay server to the web browser as a candidate TURN server for establishing a Web Real Time Communications (WebRTC) communication between the second web browser and another computing device.

Example B90 may include the subject matter of any of Examples B85-89, and may further specify that the instructions are further to cause the web server to: provide the data representative of the latency between the web browser and the relay server to the relay server.

Example B91 may include the subject matter of any of Examples B84-90, and may further specify that the web page is a Hypertext Markup Language (HTML) web page, and may further specify that the instructions are further to cause the web server to, as part of provision of the web page to the web browser: store a plurality of identifiers of a corresponding plurality of platforms; receive a request for the web page; select an identifier of a platform of the web server from the stored plurality of identifiers; identify a compressed data set representative of the web page based at least in part on the identifier of the platform of the web server; and provide, in response to the request, the compressed data set to the web browser, wherein the web browser is to decompress the compressed data set to display the web page.

Example B92 may include the subject matter of any of Examples B84-91, and may further specify that: the web page includes code to establish a Web Real Time Communications (WebRTC) connection between the computing device and another computing device; the WebRTC connection is facilitated by the relay server; and the relay server is one of a plurality of Traversal Using Relays around Network Address Translator (TURN) servers arranged in a star configuration or a mesh configuration.

Example B93 may include the subject matter of any of Examples B84-92, and may further specify that the web page includes JavaScript code to establish peer-to-peer Web Real Time Communications (WebRTC) connections between the web browser and a plurality of computing devices.

Example B94 may include the subject matter of any of Examples B84-93, and may further specify that the web page includes code to generate a Web Real Time Communication (WebRTC) offer in a first format for establishing WebRTC communication between the web browser and a computing device, code to convert the WebRTC offer from the first format into a binary block, and code to provide the binary block to the web server, and wherein the web server is to transmit a corresponding offer to the computing device.

Example B95 is a web server, including: means for providing a web page to a web browser of a computing device, wherein the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; and means for receiving, from the web browser, data representative of a latency between the web browser and the relay server, and may further specify that the data is based at least in part on performance of the instructions by the web browser.

Example B96 may include the subject matter of Example B95, and may further include: a storage device, coupled with the means for receiving, having a data structure to store the data representative of the latency between the web browser and the relay server.

Example B97 may include the subject matter of Example B96, and may further include: means for providing an indicator of the relay server to the web browser as a candidate TURN server for establishing a Web Real Time Communications (WebRTC) communication between the web browser and another computing device.

Example B98 may include the subject matter of any of Examples B96-97, and may further specify that: the relay server is a first relay server, and the data structure is further to store data representative of a latency between the web browser and a second relay server different from the first relay server.

Example B99 may include the subject matter of Example B98, and may further include: means for selecting a relay server from the first relay server and the second relay server based on the stored data representative of latency; and means for providing an indicator of the selected relay server to the web browser as a candidate TURN server for establishing a Web Real Time Communications (WebRTC) communication between the web browser and another computing device.

Example B100 may include the subject matter of any of Examples B98-99, and may further specify that the web browser is a first web browser, and wherein the web server further comprises: means for determining that a second web browser is in a same subnet as the first web browser; means for selecting a relay server from the first relay server and the second relay server based on the stored data representative of latency between the first web browser and the first and second relay servers; and means for providing an indicator of the selected relay server to the web browser as a candidate TURN server for establishing a Web Real Time Communications (WebRTC) communication between the second web browser and another computing device.

Example B101 may include the subject matter of any of Examples B96-100, and may further include: means for providing the data representative of the latency between the web browser and the relay server to the relay server.

Example B102 may include the subject matter of any of Examples B95-101, and may further specify that the web page is a Hypertext Markup Language (HTML) web page, and may further specify that the means for providing the web page to the web browser of the computing device is to, as part of provision of the web page to the web browser: store a plurality of identifiers of a corresponding plurality of platforms; receive a request for the web page; select an identifier of a platform of the web server from the stored plurality of identifiers; identify a compressed data set representative of the web page based at least in part on the identifier of the platform of the web server; and provide, in response to the request, the compressed data set to the web browser, wherein the web browser is to decompress the compressed data set to display the web page.

Example B103 may include the subject matter of any of Examples B95-102, and may further specify that: the web page includes code to establish a Web Real Time Communications (WebRTC) connection between a computing device and another computing device; the WebRTC connection is facilitated by the relay server; and the relay server is one of a plurality of Traversal Using Relays around Network Address Translator (TURN) servers arranged in a star configuration or a mesh configuration.

Example B104 may include the subject matter of any of Examples B95-103, and may further specify that the web page includes JavaScript code to establish peer-to-peer Web Real Time Communications (WebRTC) connections between the web browser and a plurality of computing devices.

Example B105 may include the subject matter of any of Examples B95-104, and may further specify that the web page includes code to generate a Web Real Time Communication (WebRTC) offer in a first format for establishing WebRTC communication between the web browser and a computing device, code to convert the WebRTC offer from the first format into a binary block, and code to provide the binary block to the web server, and wherein the web server is to transmit a corresponding offer to the computing device.

Example B106 is a method for web communications, including: providing, by a web server, a web page to a web browser of a computing device, wherein the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port; and receiving, by the web server from the web browser, data representative of a latency between the web browser and the relay server, and may further specify that the data is based at least in part on performance of the instructions by the web browser.

Example B107 may include the subject matter of Example B106, and may further include: storing, by the web server, the data representative of the latency between the web browser and the relay server in a storage device.

Example B108 may include the subject matter of Example B107, and may further include: providing, by the web server, an indicator of the relay server to the web browser as a candidate TURN server for establishing a Web Real Time Communications (WebRTC) communication between the web browser and another computing device.

Example B109 may include the subject matter of any of Examples B107-108, and may further specify that: the relay server is a first relay server, and the storage device is further to store data representative of a latency between the web browser and a second relay server different from the first relay server.

Example B110 may include the subject matter of Example B109, and may further include: selecting, by the web server, a relay server from the first relay server and the second relay server based on the stored data representative of latency; and providing, by the web server, an indicator of the selected relay server to the web browser as a candidate TURN server for establishing a Web Real Time Communications (WebRTC) communication between the web browser and another computing device.

Example B111 may include the subject matter of any of Examples B109-110, and may further specify that the web browser is a first web browser, and the method further includes: determining, by the web server, that a second web browser is in a same subnet as the first web browser; selecting, by the web server, a relay server from the first relay server and the second relay server based on the stored data representative of latency between the first web browser and the first and second relay servers; and providing, by the web server, an indicator of the selected relay server to the web browser as a candidate TURN server for establishing a Web Real Time Communications (WebRTC) communication between the second web browser and another computing device.

Example B112 may include the subject matter of any of Examples B107-111, and may further include: providing, by the web server, the data representative of the latency between the web browser and the relay server to the relay server.

Example B113 may include the subject matter of any of Examples B106-112, and may further specify that the web page is a Hypertext Markup Language (HTML) web page, and may further specify that the method further includes: storing, by the web server, a plurality of identifiers of a corresponding plurality of platforms; receiving, by the web server, a request for the web page; selecting, by the web server, an identifier of a platform of the web server from the stored plurality of identifiers; identifying, by the web server, a compressed data set representative of the web page based at least in part on the identifier of the platform of the web server; and providing, by the web server, in response to the request, the compressed data set to the web browser, wherein the web browser is to decompress the compressed data set to display the web page.

Example B114 may include the subject matter of any of Examples B106-113, and may further specify that: the web page includes code to establish a Web Real Time Communications (WebRTC) connection between the computing device and another computing device; the WebRTC connection is facilitated by the relay server; and the relay server is one of a plurality of Traversal Using Relays around Network Address Translator (TURN) servers arranged in a star configuration or a mesh configuration.

Example B115 may include the subject matter of any of Examples B106-114, and may further specify that the web page includes JavaScript code to establish peer-to-peer Web Real Time Communications (WebRTC) connections between the web browser and a plurality of computing devices.

Example B116 may include the subject matter of any of Examples B106-115, and may further specify that the web page includes code to generate a Web Real Time Communication (WebRTC) offer in a first format for establishing WebRTC communication between the web browser and a computing device, code to convert the WebRTC offer from the first format into a binary block, and code to provide the binary block to the web server, and wherein the web server is to transmit a corresponding offer to the computing device.

Example B117 is one or more computer readable media having instructions thereon that, in response to execution by one or more processing devices of a computing device, cause the computing device to perform the method of any of Examples B28-36, B64-72, and B106-110.

Example B118 is an apparatus including means for performing the method of any of Examples B28-36, B64-72, and B106-110.

Example C1 is a computing device, including: first logic to generate a Web Real Time Communication (WebRTC) offer in a first format for establishing WebRTC communication between the computing device and a second computing device; second logic, coupled with the first logic, to convert the WebRTC offer from the first format into a binary block; and third logic, coupled with the second logic, to provide the binary block to a web server, wherein the web server is to transmit a corresponding offer to the second computing device.

Example C2 may include the subject matter of Example C1, and may further specify that the first format is Session Description Protocol (SDP) format.

Example C3 may include the subject matter of any of Examples C1-2, and may further specify that the second logic is to convert the WebRTC offer in the first format into a binary block using a JavaScript converter.

Example C4 may include the subject matter of any of Examples C1-3, and may further specify that the third logic is to provide the binary block to the web server using a WebSocket protocol.

Example C5 may include the subject matter of any of Examples C1-4, and may further include: fourth logic to receive an answer from the web server, wherein the answer is in a binary format and is provided to the computing device by the web server in response to receiving an answer from the second computing device; and fifth logic to convert the response from binary format into Session Description Protocol (SDP) format.

Example C6 may include the subject matter of any of Examples C1-5, and may further specify that a size of the binary block is smaller than a size of the WebRTC offer in the first format.

Example C7 may include the subject matter of any of Examples C1-6, and may further include: fourth logic to receive a web page from the web server.

Example C8 may include the subject matter of Example C7, and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example C9 may include the subject matter of any of Examples C7-8, and may further specify that the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C10 may include the subject matter of any of Examples C7-9, and may further specify that the web page includes JavaScript code to establish peer-to-peer Web Real Time Communications (WebRTC) connections between the computing device and a plurality of other computing devices.

Example C11 may include the subject matter of any of Examples C1-10, and may further specify that the WebRTC offer in the first format for establishing WebRTC communication between the computing device and the second computing device is a WebRTC offer in the first format for establishing WebRTC communication between a web browser of the computing device and the second computing device.

Example C12 is one or more computer readable media having instructions thereon that, in response to execution by one or more processing devices of a computing device, cause the computing device to: generate a Web Real Time Communication (WebRTC) offer in a first format for establishing WebRTC communication between the computing device and a second computing device; convert the WebRTC offer from the first format into a binary block; and provide the binary block to a web server, wherein the web server is to transmit a corresponding offer to the second computing device.

Example C13 may include the subject matter of Example C12, and may further specify that the first format is Session Description Protocol (SDP) format.

Example C14 may include the subject matter of any of Examples C12-13, and may further specify that the instructions are to cause the computing device to convert the WebRTC offer in the first format into a binary block using a JavaScript converter.

Example C15 may include the subject matter of any of Examples C12-14, and may further specify that the instructions are to cause the computing device to provide the binary block to the web server using a WebSocket protocol.

Example C16 may include the subject matter of any of Examples C12-15, and may further specify that the instructions are to cause the computing device to: receive an answer from the web server, wherein the answer is in a binary format and is provided to the computing device by the web server in response to receiving an answer from the second computing device; and convert the response from binary format into Session Description Protocol (SDP) format.

Example C17 may include the subject matter of any of Examples C12-16, and may further specify that a size of the binary block is smaller than a size of the WebRTC offer in the first format.

Example C18 may include the subject matter of any of Examples C12-17, and may further specify that the instructions are to cause the computing device to: receive a web page from the web server.

Example C19 may include the subject matter of Example C18, and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example C20 may include the subject matter of any of Examples C18-19, and may further specify that the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C21 may include the subject matter of any of Examples C18-20, and may further specify that the web page includes JavaScript code to establish peer-to-peer Web Real Time Communications (WebRTC) connections between the computing device and a plurality of other computing devices.

Example C22 may include the subject matter of any of Examples C12-21, and may further specify that the WebRTC offer in the first format for establishing WebRTC communication between the computing device and the second computing device is a WebRTC offer in the first format for establishing WebRTC communication between a web browser of the computing device and the second computing device.

Example C23 is a computing device, including: means for generating a Web Real Time Communication (WebRTC) offer in a first format for establishing WebRTC communication between the computing device and a second computing device; means for converting the WebRTC offer from the first format into a binary block; and means for providing the binary block to a web server, and may further specify that the web server is to transmit a corresponding offer to the second computing device.

Example C24 may include the subject matter of Example C23, and may further specify that the first format is Session Description Protocol (SDP) format.

Example C25 may include the subject matter of any of Examples C23-24, and may further specify that the means for converting is to convert the WebRTC offer in the first format into a binary block using a JavaScript converter.

Example C26 may include the subject matter of any of Examples C23-25, and may further specify that the means for providing is to provide the binary block to the web server using a WebSocket protocol.

Example C27 may include the subject matter of any of Examples C23-26, and may further include: means for receiving an answer from the web server, wherein the answer is in a binary format and is provided to the computing device by the web server in response to receiving an answer from the second computing device; and means for converting the response from binary format into Session Description Protocol (SDP) format.

Example C28 may include the subject matter of any of Examples C23-27, and may further specify that a size of the binary block is smaller than a size of the WebRTC offer in the first format.

Example C29 may include the subject matter of any of Examples C23-28, and may further include: means for receiving a web page from the web server.

Example C30 may include the subject matter of Example C29, and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example C31 may include the subject matter of any of Examples C29-30, and may further specify that the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C32 may include the subject matter of any of Examples C29-31, and may further specify that the web page includes JavaScript code to establish peer-to-peer Web Real Time Communications (WebRTC) connections between the computing device and a plurality of other computing devices.

Example C33 may include the subject matter of any of Examples C23-32, and may further specify that the WebRTC offer in the first format for establishing WebRTC communication between the computing device and the second computing device is a WebRTC offer in the first format for establishing WebRTC communication between a web browser of the computing device and the second computing device.

Example C34 is a method for web communication, including: generating, by a computing device, a Web Real Time Communication (WebRTC) offer in a first format for establishing WebRTC communication between the computing device and a second computing device; converting, by the computing device, the WebRTC offer from the first format into a binary block; and providing, by the computing device, the binary block to a web server, wherein the web server is to transmit a corresponding offer to the second computing device.

Example C35 may include the subject matter of Example C34, and may further specify that the first format is Session Description Protocol (SDP) format.

Example C36 may include the subject matter of any of Examples C34-35, and may further specify that the WebRTC offer in the first format is converted into a binary block using a JavaScript converter.

Example C37 may include the subject matter of any of Examples C34-36, and may further specify that the binary block is provided to the web server using a WebSocket protocol.

Example C38 may include the subject matter of any of Examples C34-37, and may further include: receiving, by the computing device, an answer from the web server, wherein the answer is in a binary format and is provided to the first computing device by the web server in response to receiving an answer from the second computing device; and converting, by the computing device, the response from binary format into Session Description Protocol (SDP) format.

Example C39 may include the subject matter of any of Examples C34-38, and may further specify that a size of the binary block is smaller than a size of the WebRTC offer in the first format.

Example C40. The method of any of claims 34-39, and may further include: receiving, by the computing device, a web page from the web server.

Example C41 may include the subject matter of Example C40, and may further specify that: the web page includes code to establish a Web Real Time Communications (WebRTC) connection between the computing device and another computing device; the WebRTC connection is facilitated by a Traversal Using Relays around Network Address Translator (TURN) server; and the TURN server is one of a plurality of TURN servers arranged in a star configuration or a mesh configuration.

Example C42 may include the subject matter of any of Examples C40-41, and may further specify that the web page includes instructions for the computing device to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C43 may include the subject matter of any of Examples C40-42, and may further specify that the web page includes JavaScript code to establish peer-to-peer Web Real Time Communications (WebRTC) connections between the computing device and a plurality of other computing devices.

Example C44 may include the subject matter of any of Examples C34-43, and may further specify that the WebRTC offer in the first format for establishing WebRTC communication between the computing device and the second computing device is a WebRTC offer in the first format for establishing WebRTC communication between a web browser of the computing device and the second computing device.

Example C45 is a web server, including: first logic to receive a Web Real Time Communication (WebRTC) offer from a web browser to a computing device; second logic, coupled to the first logic, to forward the WebRTC offer to the computing device; third logic, coupled to the first logic, to provide a Transmission Control Protocol (TCP) message to the computing device, wherein the TCP message includes a command that the computing device send a Universal Datagram Protocol (UDP) message to the web server, wherein the UDP message is included in the TCP message; and fourth logic to identify an Internet Protocol (IP) address and port for the computing device based on a UDP message sent by the computing device to the web server in response to the command.

Example C46 may include the subject matter of Example C45, and may further include: fifth logic to receive a WebRTC answer from the computing device in response to receipt, by the computing device, of the WebRTC offer; and sixth logic, coupled to the fifth logic, to forward the WebRTC answer to the web browser.

Example C47 may include the subject matter of any of Examples C45-46, and may further include: fifth logic, coupled to the fourth logic, to send additional candidate information to the web browser, and may further specify that the additional candidate information includes the IP address and port for the computing device.

Example C48 may include the subject matter of any of Examples C45-47, and may further specify that the fourth logic is to identify the IP address and port for the computing device based on the UDP message by identifying a public address for the computing device stored as a UDP port mapping in an intermediate device located between the web server and the computing device.

Example C49 may include the subject matter of Example C48, and may further specify that the intermediate device is a Network Address Translator or proxy barrier.

Example C50 may include the subject matter of any of Examples C45-49, and may further specify that the UDP message includes an identifier of the web browser.

Example C51 may include the subject matter of any of Examples C45-50, and may further specify that the UDP message is encrypted using a key known to the web server.

Example C52 may include the subject matter of any of Examples C45-51, and may further include: fifth logic to provide a web page to the web browser.

Example C53 may include the subject matter of Example C52, and may further specify that the web page is a Hypertext Markup Language (HTML) web page, and may further specify that the fifth logic is to, as part of provision of the web page to the web browser: store a plurality of identifiers of a corresponding plurality of platforms; receive a request for the web page; select an identifier of a platform of the web server from the stored plurality of identifiers; identify a compressed data set representative of the web page based at least in part on the identifier of the platform of the web server; and provide, in response to the request, the compressed data set to the web browser, wherein the web browser is to decompress the compressed data set to display the web page.

Example C54 may include the subject matter of any of Examples C52-53, and may further specify that the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C55 may include the subject matter of any of Examples C52-54, and may further specify that the web page includes JavaScript code to establish peer-to-peer WebRTC connections between the web browser and a plurality of other computing devices.

Example C56 may include the subject matter of any of Examples C52-55, and may further specify that the web page includes code to generate a WebRTC offer in a first format for establishing WebRTC communication between the web browser and the computing device, code to convert the WebRTC offer from the first format into a binary block, and code to provide the binary block to the web server.

Example C57 may include the subject matter of any of Examples C45-56, and may further specify that: the WebRTC offer is associated with a WebRTC connection that is facilitated by a Traversal Using Relays around Network Address Translator (TURN) server; and the TURN server is one of a plurality of TURN servers arranged in a star configuration or a mesh configuration.

Example C58 is one or more computer readable media having instructions thereon that, in response to execution by one or more processing devices of a web server, cause the web server to: receive a Web Real Time Communication (WebRTC) offer from a web browser to a computing device; forward the WebRTC offer to the computing device; provide a Transmission Control Protocol (TCP) message to the computing device, wherein the TCP message includes a command that the computing device send a Universal Datagram Protocol (UDP) message to the web server, wherein the UDP message is included in the TCP message; and identify an Internet Protocol (IP) address and port for the computing device based on a UDP message sent by the computing device to the web server in response to the command.

Example C59 may include the subject matter of Example C58, and may further specify that the instructions, in response to execution, further cause the web server to: receive a WebRTC answer from the computing device in response to receipt, by the computing device, of the WebRTC offer; and forward the WebRTC answer to the web browser.

Example C60 may include the subject matter of any of Examples C58-59, and may further specify that the instructions, in response to execution, further cause the web server to: send additional candidate information to the web browser, wherein the additional candidate information includes the IP address and port for the computing device.

Example C61 may include the subject matter of any of Examples C58-60, and may further specify that the instructions, in response to execution, further cause the web server to, as part of identification of the IP address and port for the computing device based on the UDP message, identify a public address for the computing device stored as a UDP port mapping in an intermediate device located between the web server and the computing device.

Example C62 may include the subject matter of Example C61, and may further specify that the intermediate device is a Network Address Translator or proxy barrier.

Example C63 may include the subject matter of any of Examples C58-62, and may further specify that the UDP message includes an identifier of the web browser.

Example C64 may include the subject matter of any of Examples C58-63, and may further specify that the UDP message is encrypted using a key known to the web server.

Example C65 may include the subject matter of any of Examples C58-64, and may further specify that the instructions, in response to execution, further cause the web server to: provide a web page to the web browser.

Example C66 may include the subject matter of Example C65, and may further specify that the web page is a Hypertext Markup Language (HTML) web page, and wherein the instructions, in response to execution, further cause the web server to, as part of provision of the web page to the web browser: store a plurality of identifiers of a corresponding plurality of platforms; receive a request for the web page; select an identifier of a platform of the web server from the stored plurality of identifiers; identify a compressed data set representative of the web page based at least in part on the identifier of the platform of the web server; and provide, in response to the request, the compressed data set to the web browser, wherein the web browser is to decompress the compressed data set to display the web page.

Example C67 may include the subject matter of any of Examples C65-66, and may further specify that the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C68 may include the subject matter of any of Examples C65-67, and may further specify that the web page includes JavaScript code to establish peer-to-peer WebRTC connections between the web browser and a plurality of other computing devices.

Example C69 may include the subject matter of any of Examples C65-68, and may further specify that the web page includes code to generate a WebRTC offer in a first format for establishing WebRTC communication between the web browser and the computing device, code to convert the WebRTC offer from the first format into a binary block, and code to provide the binary block to the web server.

Example C70 may include the subject matter of any of Examples C58-69, and may further specify that: the WebRTC offer is associated with a WebRTC connection that is facilitated by a Traversal Using Relays around Network Address Translator (TURN) server; and the TURN server is one of a plurality of TURN servers arranged in a star configuration or a mesh configuration.

Example C71 is a web server, including: means for receiving a Web Real Time Communication (WebRTC) offer from a web browser to a computing device; means for forwarding the WebRTC offer to the computing device; means for providing a Transmission Control Protocol (TCP) message to the computing device, wherein the TCP message includes a command that the computing device send a Universal Datagram Protocol (UDP) message to the web server, wherein the UDP message is included in the TCP message; and means for identifying an Internet Protocol (IP) address and port for the computing device based on a UDP message sent by the computing device to the web server in response to the command.

Example C72 may include the subject matter of Example C71, and may further include: means for receiving a WebRTC answer from the computing device in response to receipt, by the computing device, of the WebRTC offer; and means for forwarding the WebRTC answer to the web browser.

Example C73 may include the subject matter of any of Examples C71-72, and may further include: means for sending additional candidate information to the web browser, and may further specify that the additional candidate information includes the IP address and port for the computing device.

Example C74 may include the subject matter of any of Examples C71-73, and may further specify that the means for identifying is to, as part of identification of the IP address and port for the computing device based on the UDP message, identify a public address for the computing device stored as a UDP port mapping in an intermediate device located between the web server and the computing device.

Example C75 may include the subject matter of Example C74, and may further specify that the intermediate device is a Network Address Translator or proxy barrier.

Example C76 may include the subject matter of any of Examples C71-75, and may further specify that the UDP message includes an identifier of the web browser.

Example C77 may include the subject matter of any of Examples C71-76, and may further specify that the UDP message is encrypted using a key known to the web server.

Example C78 may include the subject matter of any of Examples C71-77, and may further include: means for providing a web page to the web browser.

Example C79 may include the subject matter of Example C78, and may further specify that the web page is a Hypertext Markup Language (HTML) web page, and wherein the means for serving is to, as part of provision of the web page to the web browser: store a plurality of identifiers of a corresponding plurality of platforms; receive a request for the web page; select an identifier of a platform of the web server from the stored plurality of identifiers; identify a compressed data set representative of the web page based at least in part on the identifier of the platform of the web server; and provide, in response to the request, the compressed data set to the web browser, wherein the web browser is to decompress the compressed data set to display the web page.

Example C80 may include the subject matter of any of Examples C78-79, and may further specify that the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C81 may include the subject matter of any of Examples C78-80, and may further specify that the web page includes JavaScript code to establish peer-to-peer WebRTC connections between the web browser and a plurality of other computing devices.

Example C82 may include the subject matter of any of Examples C78-81, and may further specify that the web page includes code to generate a WebRTC offer in a first format for establishing WebRTC communication between the web browser and the computing device, code to convert the WebRTC offer from the first format into a binary block, and code to provide the binary block to the web server.

Example C83 may include the subject matter of any of Examples C71-82, and may further specify that: the WebRTC offer is associated with a WebRTC connection that is facilitated by a Traversal Using Relays around Network Address Translator (TURN) server; and the TURN server is one of a plurality of TURN servers arranged in a star configuration or a mesh configuration.

Example C84 is a method for web communication, including: receiving, by a web server, a Web Real Time Communication (WebRTC) offer from a web browser to a computing device; forwarding, by the web server, the WebRTC offer to the computing device; providing, by the webserver, a Transmission Control Protocol (TCP) message to the computing device, wherein the TCP message includes a command that the computing device send a Universal Datagram Protocol (UDP) message to a web server, wherein the UDP message is included in the TCP message; and identifying, by the webserver, an Internet Protocol (IP) address and port for the computing device based on a UDP message sent by the computing device to the web server in response to the command.

Example C85 may include the subject matter of Example C84, and may further include: receiving, by the webserver, a WebRTC answer from the computing device in response to receipt, by the computing device, of the WebRTC offer; and forwarding, by the webserver, the WebRTC answer to the web browser.

Example C86 may include the subject matter of any of Examples C84-85, and may further include: sending, by the webserver, additional candidate information to the web browser, wherein the additional candidate information includes the IP address and port for the computing device.

Example C87 may include the subject matter of any of Examples C84-86, and may further specify that the method includes, as part of identifying the IP address and port for the computing device based on the UDP message, identifying a public address for the computing device stored as a UDP port mapping in an intermediate device located between the web server and the computing device.

Example C88 may include the subject matter of Example C87, and may further specify that the intermediate device is a Network Address Translator or proxy barrier.

Example C89 may include the subject matter of any of Examples C84-88, and may further specify that the UDP message includes an identifier of the web browser.

Example C90 may include the subject matter of any of Examples C84-89, and may further specify that the UDP message is encrypted using a key known to the web server.

Example C91 may include the subject matter of any of Examples C84-90, and may further include: providing a web page to the web browser.

Example C92 may include the subject matter of Example C91, and may further specify that the web page is a Hypertext Markup Language (HTML) web page, and wherein the method includes, as part of providing the web page to the web browser: storing a plurality of identifiers of a corresponding plurality of platforms; receiving a request for the web page; selecting an identifier of a platform of the web server from the stored plurality of identifiers; identifying a compressed data set representative of the web page based at least in part on the identifier of the platform of the web server; and providing, in response to the request, the compressed data set to the web browser, wherein the web browser is to decompress the compressed data set to display the web page.

Example C93 may include the subject matter of any of Examples C91-92, and may further specify that the web page includes instructions for the web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

Example C94 may include the subject matter of any of Examples C91-93, and may further specify that the web page includes JavaScript code to establish peer-to-peer WebRTC connections between the web browser and a plurality of other computing devices.

Example C95 may include the subject matter of any of Examples C91-94, and may further specify that the web page includes code to generate a WebRTC offer in a first format for establishing WebRTC communication between the web browser and the computing device, code to convert the WebRTC offer from the first format into a binary block, and code to provide the binary block to the web server.

Example C96 may include the subject matter of any of Examples C84-95, and may further specify that: the WebRTC offer is associated with a WebRTC connection that is facilitated by a Traversal Using Relays around Network Address Translator (TURN) server; and the TURN server is one of a plurality of TURN servers arranged in a star configuration or a mesh configuration.

Example C97 is one or more computer readable media having instructions thereon that, in response to execution by one or more processing devices of a computing device, cause the computing device to perform the method of any of Examples C34-44 and C84-96.

Example C98 is an apparatus including means for performing the method of any of Examples C34-44 and C84-96.

What is claimed is:

1. A computing device, comprising:
   receipt logic to receive a first data set representative of a web page, wherein the first data set includes an unsupported portion, the unsupported portion is a portion of the first data set that is associated with an unsupported platform feature that is not supported by a platform of a web server that is to serve the web page;
   removal logic, coupled to the receipt logic, to:
      access a database object indicating one or more platform features supported by the platform of the web server,
      determine, based on the database object, that the unsupported platform feature is not supported by the platform, and
      generate a second data set by removing the unsupported portion from the first data set;
   minification logic, coupled to the removal logic, to generate a third data set by performing at least one minification operation on the second data set to reduce a size of the second data set; and provision logic, coupled to the minification logic, to provide the third data set to the web server, wherein the web server is to provide the third data set to a second computing device in response to a request, by the second computing device to the web server, for the web page.

2. The computing device of claim 1, wherein the removal logic is further to:
receive an indicator of the platform; and
determine, by accessing a stored association between the platform and platform features supported by the platform, that the platform feature is not supported by the platform.

3. The computing device of claim 2, wherein the removal logic, as part of generation of the second data set, is to:
identify a tag, associated with the platform feature, in the first data set; and
identify the portion based on the tag.

4. The computing device of claim 1, wherein:
the platform is a first platform;
the web server is a first web server;
the platform feature is supported by a second platform of a second web server that is to serve the web page;
the removal logic is to generate a fourth data set based on the first data set, wherein the fourth data set includes the portion;
the minification logic is to generate a fifth data set by performing at least one minification operation on the fourth data set to reduce a size of the fourth data set; and
the provision logic is to:
provide the third and fifth data sets to the first web server, and
provide the third and fifth data sets to the second web server.

5. The computing device of claim 4, wherein the provision logic is to provide the third and fifth data sets to the first web server in a single file.

6. The computing device of claim 5, wherein the single file is a single header file.

7. The computing device of claim 1, wherein the first data set includes at least one image file, and wherein the minification logic, as part of generation of the third data set, is to replace the at least one image file with an inline representation of the at least one image file.

8. The computing device of claim 1, wherein the first data set includes code comments, and wherein the minification logic, as part of generation of the third data set, is to remove the code comments.

9. The computing device of claim 1, wherein:
the web page includes code to establish a Web Real Time Communications (WebRTC) connection between the second computing device and a third computing device;
the WebRTC connection is facilitated by a Traversal Using Relays around Network Address Translator (TURN) server; and
the TURN server is one of a plurality of TURN servers arranged in a star configuration or a mesh configuration.

10. The computing device of claim 1, wherein the web page includes instructions for a web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

11. The computing device of claim 1, wherein the web page includes JavaScript code to establish peer-to-peer Web Real Time Communications (WebRTC) connections between the second computing device and a plurality of other computing devices.

12. The computing device of claim 1, wherein the web page includes code to generate a Web Real Time Communication (WebRTC) offer in a first format for establishing WebRTC communication between the second computing device and a third computing device, code to convert the WebRTC offer from the first format into a binary block, and code to provide the binary block to the web server, and wherein the web server is to transmit a corresponding offer to the third computing device.

13. One or more non-transitory computer readable media having instructions thereon that, in response to execution by one or more processing devices of a computing device, cause the computing device to:
receive a first data set representative of a web page, wherein the first data set includes an unsupported portion, the unsupported portion being a portion of the first data set that is associated with a platform feature not supported by a platform of a web server that is to serve the web page;
generate a second data set by removing the unsupported portion from the first data set;
generate a third data set by performing at least one minification operation on the second data set to reduce a size of the second data set, wherein, to generate the third data set, execution of the instructions is to cause the computing device to:
remove white spaces and carriage returns from the second data set, and
encode, for storage by the web server, the second data set with the removed white spaces and carriage returns into a variable format based on supported platform features of the web server; and
provide the third data set to the web server, wherein the web server is to provide the third data set to a second computing device in response to a request, by the second computing device to the web server, for the web page.

14. The one or more non-transitory computer readable media of claim 13, wherein the instructions are further to cause the computing device to:
receive an indicator of the platform; and
determine, by accessing a stored association between the platform and platform features supported by the platform, that the platform feature is not supported by the platform.

15. The one or more non-transitory computer readable media of claim 14, wherein the instructions are to cause the computing device, as part of generation of the second data set, to:
identify a tag, associated with the platform feature, in the first data set; and
identify the portion based on the tag.

16. The one or more non-transitory computer readable media of claim 13, wherein the platform is a first platform, the web server is a first web server, and the platform feature is supported by a second platform of a second web server that is to serve the web page, and wherein the instructions are further to cause the computing device to:
generate a fourth data set based on the first data set, wherein the fourth data set includes the portion;

generate a fifth data set by performing at least one minification operation on the fourth data set to reduce a size of the fourth data set;

provide the fifth data set to the first web server; and provide the third and fifth data sets to the second web server.

17. The one or more non-transitory computer readable media of claim 16, wherein the third and fifth data sets are to be provided to the first web server in a single file.

18. The one or more non-transitory computer readable media of claim 17, wherein the single file is a single header file.

19. The one or more non-transitory computer readable media of claim 13, wherein the first data set includes at least one image file, and wherein instructions are to cause the computing device, as part of generation of the third data set, to replace the at least one image file with an inline representation of the at least one image file.

20. The one or more non-transitory computer readable media of claim 13, wherein the first data set includes code comments, and wherein the instructions are to cause the computing device, as part of generation of the third data set, to remove the code comments.

21. The one or more non-transitory computer readable media of claim 13, wherein:
the web page includes code to establish a Web Real Time Communications (WebRTC) connection between the second computing device and a third computing device;
the WebRTC connection is facilitated by a Traversal Using Relays around Network Address Translator (TURN) server; and
the TURN server is one of a plurality of TURN servers arranged in a star configuration or a mesh configuration.

22. The one or more non-transitory computer readable media of claim 13, wherein the web page includes instructions for a web browser to perform at least one Asynchronous JavaScript and Extensible Markup Language (AJAX) query on a network port of a relay server, and wherein the network port serves as both a Traversal Using Relays around Network Address Translator (TURN) port and a Hypertext Transfer Protocol (HTTP) port.

23. The one or more non-transitory computer readable media of claim 13, wherein the web page includes JavaScript code to establish peer-to-peer Web Real Time Communications (WebRTC) connections between the second computing device and a plurality of other computing devices.

24. A method for web communication, comprising:
receiving, by a computing device, a first data set representative of a web page, wherein the first data set includes an unsupported portion, the unsupported portion being a portion of the first data set that is associated with a platform feature not supported by a platform of a web server that is to serve the web page;
generating, by the computing device, a second data set by removing the unsupported portion from the first data set;
generating, by the computing device, a third data set by performing at least one minification operation on the second data set to reduce a size of the second data set;
generating, by the computing device, a file to include the third data set, wherein the file includes an indicator of the platform, wherein the indicator is to indicate that the third data set is intended to be included in code to be served by the web server; and
providing, by the computing device, the third data set to the web server, wherein the web server is to provide the third data set to a second computing device in response to a request, by the second computing device to the web server, for the web page.

25. The method of claim 24, further comprising:
receiving, by the computing device, an indicator of the platform; and
determining, by the computing device, by accessing a stored association between the platform and platform features supported by the platform, that the platform feature is not supported by the platform.

\* \* \* \* \*